United States Patent
Lim et al.

(10) Patent No.: US 11,132,459 B1
(45) Date of Patent: *Sep. 28, 2021

(54) PROTECTING DOCUMENTS WITH CENTRALIZED AND DISCRETIONARY POLICIES

(71) Applicant: NextLabs, Inc., San Mateo, CA (US)

(72) Inventors: Keng Lim, Atherton, CA (US); Poon Fung, Cupertino, CA (US)

(73) Assignee: NextLabs, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,851

(22) Filed: Aug. 19, 2019

Related U.S. Application Data

(63) Continuation of application No. 15/268,155, filed on Sep. 16, 2016, now Pat. No. 10,387,669.

(60) Provisional application No. 62/238,009, filed on Oct. 6, 2015, provisional application No. 62/220,104, filed on Sep. 17, 2015.

(51) Int. Cl.
  *G06F 21/62* (2013.01)
  *G06F 21/60* (2013.01)

(52) U.S. Cl.
  CPC ........ *G06F 21/6218* (2013.01); *G06F 21/602* (2013.01); *G06F 21/604* (2013.01)

(58) Field of Classification Search
  CPC .......... G06F 21/00; G06F 21/10; G06F 21/60; G06F 21/62; G06F 21/6209; G06F 21/6218

See application file for complete search history.

(56) References Cited

U.S. PATENT DOCUMENTS

| | | |
|---|---|---|
| 7,197,638 B1 | 3/2007 | Grawrock et al. |
| 7,206,765 B2 * | 4/2007 | Gilliam .................... G06F 21/10 380/201 |
| 7,240,015 B1 | 7/2007 | Karmouch et al. |
| 7,904,940 B1 | 3/2011 | Hernacki et al. |
| 8,549,326 B2 | 10/2013 | Mohamed |
| 9,210,190 B1 * | 12/2015 | Polcha ................ H04L 63/0281 |
| 10,331,895 B1 * | 6/2019 | Roth ...................... G06F 21/602 |
| 2002/0184160 A1 * | 12/2002 | Tadayon ................ G06Q 30/06 705/57 |
| 2004/0039594 A1 | 2/2004 | Narasimhan et al. |
| 2004/0054893 A1 | 3/2004 | Ellis |
| 2005/0114672 A1 | 5/2005 | Duncan et al. |
| 2006/0041751 A1 | 2/2006 | Rogers et al. |
| 2006/0059117 A1 | 3/2006 | Tolson et al. |
| 2006/0129809 A1 * | 6/2006 | Battagin ............. G06F 21/6209 713/166 |
| 2007/0074270 A1 * | 3/2007 | Meehan .................. G06F 21/10 726/2 |
| 2007/0156670 A1 * | 7/2007 | Lim ........................ G06F 9/468 |
| 2007/0244940 A1 * | 10/2007 | Devarakonda ........ G06F 16/221 |
| 2008/0059448 A1 | 3/2008 | Chang et al. |
| 2008/0092239 A1 | 4/2008 | Sitrick et al. |
| 2008/0215897 A1 * | 9/2008 | Doyle .................. H04L 9/0833 713/193 |
| 2008/0288532 A1 * | 11/2008 | Aboukrat ................ G06F 21/84 |

(Continued)

*Primary Examiner* — Eric W Shepperd
(74) *Attorney, Agent, or Firm* — Aka Chan LLP

(57) ABSTRACT

A technique and system protects documents at rest and in motion using declarative policies, access rights, and encryption. Methods, techniques, and systems control access to documents and use of content in documents to support information management policies.

22 Claims, 28 Drawing Sheets

(56) References Cited

U.S. PATENT DOCUMENTS

| | | |
|---|---|---|
| 2009/0249472 A1 | 10/2009 | Litvin et al. |
| 2010/0142517 A1 | 6/2010 | Montemurro et al. |
| 2012/0131135 A1 | 5/2012 | Yamuna et al. |
| 2013/0097421 A1* | 4/2013 | Lim ............... H04L 51/08 713/167 |
| 2013/0124560 A1* | 5/2013 | O'Sullivan ....... G06F 16/951 707/769 |
| 2014/0304762 A1* | 10/2014 | Puri ............... G06F 21/10 726/1 |
| 2015/0095972 A1 | 4/2015 | Sharma et al. |
| 2015/0278486 A1* | 10/2015 | Huang ............ H04L 63/0245 726/1 |
| 2015/0296368 A1 | 10/2015 | Kaufman et al. |
| 2017/0155509 A1* | 6/2017 | Sitrick ............. G06F 21/10 |

* cited by examiner

↗ 1601

User A clicks on a file protection button on a ribbon in an application program Microsoft Excel® where a document "q:\personal_data.xlsx" is opened
1602

A file protection operation in a data protection client is invoked
1603

The data protection client retrieves an access control list of the document
1604

A policy engine selects a subset of policies relevant to the file protection operation, the document and access control list-to-rights conversion
1605

The policy engine evaluates the subset of policies to determine a plurality of rights to grant to User B on the document
1606

User A modifies the plurality of rights granted to User B on the document
1607

The data protection client generates a plurality of discretionary policies to grant the plurality of rights to User B on the document
1608

The data protection client encrypts the plurality of discretionary policies to produce encrypted discretionary policies
1609

The data protection client stores the encrypted discretionary policies and the document in a managed document container
1610

Figure 16

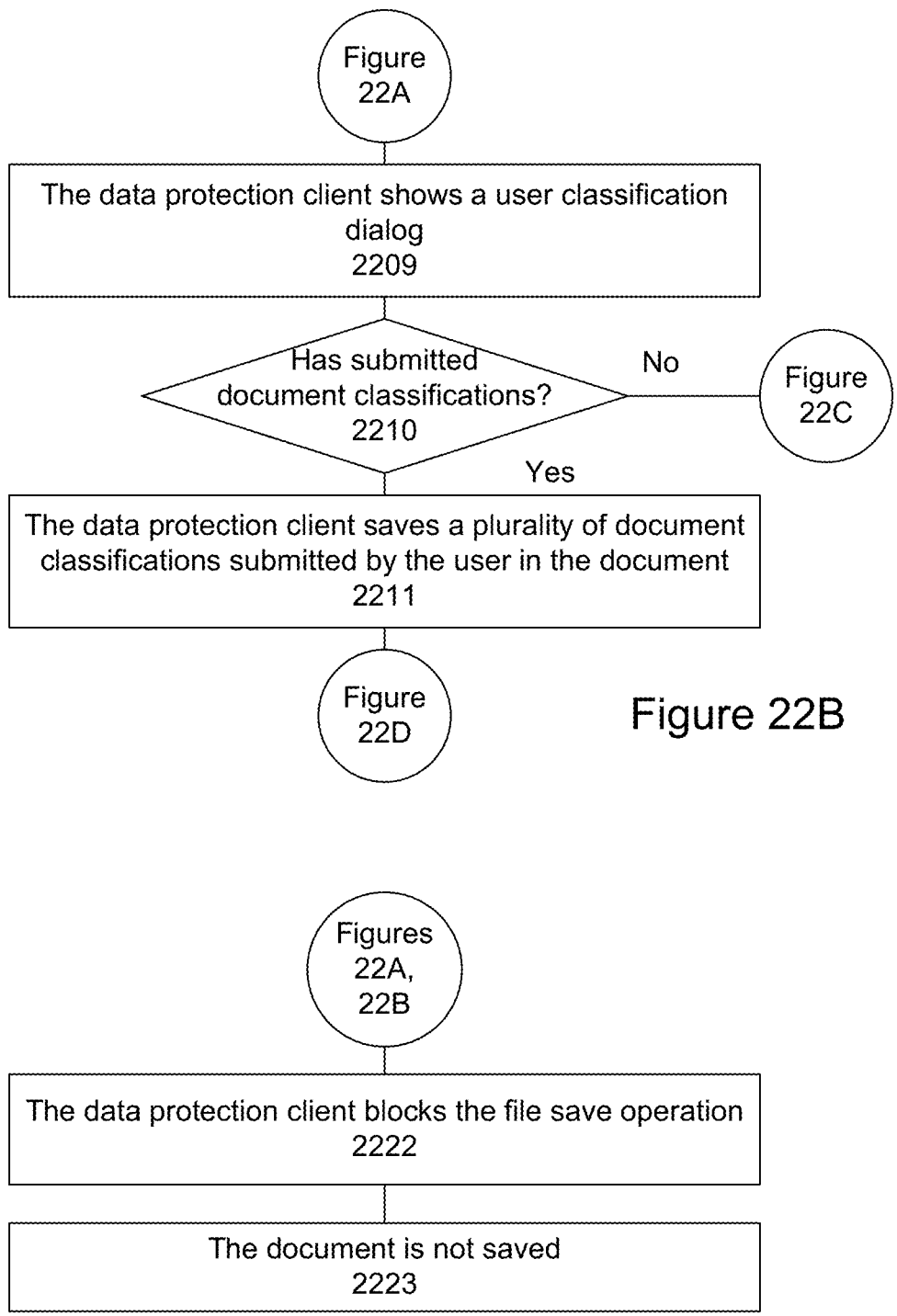

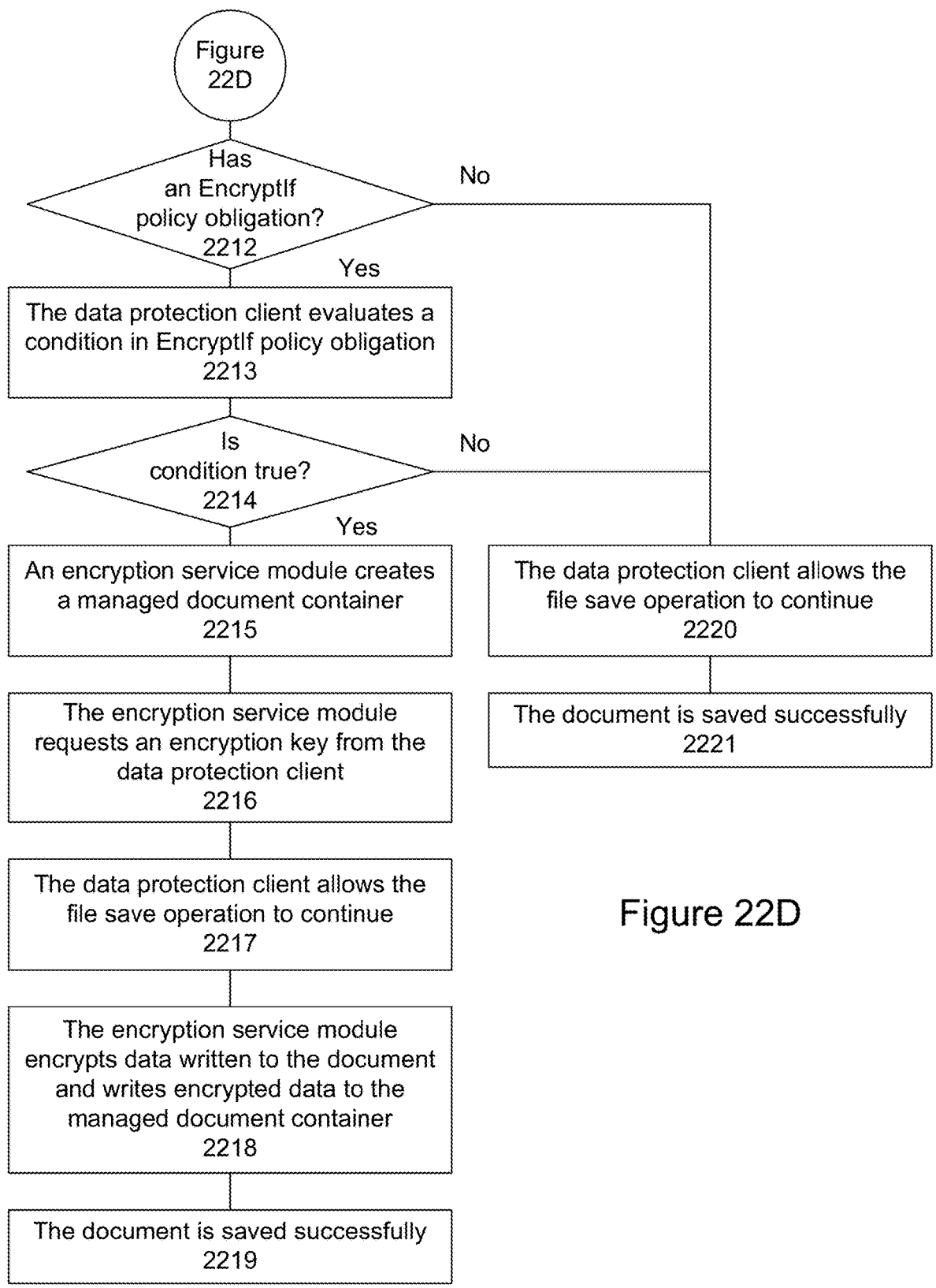

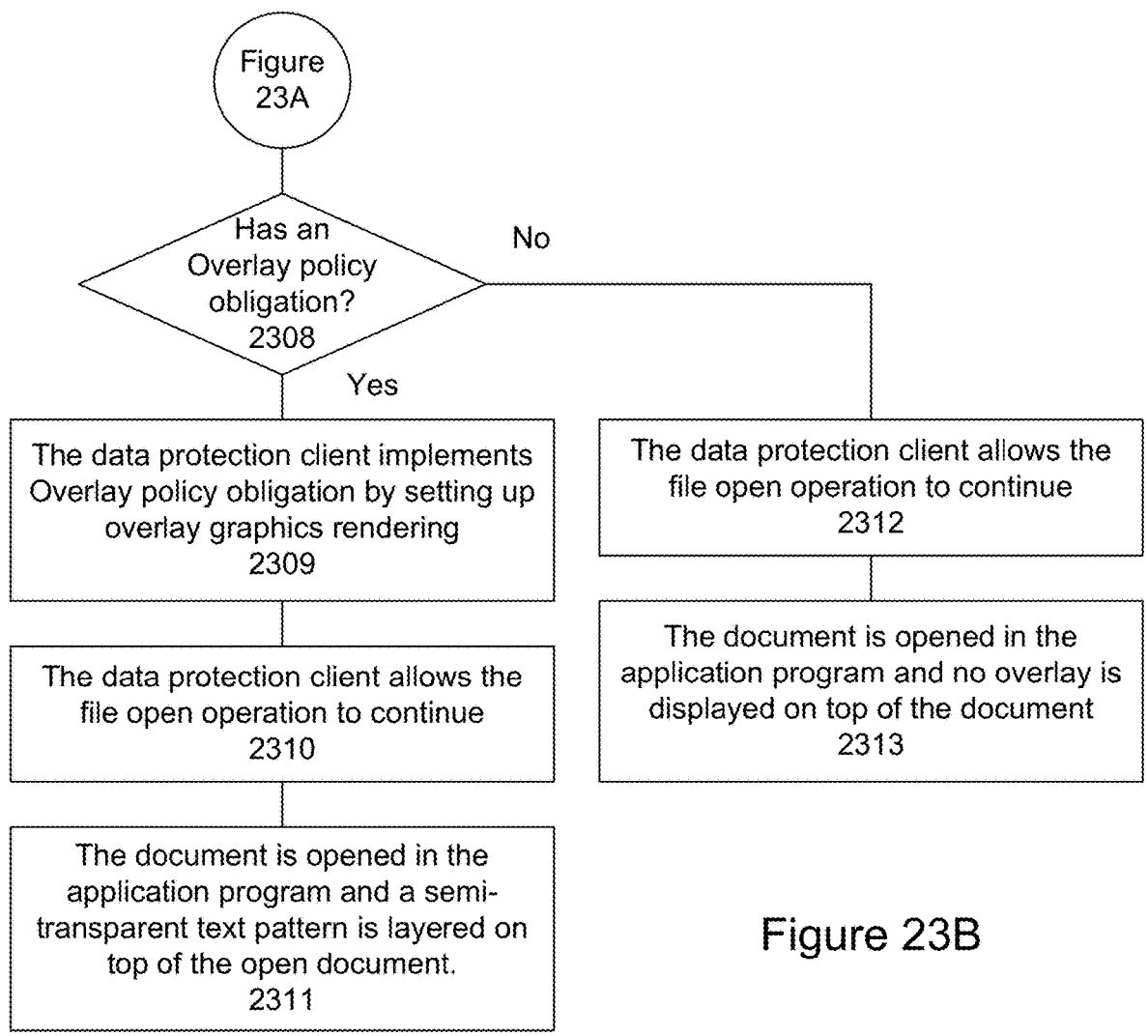

PROTECTING DOCUMENTS WITH CENTRALIZED AND DISCRETIONARY POLICIES

CROSS-REFERENCE TO RELATED APPLICATIONS

This application is a continuation of U.S. patent application Ser. No. 15/268,155, filed Sep. 16, 2016, issued as U.S. Pat. No. 10,387,669 on Aug. 20, 2019, which claims the benefit of U.S. patent applications 62/238,009, filed Oct. 6, 2015, and 62/220,104, field Sep. 17, 2015. These patent applications are incorporated by reference along with all other references cited in this application.

DESCRIPTION

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to the field of information or document management, and more specifically, to protecting documents at rest, in motion and in distribution using declarative policies, access and usage rights and encryption.

Computers have evolved to become repositories for information from all aspects of life, including society's personal and business matters. These vast stores of knowledge are easily accessible through a variety of convenient methods, such as through a network connection. But as reliance on computers has grown, so has the need to keep information, particularly sensitive information, out of the hands of those who may abuse it.

In the business realm, an information management system addresses this need to protect sensitive or high-value information. Some common business challenges that companies look to address include insider theft (e.g., protecting intellectual property from being stolen by personnel working within an organization such as theft by employees or theft by contractors), external sharing (e.g., controlling intellectual property shared with partners or customers), confidentiality (e.g., preserving the confidentiality around sensitive or secret projects) and external collaboration (e.g., limiting third-party use of data).

While these business challenges may seem straight forward, there are many operational or functional challenges associated with implementing an information management system. Some of these operational and functional challenges include classifying information, handling of different data types, controlling access to information, controlling use of information, making information available to users, protecting information at rest, in transit and in distribution, and managing policies and information being managed.

Therefore, there is a need for an improved information management solution.

BRIEF SUMMARY OF THE INVENTION

A technique and system protects documents at rest and in motion using declarative policies, access rights, and encryption. Methods, techniques, and systems control access to documents and use of content in documents to support information management policies.

In an implementation, a method includes: providing a data protection client on a computing device having a first plurality of policies; providing a user attempting to open a document using an application program on the computing device; detecting a file open operation in the application program by the data protection client; sending the file open operation by the data protection client to a policy engine to determine if the file open operation is allowed; selecting a first subset of policies from the first plurality of policies relevant to the file open operation, the document and the user by the policy engine; evaluating the first subset of policies to produce a first policy decision; and determining if the document includes a second plurality of policies.

The method further includes: if the document includes a second plurality of policies, retrieving the second plurality of policies from the document; if the document includes a second plurality of policies, selecting a second subset of policies from the second plurality of policies relevant to the file operation and the user; if the document includes a second plurality of policies, evaluating the second subset of policies to produce a second policy decision; and if the document includes a second plurality of policies, combining the first policy decision and the second policy decision to produce a third policy decision The method further includes: if the document does not include a second plurality of policies, making a third policy decision equals to the first policy decision; if the third policy decision allows the file open operation, allowing the file open operation to continue, wherein the document opens in the application program; and if the third policy decision does not allow the file open operation, blocking the file open operation by the data protection client, wherein the document fails to open in the application program.

In various implementations, the first plurality of policies is sent from a policy server. The first plurality of policies is access or use control policies. The first plurality of policies is rights control policies. The second plurality of policies is discretionary policies. The data protection client instruments the application program to detect application program operations. The detecting a file open operation in the application program by the data protection client is performed in a policy enforcement point of the data protection client. A policy in the first subset of policies is assigned an authority level. A policy in the first subset of policies does not have an authority level.

The authority level can be an integer. The authority level can be a named value. An author of a policy in the second subset of policies is assigned an authority level. The policy in the second subset of policies inherits the authority level from its author. A policy in the second subset of policies does not have an authority level. The first policy decision is one of allow or deny. The second policy decision is one of allow or deny. The combining the first policy decision and the second policy decision to produce a third policy decision, where the third policy decision allows the file open operation if the first policy decision allows the file open operation.

The combining the first policy decision and the second policy decision to produce a third policy decision, wherein the third policy decision does not allow the file open operation if the first policy decision allows the file open operation and the second policy decision does not allow the file open operation. The combining the first policy decision and the second policy decision to produce a third policy decision, wherein the third policy decision allows the file open operation if the first policy decision does not allow the file open operation and the second policy decision allows the file open operation.

The evaluating the first subset of policies to produce a first policy decision further including: determining a first highest authority level in the first subset of policies; and excluding one or more policies from the first subset of policies wherein the one or more policies have authority levels lower than the first highest authority level, wherein the one or more policies are not included in producing a first policy decision.

The document includes a second plurality of policies, evaluating the second subset of policies to produce a second policy decision further including: determining a second highest authority level in the second subset of policies; and excluding one or more policies from the second subset of policies wherein the one or more policies have authority levels lower than the second highest authority level, wherein the one or more policies are not included in producing a second policy decision.

The document includes a second plurality of policies, combining the first policy decision and the second policy decision to produce a third policy decision further including: if the first highest authority level is higher than the second highest authority level, the third policy decision allows the file open operation if the first policy decision allows the file open operation; if the first highest authority level is lower than the second highest authority level, the third policy decision allows the file open operation if the second policy decision allows the file open operation; and if the first highest authority level and the second highest authority level are the same, the third policy decision allows the file open operation if the first policy decision allows the file open operation and the second policy decision allows the file open operation.

The first highest authority level and the second highest authority level are the same, the third policy decision allows the file open operation if the first policy decision allows the file open operation and the second policy decision allows the file open operation is replaced by: if the first highest authority level and the second highest authority level are the same, the third policy decision does not allow the file open operation if the first policy decision allows the file open operation and the second policy decision does not allow the file open operation.

The first highest authority level and the second highest authority level are the same, the third policy decision allows the file open operation if the first policy decision allows the file open operation and the second policy decision allows the file open operation is replaced by: if the first highest authority level and the second highest authority level are the same, the third policy decision allows the file open operation if the first policy decision does not allow the file open operation and the second policy decision allows the file open operation. The blocking the file open operation by the data protection client comprises returning an error code with the file open operation.

In an implementation, a method includes: providing a data protection client on a computing device having a plurality of policies; providing a user attempting to open a document using an application program on the computing device; detecting a file open operation in the application program by the data protection client; sending the file open operation by the data protection client to a policy engine to determine if the file open operation is allowed; and selecting a first subset of policies from the plurality of policies relevant to the file open operation, the document and the user by the policy engine; evaluating the first subset of policies to determine if the file open operation is allowed.

The method further includes: if the file open operation is allowed, selecting a second subset of policies from the plurality of policies relevant to the document and the user by the policy engine; if the file open operation is allowed, analyzing the second subset of policies by the policy engine to produce a plurality of rights granted to the user on the document; if the file open operation is allowed, receiving the plurality of rights granted to the user on the document at the data protection client; if the file open operation is allowed, allowing the file open operation to continue, wherein the document opens in the application program; if the file open operation is allowed, determining if an application program operation is allowed by the data protection client according to the plurality of rights granted to the user on the document; and if the file open operation is not allowed, blocking the file open operation by the data protection client, wherein the document fails to open in the application program.

In an implementation, a method includes: providing a data protection client on a computing device having a plurality of policies; providing a document opened in an application program on the computing device by a first user; receiving a plurality of rights granted to the first user on the document from a policy engine when the policy engine allows opening of the document in the application program; storing the plurality of rights granted in the data protection client; attempting to send the document opened in the application program by the first user to a second user; detecting a file send operation in the application program by the data protection client; determining if the file send operation is allowed according to the plurality of rights granted; if the file send operation is allowed, allowing the file send operation to continue, wherein the document is sent to the second user; and if the file send operation is not allowed, blocking the file send operation by the data protection client, wherein the document is not sent to the second user.

In an implementation, a method of determining, generating, and storing document classifications in a document includes: providing an application program and a data protection client on a computing device; providing a user attempting to save a document opened in the application program; receiving a plurality of policies at the data protection client from a policy server wherein a policy contains at least one expression; detecting a file save operation on the document in the application program by the data protection client; selecting a subset of policies from the plurality of policies relevant to the file save operation, the document and the user; evaluating the subset of policies to determine if the user is allowed to save the document; and if the user is allowed to save the document, determining if the evaluating step has produced a document classification policy obligation.

The method further includes: if the evaluating step has produced a document classification policy obligation, analyzing the file save operation to produce a document classification; if the evaluating step has produced a document classification policy obligation, storing the document classification in the document wherein subsequent access to the document is control by the plurality of polices and the document classification; if the user is allowed to save the document, allowing the file save operation to continue wherein the document is saved successfully; and if the user is not allowed to access the document, blocking the file save operation wherein the document is not saved.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 16 shows an example flow of converting an access control list of a document into discretionary policies according to centralized policies.

FIGS. 22A-22D show an example flow of classifying and encrypting a document according to policies.

FIGS. 23A-23B show an example flow of a data protection client implementing an overlay policy obligation.

DETAILED DESCRIPTION OF THE INVENTION

Figure 1:
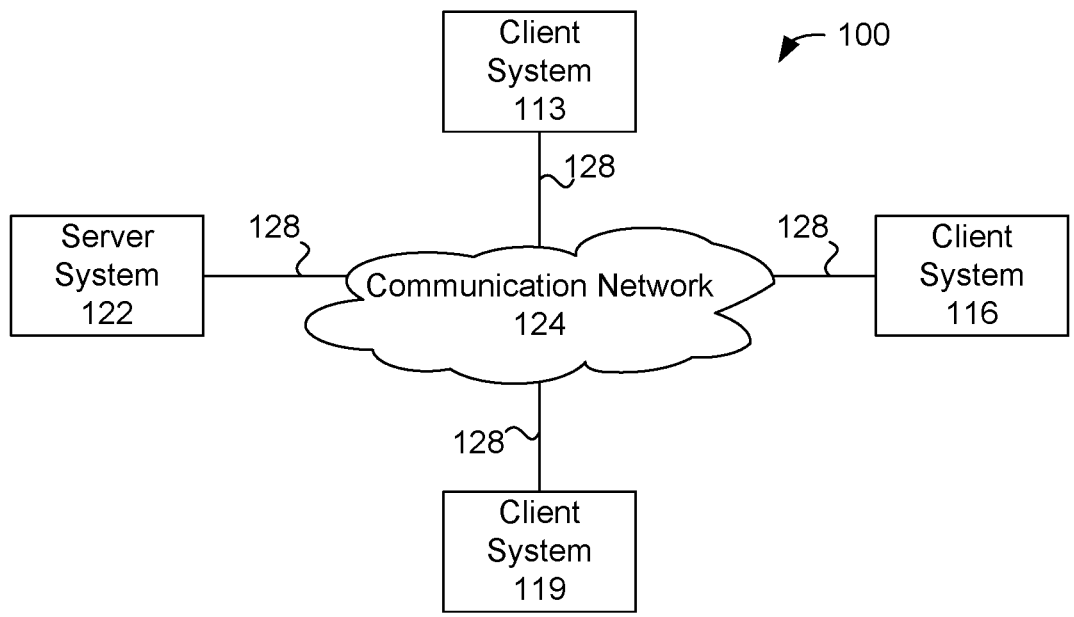
FIG. 1 shows a simplified block diagram of a distributed computer network and clients.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include transmission control protocol/internet protocol (TCP/IP), hypertext transfer protocol (HTTP) protocols, wireless application protocol (WAP), vendor-specific protocols, customized protocols, or others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer® browser by Microsoft Corporation, the Firefox® browser by Mozilla Foundation, the Chrome™ browser by Google Inc., the Safari® browser by Apple Inc., or others. Trademarks are the property of their respective owners.

Figure 2:
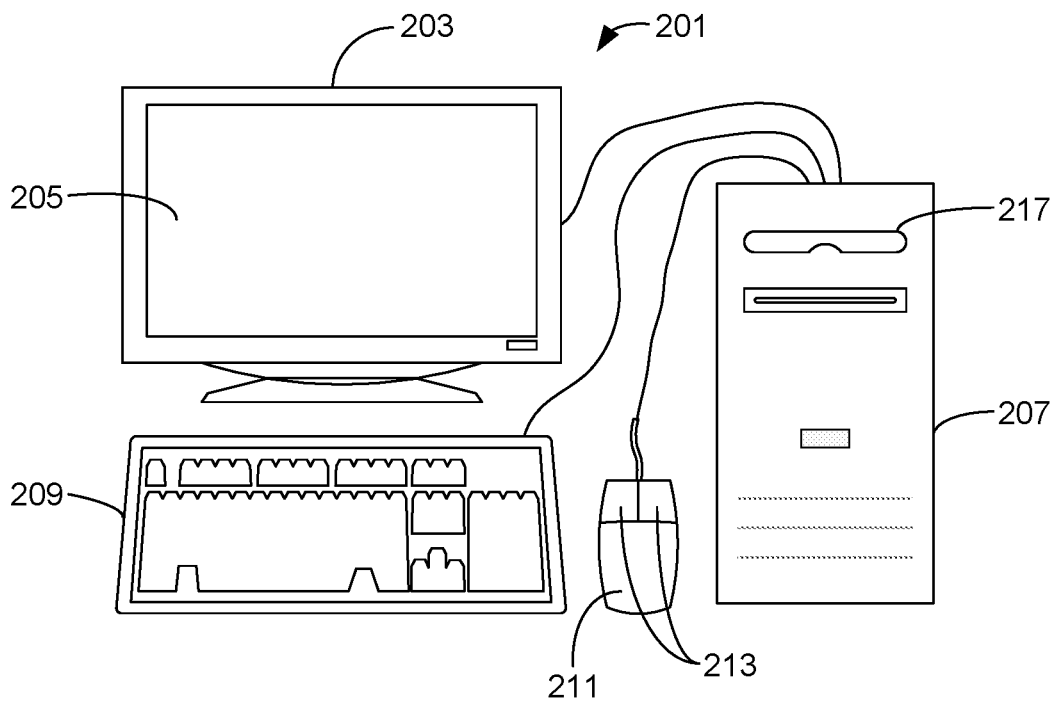
FIG. 2 shows a more detailed diagram of a computer system which may be a client or server.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, universal serial bus (USB) removable storage, magnetic disks, fixed disks, hard disks, hard drives including both magnetic and flash storage in a single drive unit, compact disk-read only memories (CD-ROMs), recordable compact disks (CDs), digital video disks (DVDs), digital video disc recordable (DVD R), digital video disc rewriteable (DVD RW), high definition digital video disc (HD DVD), Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media may also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
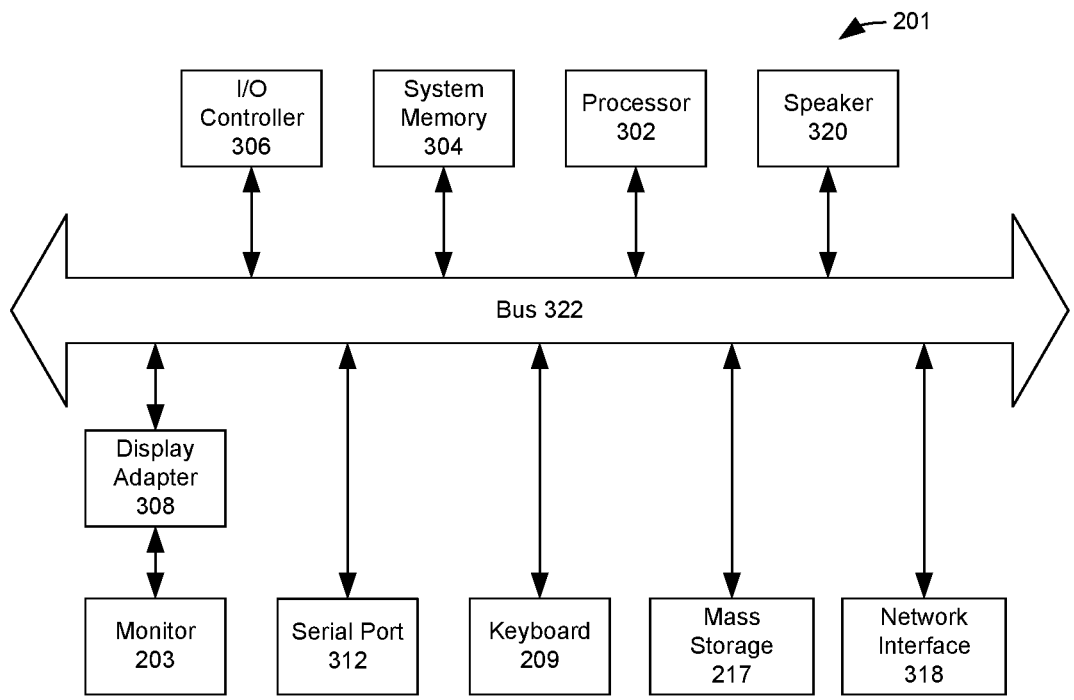
FIG. 3 shows a system block diagram of computer system.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, or Microsoft Xbox 360 central processing unit (CPU).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C #, Pascal, Fortran, Perl, Matlab (from MathWorks, www-.mathworks.com), Statistical Analysis System (SAS), Statistical Package for the Social Sciences (SPSS), JavaScript, Asynchronous JavaScript and XML (AJAX), and Java. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). An operating system for the system may be one of the Microsoft Windows® family of operating systems (e.g., Windows 95, 98, Me, Windows NT, Windows 2000, Windows XP, Windows Vista, Windows 7, Windows CE, Windows Mobile), Linux®, UNIX®, Oracle Solaris®, Canonical Ubuntu®, or Apple OS/X®. Other operating systems may be used. Microsoft Windows is a trademark of Microsoft Corporation. Trademarks are the property of their respective owners.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

This patent application incorporates by reference U.S. patent applications 60/755,019, filed Dec. 29, 2005, 60/776, 036, filed Dec. 29, 2005, 60/743,121, filed Jan. 11, 2006, 60/821,050, filed Aug. 1, 2006, 60/870,195, filed Dec. 15, 2006, 61/357,016, filed Jun. 21, 2010, 61/368,408, filed Jul. 28, 2010, and 61/471,682, filed Apr. 4, 2011, Ser. No. 11/383,159, filed May 12, 2006, Ser. No. 11/383,159, filed May 12, 2006, Ser. No. 11/383,161, filed May 12, 2006, Ser. No. 11/383,164, filed May 12, 2006, Ser. No. 11/615,477, filed Dec. 22, 2006, Ser. No. 13/165,730, filed Jun. 21, 2011, Ser. No. 13/193,588, filed Jul. 28, 2011, and Ser. No. 13/439,827, filed Apr. 4, 2012.

To provide basic access control function to objects (e.g., files or processes) in a computing environment, most modern operating systems implement access control list (ACL) on objects. An ACL specifies which users or system processes are granted access to an object and what operations are allowed on the object. Typically, an ACL composes of a list of access control entries. Each access control entry specifies a user and one or more permitted operations. For example, a file object may contain an ACL that specifies (e.g., Jeff: read) and (e.g., George: read, write).

In an embodiment, an information management system employs a plurality of policies, a plurality of data protection clients, a plurality of container service modules, a plurality of encryption service modules, or any combination thereof to provide protection to information or documents. A data protection client may include policy enforcer, rights management client, or others. An information management system protects information or documents in place, created for temporary use, stored in managed document containers, or more. Policy, data protection client, policy enforcer, rights management client, container service module, encryption service module and managed document container are described further below.

Information includes data in a relational database, in an enterprise resource planning (ERP) system, in a product lifecycle management (PLM) system, in a collaboration system such as Microsoft SharePoint®, on a Web server, data delivered to an Systems, Applications and Products (SAP®) client application (e.g., information about an employee) by an SAP® human resource module running on a server, or others.

A document encompasses objects such as a file, compound document, e-mail message, web page, on-line report, on-line form, discussion thread, result set generated by a database query, on-line form, bitmap, file system object, data object managed by a document management system, data object managed by a content management server, data object in a product lifecycle management system, source code file or code fragment managed by a source code management system, data object managed by a configuration management system, data object managed by a project management system, data object in an enterprise resource planning system, data object in a customer relationship management system, data object managed or served, or both, by a portal server, data object served by a web server, data object managed or served by any application server, or any unit of information content stored using volatile or nonvolatile memory.

A document may be a file system or non-file system object. For example, a file system object may be a word processing file, spreadsheet file, Adobe® PDF file, 2D computer-aided drafting (CAD) data file, 3D computer-aided drafting (CAD) data file, or others. A non-file system object may be an e-mail message, attachment of an e-mail message, file in an archive such as a zip file or Adobe® Portfolio, or others. Examples of file systems include file allocation table (FAT), Microsoft® new technology file system (NTFS), Apple OS/X® Extended, compact disc file system (CDFS), hierarchical file system (I-IFS), ext2, ext3, international standards organization (ISO) 9660, operation data store-5 (ODS 5) or universal disk format (UDF).

A document may be stored in memory or a disk of a computing device, removable storage device, document repository, database, another document, document archive, or more. If a document is a file, the file may be stored on a disk or memory of a computing device, file server, database, document management system, intranet or Internet file store, cloud storage, removable hard disk or flash drive, CD-ROM, DVD, or more. A computing device may include a desktop computer, laptop computer, tablet computer, smartphone, file server, information kiosk, augmented reality system, navigation system, or others. A cloud storage may include Apple® iCloud, Amazon S3®, Dropbox, Box®, Microsoft® SkyDrive, Microsoft OneDrive®, Google Drive™, or others. Trademarks are the property of their respective owners.

In an embodiment, a policy that is used to control access to and use of information or a document may be defined independent of a user, information, or a document. A policy may be defined (or created) before a user who is affected by the policy is added to an information management system. Similarly, a policy may be defined in an information management system before information or a document is created, yet access to the information or document is controlled by the policy. A new policy may be defined or an existing policy may be updated after information or a document is created. The new or existing policy will control access to or use of the information or document once it is deployed. In another word, policies in an information management system is not static which is unlike how policies work in many digital rights management systems.

Control and protection functions of information or documents may be achieved either through one policy or multiple policies defined centrally. A policy server is an intelligent system that has the ability to decide if a single or multiple policies or subset of policies are applicable to a data protection client. A plurality of policies is stored in a policy database accessible by a policy server. A policy database may be implemented using a relational database, object-oriented database, object repository, extensible markup language (XML) file, data file, or others. The plurality of policies or a subset of the plurality of policies may be distributed to one or more data protection clients. At least a subset of all policies defined in an information management system is distributed to a data protection client.

Controlling access to information or documents includes allowing or denying opening a file, renaming a file, deleting a file, opening a web page, opening a document listing screen of a SAP® client application, or more.

Controlling use of information or documents includes allowing or denying copying content of a document, printing a document, saving a document into a different file, copying a file, attaching a file to an e-mail message, adding a file to an archive such as a zip file, stored a file into a document, merging two documents, sending an e-mail message to a recipient, uploading a file to a Web site, or more. In an example, if an application is an enterprise resource planning (ERP) application, use of information or a document includes creating a quote, converting a quote to an order, viewing customer information, viewing an order, viewing product pricing and discounts, viewing sales data, viewing reports or viewing employee information. In another example, if an application is a product lifecycle management (PLM) application, use of information or a document includes creating a marketing plan, viewing a product design, viewing a 3D computer-aided design (CAD) drawing, viewing production schedule, updating a bill of materials or viewing a report.

Controlling access to and use of information and documents may be implemented using access control policies (which sometimes referred to as access policies), use control policies (which sometimes referred to as usage policies), rights control policies (which sometimes referred to as rights policies or digital rights policies), or any combination thereof.

A data protection client controls access to and use of information or documents by attaching itself to (or instrumenting) an application program that is used to access information or documents to intercept (or detect, or sense) one or more application program operations. When a data protection client intercepts an application program operation, it sends the application program operation along with information relevant to the application program operation to a policy engine (described further below) to perform policy evaluation. The policy engine selects and evaluates one or more policies (or rules) relevant to the application program operation to determine if the application program operation should be carried out. For an access, use or rights control policy, a decision from policy evaluation includes policy effect ALLOW or DENY. In addition to policy effect, policy evaluation may produce a policy obligation (described below), optionally. A data protection client enforces a policy effect of policy evaluation and implements one or more policy obligations. If policy effect is ALLOW, an enforcement action is to do nothing, thereby allowing an application program operation to be carried out to completion. If policy effect is DENY, an enforcement action is to block an application program operation.

Examples of application programs include word processor (e.g., Microsoft® Word or Apple Pages®), spreadsheet (e.g., Microsoft Excel® or Apple Numbers®), presentation program (e.g., Microsoft PowerPoint® or Apple Keynote®), document viewer (e.g., Adobe Reader® or Microsoft® XPS Viewer), web browser (e.g., Microsoft Internet Explorer®, Mozilla Firefox®, Apple Safari®, Google Chrome™ or Microsoft® Edge), e-mail client (e.g., Microsoft Outlook® or Apple® Mail), instant messenger (e.g., Microsoft® Office Communicator, Microsoft Skype®), and many others. Trademarks are the property of their respective owners.

Examples of application program operations include opening a file, copy a file, moving a file, renaming a file, deleting a file, printing a document, copying content of a document, changing document classification, saving a document into a different file, uploading a file to a Web site, opening a web page, showing a data page of an application (e.g., a component listing on a SAP® client application, a product plan or design page on an Dassault Systèmes Enovia™ client, a marketing plan or product specification on a Microsoft SharePoint® page), sending an e-mail message, attaching a file to an e-mail message, sending a message through instant messenger, inviting a user to join a video conference, capturing a screen image, and many others.

In an embodiment, a data protection client controls access to encryption keys used by an encryption service module or a managed application program to encrypt and decrypt documents. A data protection client does not provide an encryption key to an unmanaged application program that is allowed to read or write an encrypted document by the data protection client. Instead, an encryption key is provided to an encryption service module and encryption or decryption occurs in the encryption service module transparent to the unmanaged application program. In another word, an encryption key is under the control of an information management system at all times and it is not exposed to an unmanaged application programs that are allowed access to unencrypted content at any time.

A managed application program is an application program provided by an information management system or trusted (i.e., authorized or certified) by the information management system to handle encryption keys and other encryption related materials securely. An unmanaged application program is an application program that is not entrusted by an information management system to handle encryption keys. An example of a managed application program is an utility application program provided by an information management system to recover an encrypted document. Some examples of unmanaged application programs are Microsoft® Word, Microsoft Outlook®, Adobe Reader®, Apple Pages®, or others.

In an embodiment, a container service module provides access to content of a document in a managed document container (described below) to an application program. It makes access to content of a document in a managed document container transparent to an application program thereby an application program may access content of a document without being aware of the document being stored in a managed document container. With a container service module, an application program does not need to be altered to access a document in a managed document container. A container service module also provides access to metadata in a managed document container to a data protection client.

In an embodiment, an encryption service module encrypts a document or decrypts an encrypted document independent of an application program thereby encryption and decryption are transparent to the application program that accesses the document. An encryption service module also performs the functions of a container service module. An encryption service module does not perform access control decision or enforcement on a document. All access control decisions and enforcements on a document are performed by a data protection client.

One aspect of the information management system is to protect information or documents in place. Protecting information or documents in place refers to an information management system that provides protection to information or documents without altering the location or method on how the information or documents are being stored. Another aspect of the information management system is to protect information or documents by storing the information or documents in a managed document container. Storing information or a document in a managed document container allows the information management system to protect information or a document in any data or file format across disparate computing or storage environments.

A managed document container (sometimes referred to as a protected document) is a file or data object that stores information or a document to be protected and metadata used by a data protection client to protect the information or document. A managed document container may also store metadata not used by a data protection client to protect information or a document. Metadata may include attributes, keywords, lineage, discretionary policies, access and use history, and many others.

A managed document container may be a universal document container or a retrofitted document container. A universal document container is a file or data object created by an information management system to store information or a document it protects. A universal document container may also store metadata used by a data protection client to protect information or a document. Information or a document of any format may be stored in a universal document container. Whereas, a retrofitted document container is a file or data object created by an application program (e.g., Microsoft® Word) and the file or data object is not created for the purpose of providing information security. Metadata used by a data protection client to protect information or a document is stored in the file or data object. An example of a universal document container is NextLabs portable encrypted document. Portable encrypted document is described in detail in U.S. patent application Ser. No. 13/439,827, filed Apr. 4, 2012, which is incorporated by reference. Examples of retrofitted document containers include Microsoft® Office document (e.g., .docx, .xlsx and .pptx files), Adobe® PDF file, XML document, multipurpose internet mail extensions (MIME) object (e.g., an e-mail message), or many others. Trademarks are the property of their respective owners.

To provide access and use controls to information or documents in a heterogeneous environment where information or documents may be accessed from different types of computing devices and the computing devices may be running different operating systems, a managed document container provides a consistent means to carry metadata necessary for an information management system to enforce access, use or rights control policies on the information or documents. By encrypting information or documents stored in managed document containers, an information management system provides persistent protection to the information or documents while they are at rest, in motion or in distribution. Some examples of operating systems include Microsoft Windows®, Apple OS/X®, Apple® iOS, Linux®, Google Android™, The Open Group UNIX®, or others. Trademarks are the property of their respective owners.

In an embodiment, encryption key management is coupled with access control where encryption keys are securely managed by a data protection client on a computing device and the data protection client makes an encryption key available to an encryption service module only if a user is authorized to access information or a document and an application program that accesses the information or document is to be trusted. An application program may be trusted if it has the ability to protect unencrypted content according to policies of an information management system. More details on how to determine if an application program may be trusted is described further below.

The present invention enforces access control policies, use control policies, rights control policies, or a combination of these to protection information or documents. Access, use and rights control policies are declarative policies. In an embodiment, a policy language is declarative. This means policies may be used to make declarative statement of policy without burdened by implementation details. The declarative aspect of the policy language is another benefit provided by providing abstraction. For example, an access control policy may specify who may access a resource (e.g., a file) on what device in what time period. A use control policy may specify how a user may use (e.g., e-mail, print or edit) a resource in a particular computing environment or location. A rights control policy may specify who may read but not e-mail, print or duplicate a resource (e.g., a file). A typical access or use control policy specifies one or more actions that the policy may be applied. An access or use control policy specifies what action (e.g., open, save or send) a user may perform on a resource. On the other hand, a rights control policy specifies what rights (e.g., view, save or copy) a user may have or not have (i.e., granted or revoked) on a resource. Many policy objectives may be achieved using either access, use or rights control policies. In fact, a particular policy objective may be implemented using access control policies, use control policies, rights control policies, or a combination of two or more types of policies. Access or use control policies are described in detail in U.S. patent application Ser. No. 11/615,477, filed Dec. 22, 2006 and U.S. patent applications aforementioned and incorporated by reference.

NextLabs's Compliant Enterprise Active Control Policy Language™ (ACPL) is one example of a policy language of the invention and is provided to help one more easily understand the invention. There are many variations to a policy language according to the invention and such a policy language is not limited to what is described for the ACPL language. The invention includes features that are not in the ACPL language implementation presented. A policy language of the invention may include one or more features of the ACPL language. A policy language of the invention includes features that are not in the ACPL language. A policy language of the invention may include one or more features of the ACPL language in combination with features that are not in the ACPL language. More detailed information about the ACPL language may be found in U.S. patent applications 60/870,195, filed Dec. 15, 2006 and Ser. No. 11/615,477, filed Dec. 22, 2006, which are incorporated by reference. Trademarks are the property of their respective owners.

Another aspect is that the policy language may allow policies to be nested. One policy may call or delegate control to another policy. There may be multiple levels of nesting.

Further, a policy may optionally contain a scope that it belongs to. Normally scoping is determined automatically.

A policy may be a reaction policy or maintenance policy. A reaction policy is a policy which is triggered by an application program operation (or user action) such as a user opening a file or sending an e-mail message. A maintenance (or administrative) policy is a policy that is triggered by a scheduler. A scheduler is an application program that causes a maintenance policy to execute at a certain time, such as daily, weekly, or monthly, upon another non-action event, or created by a reaction policy. Implementations of the invention may include reaction policies, maintenance policies, or both.

A policy may be defined based on type of action, type of right, user, user group, user attribute (e.g., department, role, project, status (e.g., full-time, part-time or consultant) or user's business function), e-mail address, mailing list, host, group of computers (e.g., finance department computers), type of computer (e.g., desktop, laptop, tablet or smart phone), application program (e.g., Microsoft® Word, Microsoft Excel®, Microsoft PowerPoint®, Microsoft Visio®, Microsoft Outlook®, Microsoft Internet Explorer®, Google Chrome™ Mozilla FireFox®, Microsoft Skype® or Adobe Reader®), type of application program (e.g., word processor, spreadsheet, database, web browser, instant messenger or file viewer), application module (e.g., SAP® customer relationship management module, Microsoft SharePoint® or Oracle® accounting module), location (e.g., New York office, London office, airport, hotel, café, or customer site), connectivity (including access mechanism and bandwidth; e.g., local-area network (LAN), wireless local area network (WLAN), virtual private network (VPN), cellular network, Bluetooth, Internet, digital subscriber line (DSL), integrated services digital network (ISDN), dialup, remote desktop protocol (RDP), virtual network computing (VNC) protocol, latency, secure point-to-point, 56 k, broadband, 100 megabit per second or 1 gigabit per second), time of day, day of the week, file path, file name, document size, document timestamp, document owner, document properties, document type (e.g., file, web page or e-mail), document format (e.g., XLS, PDF or HTML format), document identifier, document classification (e.g., confidential document or financial report), document characteristics (e.g., contains a watermark), document content (e.g., contains social security number), database query, database query result set, database query result set properties, metadata, a combination of these, or more. Not all of these parameters are required. A data protection client may interpret any one or combination of these parameters. Trademarks are the property of their respective owners.

A policy language for the information management system of the invention includes policies and policy abstractions. Policies may also be referred to as rules or policy objects, and policy abstractions may also be referred to as abstractions, abstraction objects or variables. There may be any number of policies, abstractions, or both. Typically, an information management system has hundreds, thousands, millions, or greater number of rules. Because many rules are needed typically to manage information in a company effectively, abstractions may be used to simplify maintenance of the rules and there should be a system to effectively managing the policies and abstractions.

When applied to information control, a policy object may represent a statement that describes a document access or usage situation and define what action a data protection client should take when that situation arises. In addition, a policy object may also represent a statement that describes the rights users have on documents whereby declaring what a user may do or not do with a document. In effect, a policy object represents a rule (or a plurality of rules) controlling how different categories of users in an organization are allowed to use different categories of documents. For example, one may construct policy objects as a combination of abstraction objects that are linked together with operators and other logical constraints, and then further refine the policy objects by applying contextual conditions, such as time of the day. Typically, an organization will construct enough policy objects to cover all potential business situations where some kind of information control is required.

In an embodiment, a policy object may comprise of a set of predefined building blocks (or abstraction objects) strung together according to a precise syntax. Because the abstraction objects are logical representation of specific physical entities, policy objects constructed based on the abstraction objects also possess great flexibility in covering activities (or actions) and entities in the physical network with little regard to how the activities and entities change and evolve over time.

In an embodiment where policy objects are applied to information control, three types of policies (or policy objects) may be defined: access control policies, use control policies or rights control policies. The differences between the types of policies are where the policies are deployed and what type of user activity they control.

In the implementation of information use control, an entity object layer comprises of a plurality of entity objects representing any of: resource (e.g., file, e-mail message, web page, on-line report or result set of a database query), user, action, time, location, connectivity (e.g., VPN, WLAN, dialup, RDP, virtual network computing (VNC) or latency), application program (e.g., Microsoft® Word, SAP® client application program, Microsoft SharePoint®, spreadsheet or instant messenger), or more. An entity object may comprise of a name (or identity) and a value. A value may be an integer, floating point number, Boolean value, string or reference. Further, an entity object may also comprise of a name and multiple values, or a name and a data object. In an embodiment, entity objects may be stored in a lightweight directory access protocol (LDAP) server, database, system registry, configuration file, or a combination of these. An entity object may be reference by its name (or identity). In an embodiment, an entity object is called one of event, resource, subject or context in a policy language described further below. For example, a reference to an entity object may take the form of: user="John Doe," action=OPEN, application="Microsoft Word," computer="Jane's desktop," or location="Boston Office." Trademarks are the property of their respective owners.

In the implementation of information use control, an abstraction object layer comprises a plurality of abstraction objects. An abstraction object is typically a logical representation a plurality of entity objects. An abstraction object may comprise of a name (or identity) and an expression that refers to one or more entity objects. An abstraction object may also refer to another abstraction object. One or more abstraction object may refer to a particular entity objects in the entity object layer. In an embodiment, an abstraction object is called a policy abstraction in a policy language described further below. For example, a reference to a policy abstraction may take the form of: user=Finance, document=Legal-Documents, computer=Guest-Workstations, application=Instant-Messenger, location=Branch-Office, or connectivity=Remote.

A policy (or rule) includes an expression. A premise may be an expression or statement. More specifically, a premise may contain an expression, and an expression may be a statement. An expression may be "a=true and b=c." An expression may also include a comma delimited list. For example, one may check whether an action is one of the actions listed in a comma delimited list. A statement may be "FOR expression ON expression BY expression DO statement," or any non-logical or mathematical expression. A statement includes expressions, potentially multiple expressions, each of which may be nested. A statement may also include nested statements.

policy:=premise+consequence+directives

An access or use control policy may be used to permit or block an application program operation access to or use of a resource. A resource includes information or a document described above. The general form of an access or use control policy includes at least one resource, one action (e.g., open or edit), one user, one effect (e.g., allow or deny) and optionally a condition. For example, an access policy may specify only a user in a group Executive may open a document classified as Financial and Confidential when a computer is connected to a network in the office. A use control policy may specify all users may not send a document classified as "top secret" in an e-mail message.

In an example, access or use control policies share the same syntax. An access control policy may be used to allow or deny access by one or more users to one or more resources. Similarly, a use control policy may be used to allow or deny an action by one or more users on one or more resources. The access or use control policy syntax is:
FOR<resource>
ON<action>
BY<user>
[WHERE<condition>]
DO ALLOW|DENY [, <obligation>]

A FOR clause specifies a collection of resources an access or use control policy is applied to. A resource includes information or a document described above. The collection of resources may include a named resource, a resource where its attribute is matching a pattern, a resource abstraction, or others. A ON clause specifies a collection of actions an access or use control policy is applied to. An action often maps to an application program operation. Sometimes, an action translates to a sequence of application program operations. Some examples of actions include open, save, print, edit, copy, upload, delete, send, change attribute, classify, or others. A BY clause specifies a collection of users an access or use control policy is applied to. The collection of users may include a named user, a named user group, a user abstraction, a user where the user's attribute is matching a pattern, or others. A WHERE clause specifies a condition where an access or use control policy is applicable when the condition is evaluated to true. A WHERE clause is optional. A condition may specify a location, time, time range, connection type, application program, device type, computer, security level, if a particular software is installed, if an antivirus definition is up-to-date, or others. A DO clause specifies an effect when all preceding clauses matched successfully. The effect may be ALLOW, DENY, or others. A DO clause may also specify an obligation (sometimes referred to as policy obligation), optionally. An obligation is a task that should be performed and an obligation may be adopted when an effect is ALLOW, DENY, or both.

In an implementation, an information management system denies all actions by a user by default. Any action that a user is allowed to perform is allowed by an access or use control policy. In an implementation, an information management system allows all actions by a user by default. Any action that a user is not allowed to perform is denied by an access or use control policy.

Access or use control policies including their syntax, applications, deployment and evaluation are described in detail in U.S. patent application Ser. No. 11/615,477, filed Dec. 22, 2006 and U.S. patent applications aforementioned and incorporated by reference.

In an example, rights control policies adopt a syntax similar to access or use control policies. A rights control policy is different from an access or use control policy in that a rights control policy specifies one or more rights a user may have on a resource whereas an access or use control policy specifies what actions a user is allowed (or denied) to perform on a resource. Rights control policies and access or use control policies have similar applications—controlling access to and use of a resource.

A rights control policy may be used to grant a right to a user or revoke a right granted to a user. The general form of a rights control policy includes at least one resource and at least one user. In addition, a rights control policy may also include one or more options specifying a condition such as a time, location, connectivity type, security level of a client computer, or more. For example, a rights control policy may describe: grant one or more rights to one or more users on one or more resources; grant a right to a user on all resources under a condition; or revoke a right from a user on a resource. The rights control policy syntax is:
GRANT|REVOKE<rights>RIGHT|RIGHTS
TO<user>
ON<resource>
[WHERE<condition>]
[DO<obligation>]

A rights control policy may either grant rights to or revoke rights from one or more users on one or more resources. A right is sometimes referred to as a digital right. To grant one or more rights, a rights control policy starts with the keyword GRANT. Similarly, to revoke one or more rights, a rights control policy starts with the keyword REVOKE. A TO clause specifies a collection of users a rights control policy is applied to. The collection of users may include a named user, a named user group, a user abstraction, a user where the user's attribute is matching a pattern, or others. A ON clause specifies a collection of resources a rights control policy is applied to. The collection of resources may include a named resource, a resource where its attribute is matching a pattern, a resource abstraction, or others. A WHERE clause specifies a condition where the rights control policy is applicable when the condition is evaluated to true. A WHERE clause is optional. A condition may specify a location, time, time range, connection type, application program, device type, computer, security level, if a particular software is installed, if an antivirus definition is up-to-date, or others. A DO clause specifies an obligation (sometimes referred to as policy obligation). A DO clause is optional. An obligation is a task that should be performed.

The rights (or digital rights) in rights control policies and their definitions are specific to an information management system. Some examples of rights that may be granted to or revoked from a user include view, edit, copy, extract, convert, print, send, decrypt, annotate, classify, assign, screen capture, CAD product manufacturing information, or many others.

A user who is granted a view right may open and read information or a document. A user who is granted print right may print part or all of an opened information or document to a printer or a file. A rights control policy that grants a user view or print right may also specify a security overlay policy obligation. A security overlay policy obligation may specify a text or image pattern to be displayed on top of information or a document when the information or document is being displayed or printed. If a text pattern is specified, the text pattern may include a document name, document classification, name of current user, date and time, compute name, static text string, or others. For example, a text pattern security overlay displays "Top Secret, Do Not Distribute, John Doe, Mar. 1, 2015, Desktop 1234". A data protection client implements a security overlay policy obligation by placing a semi-transparent layer of graphics rendering the text or image pattern specified by the security overlay policy obligation on top of the information or document being displayed or printed (i.e., similar to a watermark). A user who is granted a CAD product manufacturing information right is shown product manufacturing information when the user views a CAD drawing.

A user who is granted an edit right may modify an opened information or document and save modifications to the opened information or document. A user who is granted a copy right may create a copy of an opened information or document. A copy is required to have the same file format as the original. A common application program operation associated with a copy right is a "Save As" operation under a File menu. Other file operations that are controlled by a copy right include optimizing file size, reducing file size and saving in a different version of the same file format. A user who is granted an annotate right may add a comment to or highlight an opened information or document.

A user who is granted an extract right may copy content of an opened information or document to a clipboard or another document. A user with an extract right may also extract an attachment from an opened information or document. A user who is granted a convert right may convert information or a document written in a first document format to information or a document in a second document format where the first document format and the second document format are different. Typically, a convert right allows a user to use a "Save As" or Convert operation on a File menu to save an opened information or document to a new document with a document format different from that of the opened information or document.

A user who is granted a decrypt right may unwrap a managed document container. Unwrapping a managed document container decrypts a document in a managed document container and saves the decrypted document as a file. A user with a decrypt right but not a view right will not be able to view the decrypted document.

A user who is granted a screen capture right may take a screen shot of an opened information or document. If a user is not granted a screen capture right, the user may not capture a screen image using print screen function including any operation invoked by a print screen key in Microsoft Windows® environment. In addition, the user may not capture the protected information or document using a screen or window capture application program (e.g., Microsoft® Clipping Tool).

A user who is granted a send right may e-mail to a recipient an opened information or document from an application program that is used to open the information or document. In an implementation where encryption is transparent to an application program, the default behavior of an application program not instrumented by a data protection client is to e-mail an unencrypted rendition of the opened information or document to the recipient. To prevent loss of protection to an encrypted document, a data protection client modifies an application program operation that sends an opened information or document to send an encrypted rendition of the opened information or document.

A user who is granted a classify right may change classifications of information or a document. A user who is granted an assign right may change discretionary rights such as granting, revoking or modifying rights on information or a document.

The rights described herein are for illustration purpose only. An information system may enforce a different set of rights using the techniques described in this document. Variations such as naming of a right, adding a new right, deleting an existing right, or modifying definition of an existing right may be accommodated easily. For example, a send right may be modified to enforce uploading of information or a document to a website; an upload right may be added to enforce uploading of information or a document to a website; or a copy right may be renamed as a duplicate right.

An information management system may implement rights control policies or rights enforcement at a plurality of policy enforcement points (described further below) to protect a plurality of information or documents.

The role of a data protection client is to protect sensitive or high-value information or documents from unauthorized access or misuse. The types of information or documents a data protection client needs to protect and the environment it needs to operate under affects its implementation. Some examples of data protection clients include policy enforcer, rights management client, lightweight enforcer, on-demand enforcer, or rights management container. Policy enforcer is described in detail in U.S. patent application Ser. Nos. 11/383,159, 11/383,161, and 11/383,164, filed May 12, 2006, Ser. No. 11/615,477, filed Dec. 22, 2006 and Ser. No. 13/439,827, filed Apr. 4, 2012, which are incorporated by reference. Rights management client, lightweight enforcer, on-demand enforcer and rights management container are described in U.S. patent application Ser. No. 13/439,827, filed Apr. 4, 2012, which is incorporated by reference. A data protection client described in the aforementioned references may be extended to support rights control policies, rights enforcement and discretionary policies, which are described below.

A policy enforcer may be deployed to protect a wide range of information or documents accessible from a desktop or laptop computer. A policy enforcer is a module or computer code, executing on a computer that is used to protect information or documents by controlling access to, use of, or rights to the information or documents. Some example operations a policy enforcer controls are whether to allow: open operations (e.g., whether a user may open a document with Microsoft® Word), edit operation (e.g., whether a user may copy from one document into another document, or whether a user may modify an e-mail's text), and many others.

On the other hand, if the objective is to protect copying of high-value documents such as Microsoft® Office documents or Adobe® PDF documents, a rights management client may be deployed.

When a data protection client is deployed on a personal computing device, a data protection client may include a tamper resistance module to protect the data protection client from being tampered with thereby protecting the integrity of the data protection client. A tamper resistance module implements a plurality of defense mechanisms to prevent unauthorized alteration of data protection client operations including disabling a data protection client, uninstalling a data protection client, changing policies in local policy repository, disabling an auditor, reading or copying encryption keys, or more.

A data protection client described in this document implements functions of a policy enforcement point such as in U.S. patent application Ser. Nos. 11/383,159, 11/383,161, and 11/383,164, filed May 12, 2006, and Ser. No. 11/615,477, filed Dec. 22, 2006, which are incorporated by reference. A data protection client may also implement functions of a policy decision point described in the same references. In addition, a policy enforcement point described in the references may be extended to support rights enforcement as described further below in this document.

A data protection client may enforce access control policies, use control policies, rights control policies, or a combination of these. In addition, a data protection client may enforce use operation at a policy enforcement point with a plurality of rights provided by a policy engine when or after information or a document is opened. The plurality of rights may be produced (or extracted) by a policy engine from a plurality of rights control policies, a plurality of access control policies, a plurality of use control policies, or any combination thereof. A policy enforcement point may enforce the plurality of rights without further policy evaluation at a policy engine.

In an embodiment, the functions of a data protection client that supports access, use or rights policies include: intercepting information or document access or use operations on information or a document; communicating an intercepted information or document access or use operation and associated context to a policy engine; making policy decision on an intercepted information or document access or use operation at the policy engine; enforcing policy decisions by allowing or denying an intercepted information or document access or use operation; and auditing (or logging) information or document access or use activities, policy decisions or policy enforcement activities.

A policy decision may be described by a policy effect ALLOW, DENY, or others. Enforcing a policy effect ALLOW requires a data protection client to do nothing, thereby allowing an intercepted operation to execute to completion. Enforcing a policy effect DENY includes: blocking execution of program code that implements printing a document if a user is not allowed to print the document; blocking execution of program code that implements copying content of a document to a clipboard if a user is not allow to copy content of the document; blocking execution of program code that implements screen capture function if a user is not allowed to copy content of a document; or more.

In an embodiment, the functions of a data protection client that supports access, use or rights policies include: intercepting information or document access or use operations on information or a document; communicating an intercepted information or document access or use operation and associated context to a policy engine; making policy decision on an intercepted information or document access or use operation at the policy engine; determining rights granted to the information or document at the policy engine; enforcing policy decisions by allowing or denying an intercepted information or document access or use operation; effectuating (or realizing) information or document rights granted by allowing operations that are consistent with information or document rights granted and disallowing operations that are not consistent with information or document rights granted; and auditing (or logging) information or document access or use activities, policy decisions, policy enforcement activities or rights implementation activities.

When a data protection client is aware of the rights granted to a user on information or a document when it is opened in an application program, the data protection client may effectuate the rights granted by disabling user interface elements of the application program as well as blocking application program operations. For example, if a user is not granted a print right on a document, a data protection client may disable user interface elements such as print menu items, print buttons or print accelerator keys of an application program to prevent a user from printing the document. Disabling user interface elements may include disabling (or graying out), hiding or removing menu items on an application program's main menu bar, dropdown menu or popup context menu; disabling (or graying out), hiding or removing a button, control, hypertext link or other clickable element on an application program's tool bar, status bar, navigation bar, dialog box, form or other display surface; blocking input to or execution of program code associated with a menu item, button, control, hypertext link or other clickable element such as placing a transparent, semi-transparent or opaque user interface element (e.g., a window or a static text control) over an existing user interface element to alter a user interface behavior; nullifying effects of a user interface element by preventing normal behavior to be implemented; or more.

A data protection client may enforce a plurality of centralized policies, a plurality of discretionary policies, or both. A centralized policy is a policy administered centrally and distributed by a policy server to a data protection client. A discretionary policy is a policy stored in a managed document container containing information or a document a user is attempting to access. An information management system employs centralized policies to provide consistent application of policies in an environment it manages. Centralized policies work best when they are applied to a plurality of users on a plurality of information or documents. Centralized policies are managed by an administrator and changes are distributed to data protection clients automatically. When a centralized policy is created, a user, information or document specified in the centralized policy may not be created (or may not exist) yet, however the centralize policy is applied to the user, information or document once it is created. Discretionary policies are specific to information or a document that they associate with. A discretionary policy on information or a document may be specified by a user authorized to create or edit discretionary policies. Discretionary policies compliment centralized policies in an information manage system by allowing a non-administrative user to specify a discretionary policy to accommodate a specific situation or requirement. Discretionary policies are discussed further below in this document.

There are many ways to evaluate centralized and discretionary policies. In an example, a policy engine evaluates a plurality of centralized policies before a plurality of discretionary policies. In another example, a policy engine evaluates a plurality of discretionary policies before a plurality of centralized policies. In yet another example, a policy engine evaluates a plurality of combined centralized and discretionary policies together. In yet another example, a policy engine evaluates a first subset of centralized policies before evaluating a plurality of discretionary policies, follows by evaluating a second subset of centralized policies. In yet another example, a policy engine allows a plurality of discretionary policies authored by a user with a special authority level (e.g., executive) to override a plurality of centralized policies during policy evaluation. In yet another example, a policy engine allows a first plurality of centralized policies tagged with a specific evaluation priority directive to override a second plurality of centralized policies and discretionary policies during policy evaluation. When a first policy overrides a second policy, a first policy effect from evaluating the first policy replaces a second policy effect from evaluating the second policy.

In an implementation where a data protection client includes the function of making policy decision, the data protection client is also responsible for storing a plurality of centralized policies locally to support policy evaluation.

In an implementation where a data protection client does not include the function of making policy decision, the data protection client is responsible for communicating with a policy engine to obtain a policy decision. The policy engine may run on the same computing device as the data protection client or on a remote computing device.

Intercepting information or document access or use operations, enforcing policy decisions and effectuating information or document rights granted are functions of a policy enforcement point. A data protection client may include one or more policy enforcement points.

Making a policy decision on an intercepted information or document access or use operation and determining rights granted to information or a document associated with an intercepted information or document access or use operation are functions of a policy engine. A policy engine may be integrated into a data protection client or operated independent of a data protection client. When a policy engine operates independent of a data protection client, it communicates with the data protection client through a secured communication channel. The secured communication channel may be implemented using standard (e.g., IPSec or hyper text transfer protocol secure (HTTPS)) or propriety protocol. A policy engine that operates independent of a data protection client may run as a standalone policy engine server and provides policy decisions and granted rights to one or more data protection clients. A policy engine that operates independent of a data protection client may be an integral part of a policy server.

In an embodiment, a policy engine determines what rights should be granted to information or a document when the information or document is accessed. If an access is associated with a file, rights determination is performed while processing a policy decision request of a file open operation. If an access is associated with information such as a database record, rights determination is performed while processing a policy decision request of a list, open, view, search, or other access operation. If an access is associated with a document such as a web page (e.g., Microsoft SharePoint®), rights determination is performed while processing a policy decision request of a HTTP request. If an access is associated with information such as an object (e.g., a Java object in Dassault Systèmes Enovia™), rights determination is performed while processing a policy decision request of an object. A policy engine needs to determine rights granted to information or a document if policy effect of a policy decision request on access to the information or document is ALLOW. When a user is not given access to information or a document, no right is granted.

In an implementation, an information management system revokes all rights from a user by default. Any right that a user may have is granted through a rights control policy. In another implementation, an information management system grants all rights to a user by default. A right that a user may not have is revoked through a rights control policy.

In an embodiment, a policy engine determines one or more rights granted to a user on information or a document based on a plurality of rights control policies relevant to a policy decision request. The one or more rights granted may be computed based on a first subset of the plurality of rights control policies that grant rights to the user on the information or document and a second subset of the plurality of rights control policies that revoke rights from the user on the information or document.

In an embodiment, a policy engine determines one or more rights granted to a user on information or a document based on a rights control policy relevant to a policy decision request. The one or more rights granted is specified in the rights control policy. The rights control policy specifies at least a view right to allow the user to access the information or document. The rights control policy may specify additional rights including edit, print, send, copy, or others. The policy engine performs one policy evaluation to produce a policy effect and one or more rights are granted.

In an embodiment, a policy engine determines one or more rights granted to a user on information or a document based on a plurality of access or use control policies relevant to a policy decision request. The one or more rights granted may be computed based a first subset of the plurality of access or use control policies that allow or deny the user access to the information or document and a second subset of the plurality of access or use control policies that allow or deny the user to perform an operation on the information or document. In an example, if an access control policy allows a user to open a document, a policy engine grants a view right to the user on the document. In another example, if a use control policy allows a user to print a document, a policy engine grants a print right to the user on the document. In effect, a policy engine translates access or use control policies to one or more rights granted to a user on information or a document.

In an embodiment, a policy engine determines one or more rights granted to a user on information or a document based on a plurality of rights control policies, a plurality of access policies and a plurality of use control policies relevant to a policy decision request. The one or more rights granted may be computed based a first subset of the plurality of rights control policies that grant rights to the user on the information or document, a second subset of the plurality of rights control policies that revoke rights from the user on the information or document, a first subset of the plurality of access control policies that allow or deny the user access to the information or document, and a second subset of the plurality of use control policies that allow or deny the user to perform an operation on the information or document.

A policy enforcement point (PEP) of a data protection client intercepts application program or system operations (or events or actions; e.g., invoking a function in an application program and operating on data in an application program) that may be subject to information or documents access or use control. A PEP that supports rights enforcement locally examines its rights cache to determine if it has sufficient information to process an intercepted operation. If the PEP has cached rights (e.g., granting VIEW and PRINT, revoking COPY) on a user, information or a document and an application program from a previous query to a policy engine, it may have the information needed to decide if an intercepted operation (e.g., printing to a printer) should be allowed or denied. In the case where an intercepted operation is covered by the rights being cached at the PEP, the PEP performs enforcement action without querying a policy engine. If the PEP does not have any cached rights covering the intercepted operation, the PEP makes a request to a policy engine to obtain a policy decision. The context of the intercepted operation is provided by the PEP to the policy engine so that the policy engine may evaluate policies relevant to the context of the intercepted operation. A policy decision determined in policy evaluation is communicated back to the PEP.

In both cases where the PEP makes a policy decision based on cached rights and the PEP obtains policy decision by querying a policy engine, the PEP uses its application-specific or system-specific logic (or code) to carry out enforcement function and effect rights implementation. The policy effect of a policy decision may be ALLOW or DENY. If a policy effect is ALLOW, the PEP allows the intercepted operation logic to execute to completion. If a policy effect is DENY, the PEP typically terminates the intercepted operation (i.e., operation logic is not executed) and returns an error status to indicate access is denied.

A policy engine is an execution unit that processes and executes policies or rules. A policy engine takes the data collected by an interceptor, historical data from prior interceptions, configuration and environment data, and applies the policy rules supplied by the policy server to the data to produce a consequence (sometimes referred to as policy decision). A consequence may include an effect (also referred to as a policy effect in this document, e.g., ALLOW, DENY, evaluate another policy, query user, or call a custom effect handler) and optionally one or more obligation or remediation tasks. The use of historical data in policy evaluation is optional. As part of a policy evaluation process, a policy engine may decide that it needs to obtain input from a user before it may proceed with (or complete) a policy evaluation. At that time, a policy engine may invoke a user interface element to query the user for input. For example, such input is related to classifying a document (which produces document attribute values) that is required to complete a policy evaluation.

Also, as part of the policy evaluation process, a policy engine may decide that it needs to obtain document classification information in order to complete policy evaluation. The process of obtaining document classification information may involve retrieving stored document classification data or dynamically invoking a document classification engine to classify a document.

A policy engine optionally performs one or more obligation tasks, performs one or more remediation tasks, invokes a custom effect handler, or a combination of these, if one is defined in a policy. The implementation of a policy engine is policy system architecture specific. Depending on what policy system architecture is selected, the implementation of a policy engine may vary significantly. Some examples of policy system architectures include distributing a full set of centralized policies to a data protection client, distributing a subset of centralized policies to a data protection client, organizing centralized policies based on the type of data protection client the policies target, using centralized policies defined in Extensible Access Control Markup Language (XACML) format, or using centralized policies defined in ACPL format that uses a declarative approach to policy specification.

A policy engine may run in a process separate from a data protection client. The policy decision process and data protection client may run on the same computer or on separate computers.

In an embodiment, a data protection client instruments an application program, intercepts an operation of the application program, evaluates a subset of policies according to the operation, information or a document being accessed (e.g., opening of file) or used (e.g., copy content of a document), and a user or user account operating the application program to produce a policy decision, enforces the policy decision from policy evaluation by allowing or denying access to or use of the information or document, and optionally implements one or more policy obligations according to the policy decision.

A data protection client may instrument an application program or operating system using one of application plug-in, code injection, operating system management interface, operating system service provider, device driver, or more. Some examples of application plug-ins include Microsoft® Word add-in, Microsoft Excel® add-in, Microsoft Power-Point® add-in, Microsoft Outlook® add-in, Microsoft Internet Explorer® add-in, Microsoft Windows® File Explorer add-in, Adobe Reader® plug-in, Adobe Acrobat® plug-in, Mozilla Firefox® add-on, Google Chrome™ plug-in, or others. An example of an operating system service provider is Microsoft® WinSock Service Provider. Techniques on instrumenting application programs or operating systems are described in detail in U.S. patent application Ser. No. 11/383,159, filed May 12, 2006 and Ser. No. 11/615,477, filed Dec. 22, 2006, which are incorporated by reference.

An operation of an application program (sometimes referred to as application program operation) includes an event or a notification generated in the application program, or a function invoked in the application program. Examples of application program operations include opening of a file, copying content of a document, sending an e-mail message, sending a document as an attachment of an e-mail message, saving a document in a different document format, printing a document, and many others.

For a policy effect, an access, use or rights control policy effect is one of ALLOW or DENY. A policy effect for a monitoring policy is always ALLOW. Other types of policies may support different sets of policy effects. Examples of enforcing access control policy effects include allowing opening a file, denying opening a file, allowing opening of a web page, denying display of a document list on a SAP® client application, and many others. Examples of enforcing use control policy effects include denying copying content of a document, denying sending an e-mail message with a document attached, and many others. Examples of enforcing rights control policy effects include denying printing of content of a document, denying sending of document as an e-mail attachment, denying copying of a document, and many others.

A policy obligation is a task to be performed by a data protection client when a policy specifying the policy obligation is in the subset of policies being evaluated and invocation condition of the policy obligation is satisfied. A policy obligation is an optional element of a policy. A policy evaluation may not produce a policy obligation. Some examples of policy obligations include: a log policy obligation that logs data to a log server; an automatic tagging policy obligation that inserts one or more document attributes into a document; an interactive tagging policy obligation that queries a user to enter one or more document attributes and inserts the one or more document attributes into a document; a strip attachment policy obligation that removes an attachment from an e-mail message; or others.

To control information or document access and use, a data protection client may control user interface elements such as visual and input elements of an application program, commands and functionalities of an application program and information presented to a user. Examples of visual elements of an application program include menu, menu item, button, list box, list item, check box, tab, scroll bar, slider, icon, image or hypertext link. Examples of input elements of an application program include key event handler, mouse event handler or event handler associated with another visual element.

An application program may support a large number of commands. A command may be invoked by selecting a menu item, pressing a button (shown on a screen), pressing one or more keys or pressing one or more mouse buttons. A command may also be invoked by a macro or script or invoked by a code module that calls a function (or method) in an application program interface (API) library. For example, a command may perform a task such as opening a file, sending an e-mail message, editing a cell in a spreadsheet, editing a macro, changing text format, or others.

Figure 4:
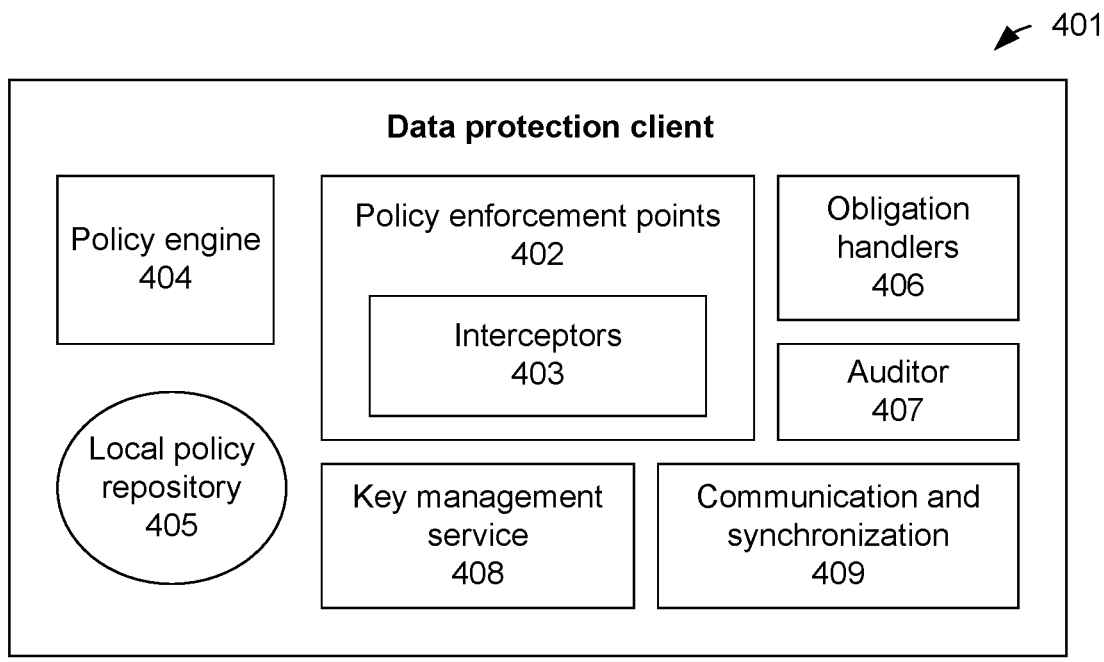
FIG. 4 shows a block diagram of a data protection client.

FIG. 4 shows a block diagram of a data protection client 401. A data protection client may have one or more policy enforcement points 402 (PEPs) which intercept application program or operating system operations and implement policy effects. A PEP may have one or more interceptors 403. Typically, an interceptor runs in an application program instance (e.g., a process) or operating system kernel. When an interceptor of a PEP intercepts an application program or operating system operation, the PEP queries a policy engine 404 with the intercepted operation and information relevant to the intercepted operation for a policy decision. The policy engine selects a first subset of policies from a plurality of policies in a local policy repository 405 that is relevant to the intercepted operation and evaluates the first subset of policies to produce a policy decision. The plurality of policies in the local policy repository is policies distributed from a policy server.

The policy decision includes a policy effect ALLOW or DENY, and optionally one or more policy obligations. A policy obligation is a task to be carried out by a data protection client and it is an optional element of a policy. If a policy effect is ALLOW, the policy engine returns policy effect ALLOW to the PEP. The PEP implements policy effect ALLOW by allowing the intercepted operation to execute to completion. If a policy effect is DENY, the policy engine returns policy effect DENY to the PEP. The PEP implements policy effect DENY by blocking the intercepted operation.

If the policy decision produces a policy obligation, a corresponding obligation handler is invoked to carry out the policy obligation. A data protection client may implement one or more obligation handlers 406. Obligation handler is an optional component of a data protection client.

In an implementation where a data protection client supports rights enforcement, a policy engine may provide a plurality of rights granted to a user on a resource (e.g., document) to a PEP when it processes an open query on the resource. By providing a PEP with a plurality of rights granted, a data protection client empowers the PEP to process subsequent interceptions based on the plurality of rights granted without querying a policy engine for policy decisions. To produce a plurality of rights granted, a policy engine selects a second subset of policies from the plurality of policies in the local policy repository based on the user and the resource and analyzes the second subset of policies to produce the plurality of rights granted. Alternatively, a PEP may make addition queries to a policy engine on a plurality of rights of interest to a PEP to compose a plurality of rights granted to a user on a resource.

An auditor 407 logs interceptions and policy evaluations at a data protection client. It also gathers additional information on computing environment that may be used in an audit, performance analysis or diagnosis. An auditor typically caches log data locally so that it may continue to operate while a client computer is offline. Log data is transmitted to a central log server (or report server) when a client computer is online. The log data collected in a log server may be used to analyze information or documents usage pattern, analyze policy effectiveness, identify threats, generate alerts, or produce reports.

A key management service (also referred to as encryption key management service) 408 manages encryption keys at a data protection client. A key management service requests encryption keys from a key management server (also referred to as encryption key management server), caches encryption keys locally and releases encryption keys to an encryption service module. To determine if a process is to be trusted with decrypted information or document, a key management service checks a policy evaluation cache for a recent policy evaluation on the information or document by a user (i.e., a user the process is running under) where policy effect is ALLOW. If a matching policy evaluation is found, the key management service trusts the process with decrypted information or document and releases an encryption key to an encryption service module to decrypt the information or document. Key management server is described in detail in U.S. patent application 61/368,408, filed Jul. 28, 2010, which is incorporated by reference.

A communication and synchronization module 409 is responsible for transmitting policy updates from a policy server to the local policy repository and log data from an auditor to a central log server.

To access managed document containers, a data protection client may employ a container service module. A container service module provides a data protection client access to document attributes and discretionary policies stored in a managed document container. A container service module also allows transparent access to a document stored in a managed document container by an application program.

To provide persistent protection to information or documents while it is at rest, in motion or in distribution, an encryption service module may be employed. When an encryption service module is deployed with a data protection client, the data protection client provides key management service to the encryption service module. The key management service includes encryption key generation, encryption key lookup with a key management server, encryption key caching, encryption key expiration, or more.

In an embodiment, a data protection client controls access to encryption keys of encrypted information or documents. When a user accesses an encrypted information or document, a data protection client intercepts an open operation in an application program and queries a policy engine for a policy decision on the open operation. The policy engine selects a subset of policies from a plurality of policies distributed by a policy server to determine if the open operation should be allowed. The policy engine selects the subset of policies based on the open operation, the user, and one or more attributes of the encrypted information or document. The subset of policies being evaluated is not specified in the encrypted information or document. If the open operation is allowed, the data protection client releases an encryption key to an encryption service module of the information management system to decrypt the encrypted information or document.

Unlike many digital rights management (DRM) or information rights management (IRM) systems where access control rules are specified in an encrypted document (e.g., IRM for Microsoft® Office) by an author of the encrypted information or document, the present invention authorizes access according to centrally administered policies. Also unlike many DRM or IRM systems based on a licensing model where access is allowed when a license file is present on a client computing device, the present invention authorizes access according to centrally administered policies.

A data protection client may protect information or a document in place, or protect information or a document while the information or document is stored inside a managed document container. A policy may specific information or a document to be stored in a managed document container the first time when the information or document is being saved. For example, a policy may instruct a data protection client to store information or a document in a managed document container when the information or document is created and based on who is the author, location of information or a document being saved, classifications of the information or document, type of computing device or storage the information or document is being saved on, or more. A user may also instruct a data protection client to store the information or a document in a managed document container.

A policy may query a user to enter classifications of information or a document when the information or document is created or saved the first time. Alternatively, a policy may instruct a data protection client to analyze content of information or a document to determine its classifications before the information or document is saved. A data protection client may also query a user for classifications of information or a document and stores the classifications in a managed document container along with the information or document.

Figure 5:
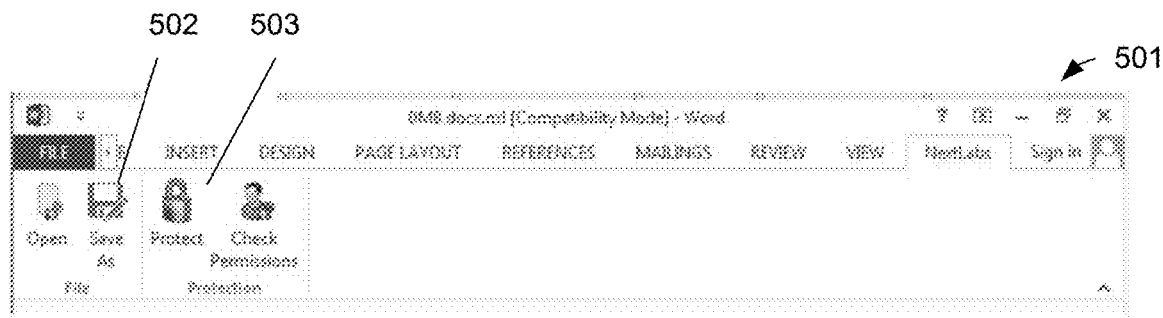
FIG. 5 shows a Microsoft® Office add-on data protection ribbon that allows a user to perform data protection functions on a document.

FIG. 5 shows a user interface element 501 added on to an application program Microsoft® Word that allows a user to manually save a document in a managed document container (i.e., Save As) 502 or store an opened document into managed document container (i.e., Protect) 503.

Figure 6:
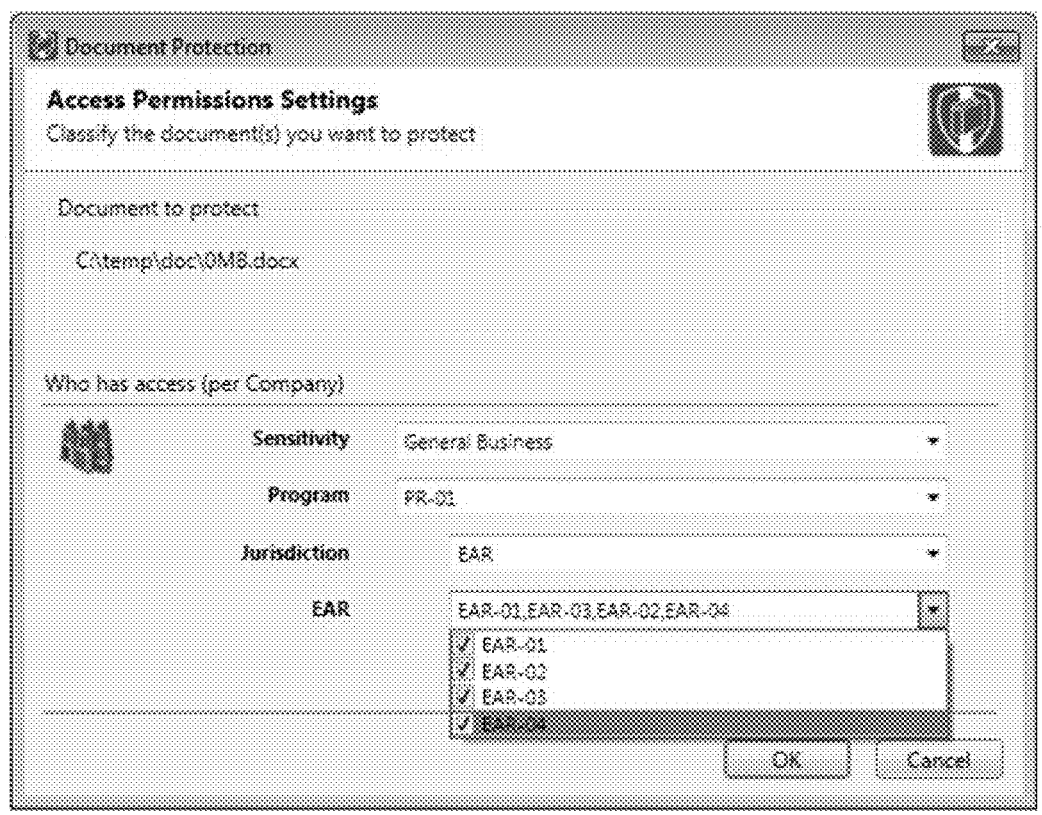
FIG. 6 shows a user interface for entering classifications of a document.

FIG. 6 shows a user interface element 601 is provided by a data protection client to allow a user to enter classifications of a document.

In an embodiment, a data protection client supports rights enforcement at a policy enforcement point, the policy enforcement point may cache a plurality of rights on information or a document provided by a policy engine when the information or document is opened and use the plurality of rights to enforce subsequent application program operations on the information or document covered by the plurality of rights without querying the policy engine thereby improving performance of the data protection client. In addition, with the knowledge of what rights a user has on the information or document, a policy enforcement point may modify user interface or program code of an application program in advance to prevent the user or the application program from performing operations that are not allowed by the plurality of rights provided by the policy engine and allow the user or the application program to perform operations that are allowed by the plurality of rights provided by the policy engine.

A data protection client that supports rights control policies typically evaluates rights control policies relevant to a user and information or a document when the user opens the information or document. If a policy enforcement point requests a policy engine to make a policy decision on an attempt to open information or a document by a user, the policy engine evaluates a subset of policies relevant to the information or document and the user to determine if the open operation should be allowed. If the open operation is allowed, the policy engine further evaluates a subset of rights control policies, a subset of access control policies, a subset of use control policies or any combination thereof relevant to the information or document and the user to determine a plurality of rights the user has on the information or document. Subsequently, the policy engine returns policy effect ALLOW along with the plurality of rights to a policy enforcement point.

Unlike an access control policy or use control policy which specifies what policy effect should be enforced when a user takes a particular action on a resource, a rights control policy declares what rights a user has on a resource. Further, an access control policy or use control policy is evaluated to determine what policy effect to enforce when an associated action is intercepted. A rights control policy is evaluated when a user access a resource, and the evaluation determines a plurality of rights the user has on the resource. If a user is allowed to access the resource, the plurality of rights is passed to a policy enforcement point so that the plurality of rights may be implemented at the policy enforcement point without further policy evaluation. In an implementation, a policy engine returns a policy effect and a plurality of rights granted to a user on information or a document when it processes an open operation by the user on the information or document and the policy effect on the open operation is ALLOW. In another implementation, a policy engine returns only a policy effect when it processes an open operation on information or a document by a user. If the policy effect is ALLOW, a data protection client queries the policy engine a second time for a plurality of rights granted to the user on the information or document, or the data protection client queries the policy engine on each right of interest to it.

Enforcing rights control policies at a data protection client is similar to enforcing access or use control policies. Enforcement of access or use control policies is described in detail in U.S. patent application Ser. No. 11/615,477, filed Dec. 22, 2006 and U.S. patent applications aforementioned and incorporated by reference. Rights, access or use control policies enforcement starts with intercepting application program or operating system operations. Typical enforcement actions are ALLOW and DENY. Unlike access or use control policies enforcement, rights control policies enforcement on some operations may be carried out without performing policy evaluation at a policy engine. For example, controlling access to and use of a document begins with intercepting a file open operation on the document. Once a user (or an application program acting on behalf of a user) is allowed to open a document, a data protection client continues to protect use of content of the document by intercepting subsequent application program operations on the opened document. With access or use control policies, enforcing an application program operation requires a policy engine to evaluate policies to produce a policy decision. Whereas with rights control policies, a policy engine may compute a plurality of rights granted to a user on a document using rights control policies when the policy engine processes a file open operation and decides the user is allowed to open the document. With a plurality of rights provided by the policy engine, the data protection client may enforce many application program operations related to use of content of the opened document without querying a policy engine for policy decision.

In an example, a data protection client enforces rights control policies when a document is being opened. Once the document is opened, the data protection client enforces a plurality of rights which is derived from a plurality of rights control policies relevant to the document. When a user opens a document, a policy engine of the data protection client evaluates a first policy Policy-RC-RE-1 to determine if the user is allowed to open the document. Specifically, the policy engine checks if the user has a view right on the document which allows the user to open the document. The policy engine also examines at least a second policy Policy-RC-RE-2 to produce a plurality of rights granted to the user on the document. With the plurality of rights granted, the data protection client is able to enforce the plurality of rights control policies without querying the policy engine. The first and second policies are rights control policies. The policies are:

Policy-RC-RE-1
GRANT VIEW RIGHT
TO Engineering-Staff
ON document.path="c:\**"
Policy-RC-RE-2
GRANT EDIT, COPY, SEND RIGHTS
TO Engineering-Staff
ON document.name="c:\projects_plan.docx"

Figure 7:
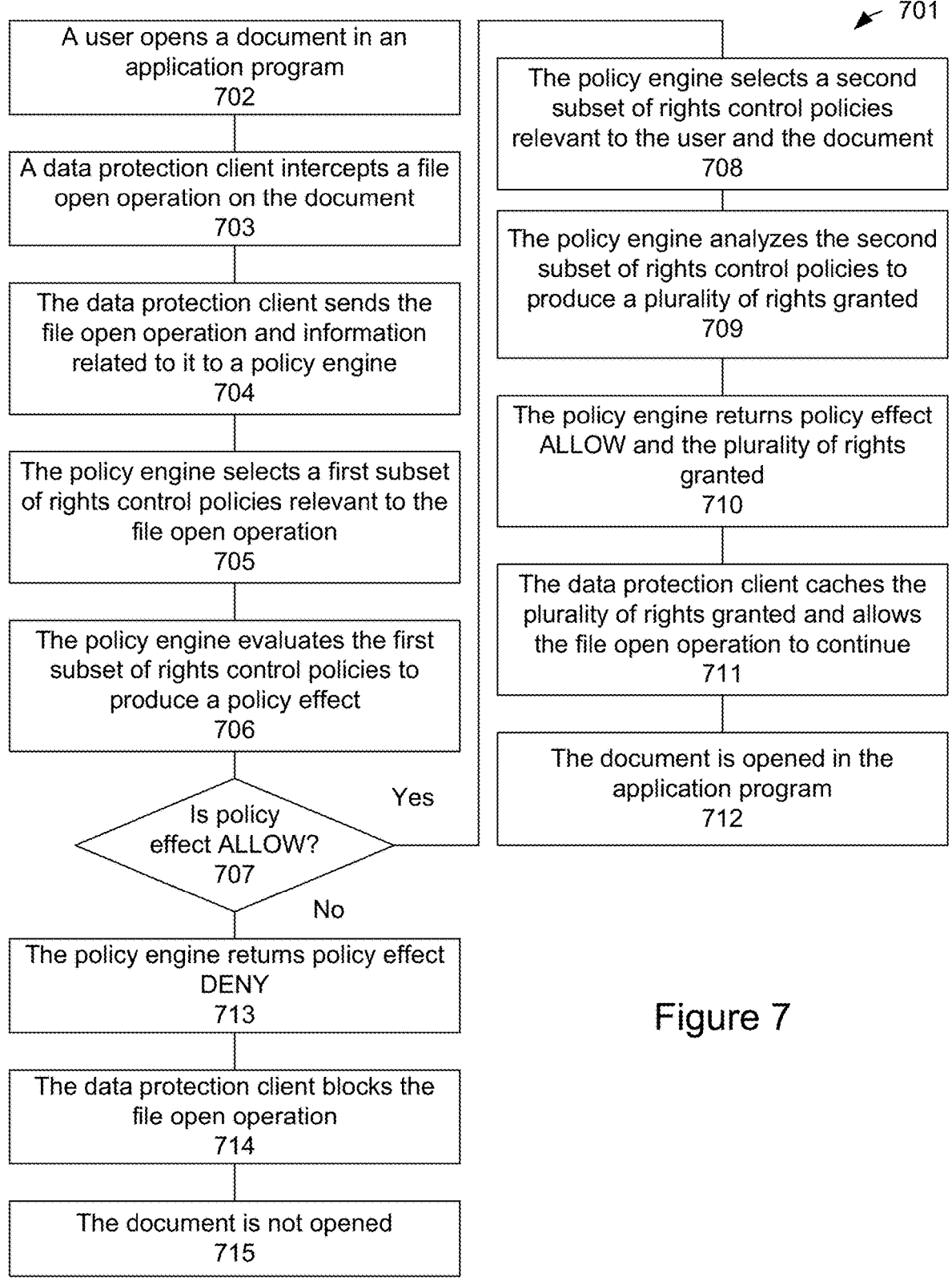
FIG. 7 shows an example flow of enforcing rights control policies when a document is being opened.

Referring to FIG. 7, an example flow 701 showing a data protection client enforcing rights control policies when a document is being opened. In step 702, a user who is a member of Engineering-Staff opens a document "c:\projects_plan.docx" in an application program Microsoft® Word. A file open operation is invoked by the opening of the document. In step 703, a data protection client intercepts the file open operation. The data protection client collects information related to the file open operation such as file name, file attribute or process identifier. In step 704, the data protection client sends the file open operation and information it has collected on the file open operation to a policy engine for a policy decision.

In step 705, the policy engine selects a first subset of rights control policies relevant to the file open operation from a plurality of policies in a local policy repository where the plurality of policies is sent by a policy server. The first subset of rights control policies include a policy Policy-RC-RE-1. Typically, a policy engine selects rights control policies that match the document, the user (or a user specified in a request) and file open operation. Depending on the definition of rights in a policy language, a file open operation may be allowed only if a view right is granted, or a file open operation may be allowed if view, edit, copy, or other rights are granted. The first subset of rights control policies includes the first policy that grants the user a view right. In step 706, the policy engine evaluates the first subset of rights control policies to produce a policy effect.

If the policy effect is ALLOW 707, the policy engine further computes a plurality of rights granted to the user on the document. In step 708, policy engine selects a second subset of rights control policies relevant to the user and the document. The second subset of rights control policies includes a policy Policy-RC-RE-2. The second subset of rights control policies is different from the first subset of rights control policies that it is not limited by a file open operation. The second subset of rights control policies may include policies that grant rights to the user as well as policies that revoke rights from the user. The second subset of policy includes a second policy that grants edit, copy and send rights to the user. In step 709, the policy engine analyzes the second subset of rights control policies to produce a plurality of rights granted. The plurality of rights granted by the first and second policies are view, edit, copy and send rights. The plurality of rights granted may grant rights to or revoke rights from the user on the document. The plurality of rights granted provides access and use controls that is equivalent to that of the second subset of rights control policies. In step 710, the policy engine returns policy effect ALLOW and the plurality of rights granted to the data protection client.

In step 711, the data protection client caches the plurality of rights granted and allows the file open operation to continue. The data protection client caches the plurality of rights granted so that it may use the plurality of rights granted to determine if an intercepted application program operation on the document should be allowed after the document is opened without querying the policy engine to make policy decision on the application program operation. In step 712, the document is opened in the application program.

If the policy effect is DENY, in step 713, the policy engine returns policy effect DENY. In step 714, the data protection client blocks the file open operation. In an implementation, a data protection client may return an error in a file open operation function call. In step 715, the document is not opened. An application program may handle the denying of file open operation by showing an error message.

In an example, a first user attempts to send a document "C:\project_plan.docx" opened in an application program Microsoft® Word by e-mail to a second user. Sending the document causes a file send operation to be invoked in the application program. The data protection client detects the file send operation and it enforces the plurality of rights granted without querying the policy engine. This example is a continuation of the previous example where a first user is allowed to open the document.

Figure 8:
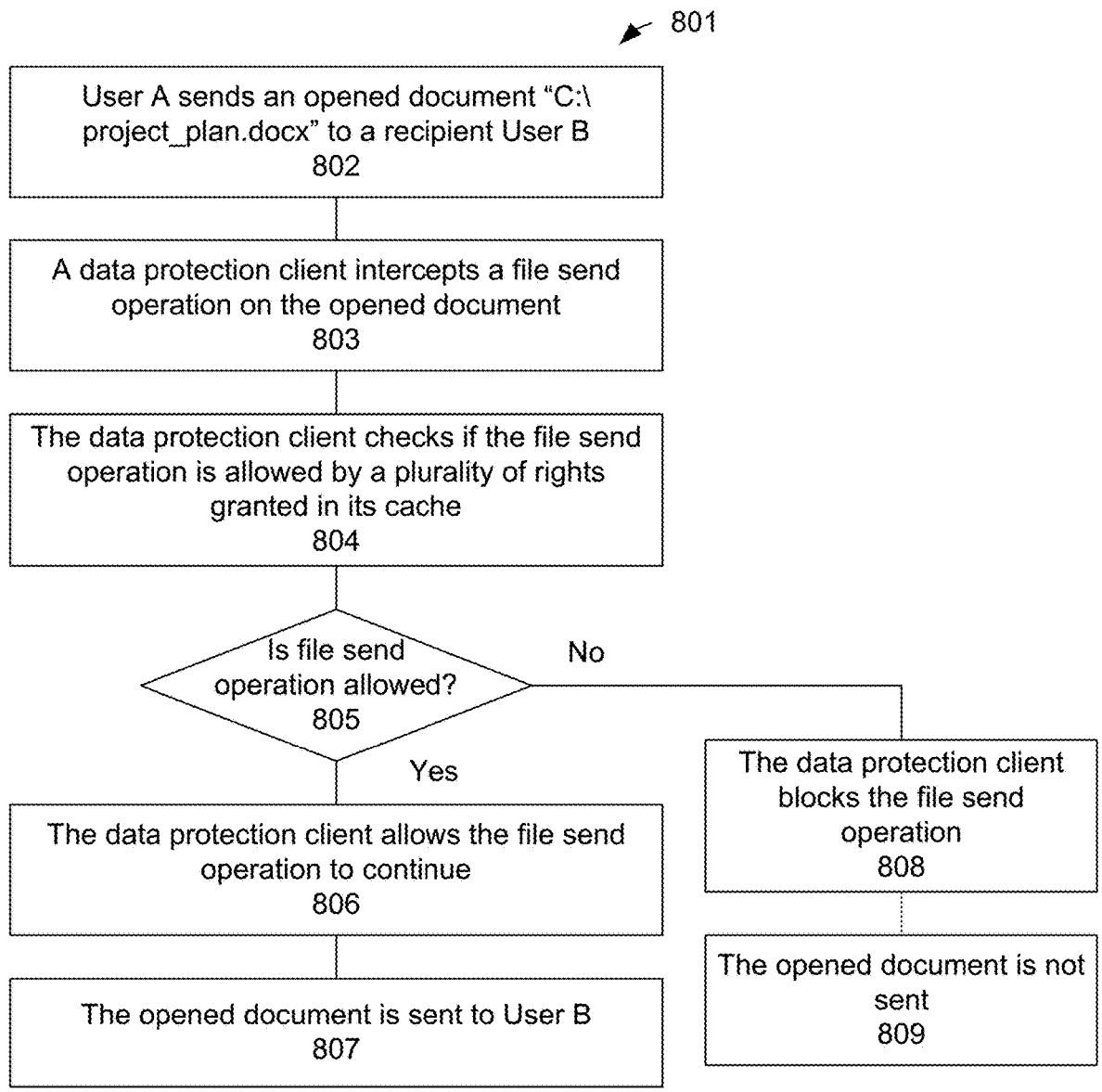
FIG. 8 shows an example flow of enforcing rights control policies on sending a document by e-mail after a document is opened.

Referring to FIG. 8, an example flow 801 showing a data protection client enforcing rights control policies on sending a document by e-mail after a document is opened. In step 802, User A sends a document "C:\project_plan.docx" opened in an application program Microsoft® Word to a recipient User B from the application program. The user action invokes (or produces) a file send operation in the application program. In step 803, a data protection client intercepts the file send operation. In step 804, the data protection client checks with a plurality of rights granted in its cache to determine if the file send operation should be allowed 805. The second policy grants User A a send right is represented in the plurality of rights granted. The data protection client determines that User A is allowed to send the document to User B. If the file send operation is allowed, in step 806, the data protection client allows the file send operation to continue. In step 807, the opened document is sent to User B. If the file send operation is not allowed, in step 808, the data protection client blocks the file send operation. In step 809, the opened document is not sent.

In another example, a user attempts to copy content of a document "C:\project_plan.docx" opened in an application program Microsoft® Word. Copying content of the document causes a copy operation to be invoked in the application program. The data protection client detects the copy operation and it enforces the plurality of rights granted without querying the policy engine. This example is a continuation of the previous example associated with FIG. 7 where a first user is allowed to open the document.

In yet another example, a user attempts to print a document "C:\project_plan.docx" opened in an application program Microsoft® Word. Printing the document causes a print operation to be invoked in the application program. The data protection client detects the print operation and it enforces the plurality of rights granted without querying the policy engine. This example is a continuation of the previous example associated with FIG. 7 where a first user is allowed to open the document.

In an example, a user attempts to duplicate a document "c:\projects_plan.docx" using a copy command in a Microsoft Windows® Command Prompt. A data protection client detects a file copy operation and enforces a plurality of rights control policies on the file copy operation. Since the document is not opened in an application program before the file copy operation is invoked, a data protection client queries a policy engine for a policy decision.

Figure 9:
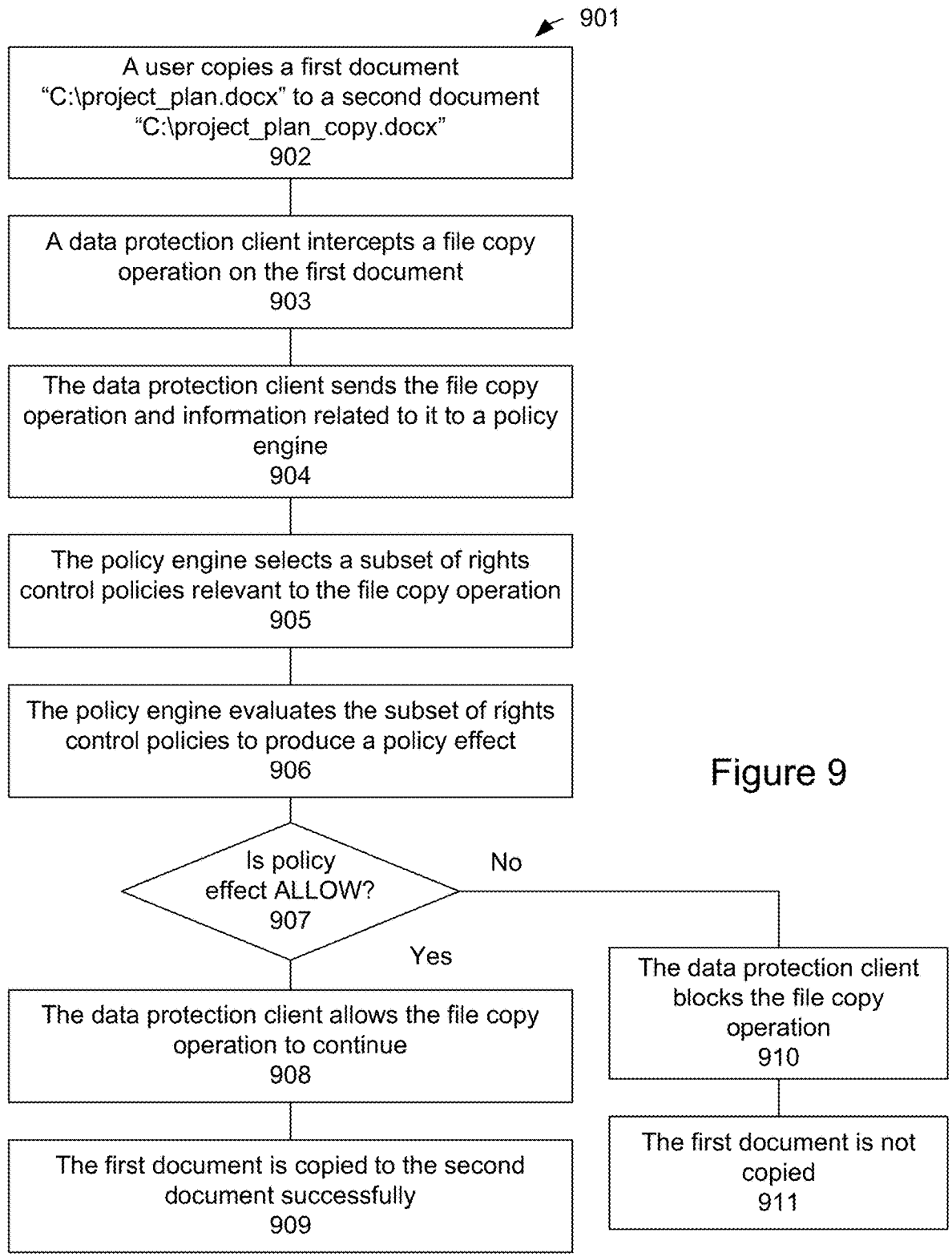
FIG. 9 shows an example flow of enforcing rights control policies on copying a document.

Referring to FIG. 9, an example flow 901 showing a user copying a first document "c:\projects_plan.docx" to a second document "c:\projects_plan_copy.docx" using a copy command in Microsoft Windows® Command Prompt. In step 902, the user who is a member of Engineering-Staff executes the copy command to copy the first document to the second document. The copy command invokes a file copy operation. In step 903, a data protection client detects a file copy operation on the first document. The data protection client collects information related to the file copy operation such as file name, file attribute or process identifier. In step 904, the data protection client sends the file copy operation and information it has collected on the file copy operation to a policy engine for a policy decision.

In step 905, the policy engine selects a subset of rights control policies relevant to the file copy operation from a plurality of rights control policies in a local policy repository where the plurality of rights control policies is sent by a policy server. The subset of rights control policies includes a policy Policy-RC-RE-2. Typically, a policy engine selects policies that match the document, the user (or a user specified in a request) and file copy operation. Depending on the definition of rights in a policy language, a file copy operation may be allowed if a copy right is granted, or a file copy operation may be allowed if view and copy rights are granted. In step 906, the policy engine evaluates the subset of rights control policies to produce a policy effect. If the policy effect is ALLOW 907, in step 908, the data protection client allows the file copy operation to continue. In step 909, the first document is copied to the second document successfully. If the policy effect is DENY, in step 910, the data protection client blocks the file copy operation. In step 911, the first document is not copied.

In another example, a user attempts to print a document "c:\projects_plan.docx" from Microsoft Windows® File Explorer. A data protection client detects a file print operation and enforces a plurality of rights control policies on the file print operation. Since the document is not opened in an application program before the file print operation is invoked, a data protection client queries a policy engine for a policy decision.

In yet another example, a user attempts to send a document "c:\projects_plan.docx" from Microsoft Windows® File Explorer. A data protection client detects a file send operation and enforces a plurality of rights control policies on the file send operation. Since the document is not opened in an application program before the file sent operation is invoked, a data protection client queries a policy engine for a policy decision.

A policy enforcer is a specific implementation of a data protection client. It is a key component in an information management system. A policy enforcer implements functionalities of a data protection client described in this document. Policy enforcers may be tailored to protect access to and use of information or documents under different operating environments. In an example, if a policy enforcer operates on a desktop computer, it protects access to and use of information or documents on the desktop computer. In another example, if a policy enforcer operates on a file server, it protects access to files on the file server from a plurality of client computers. The functions and applications of a policy enforcer are described in detail in U.S. patent application Ser. No. 11/615,477, filed Dec. 22, 2006, which is incorporated by reference. The policy enforcer described in this document is an extension to that described in the reference. The extension adds new functionalities including support of discretionary policies, rights control policies, generating rights from access or use control policies, effectuate rights to protect information, or document without querying a policy engine.

A policy enforcer performs three key functions: interception (or detection), decision and enforcement. Interception refers to the function of detecting (or sensing) an operation in an application program or operating system to allow the operation to be examined by a policy enforcer before the operation is carried out. An operation in an application program or operating system refers to the execution of code that implements a particular feature or functionality of an application program or operating system. Interception may be implement by modifying program code of an application program or operation system to include a call to a policy enforcer at the start of an operation to request a policy decision from a policy enforcer and implement policy decision accordingly. Modifying program code may be done through source code or instrumentation. Modifying source code requires access to application program or operating system source code and subsequently distributes a modified application program or operating system. Modifying source code is not feasible in many situations. On the other hand, instrumentation may be performed on application program or operating system binary code and applied through an installation process or during normal application programming execution. The techniques on instrumenting application program or operating system are described in detail in U.S. patent application Ser. No. 11/615,477, filed Dec. 22, 2006, which is incorporated by reference.

To protect information or documents on a desktop computer, a policy enforcer may instrument many application programs to install interceptors in the application programs to ensure it stays inform of access to and use of information or documents by the application programs and enforces policies when appropriate. A policy enforcer on a desktop computer may also instrument an operating system to intercept and block operating system functionalities that may leave information or documents unprotected. Examples of such operation system functionalities include screen capture and clipboard.

Decision refers to the process of evaluating one or more policies (or rules) relevant to an intercepted (or detected) operation and determining if the operation should be carried out, and if additional actions need to be performed. The result of the decision process is a policy decision. A policy decision includes a policy effect ALLOW or DENY, and optionally one or more policy obligations.

Enforcement refers to the implementation of a policy effect. For example, if a policy effect is ALLOW, an enforcement action is to do nothing, thereby allowing an operation to carry out to completion. If a policy effect is DENY, an enforcement action is to block an operation. A policy obligation specifies a task to be performed.

Interception and enforcement are normally functions of a policy enforcement point. A policy enforcement point is a component of a policy enforcer. Decision is the function of a policy engine which is an optional component of a policy enforcer. A policy engine may reside in a policy enforcer, a policy server, a dedicated policy decision server, or any process or server that is assigned the policy decision function. Policy enforcement point and policy engine may run on the same computing device or separate computing devices. In addition, a policy enforcer may carry out audit (or log) function, and obligation and remediation tasks.

A policy engine evaluates policies received from the policy server with data provided by: a scheduler associated with a scheduled event; data associated with an internal event generated by a policy enforcer or a policy server; or data accompanying an external event generated by a different application program.

Figure 10:
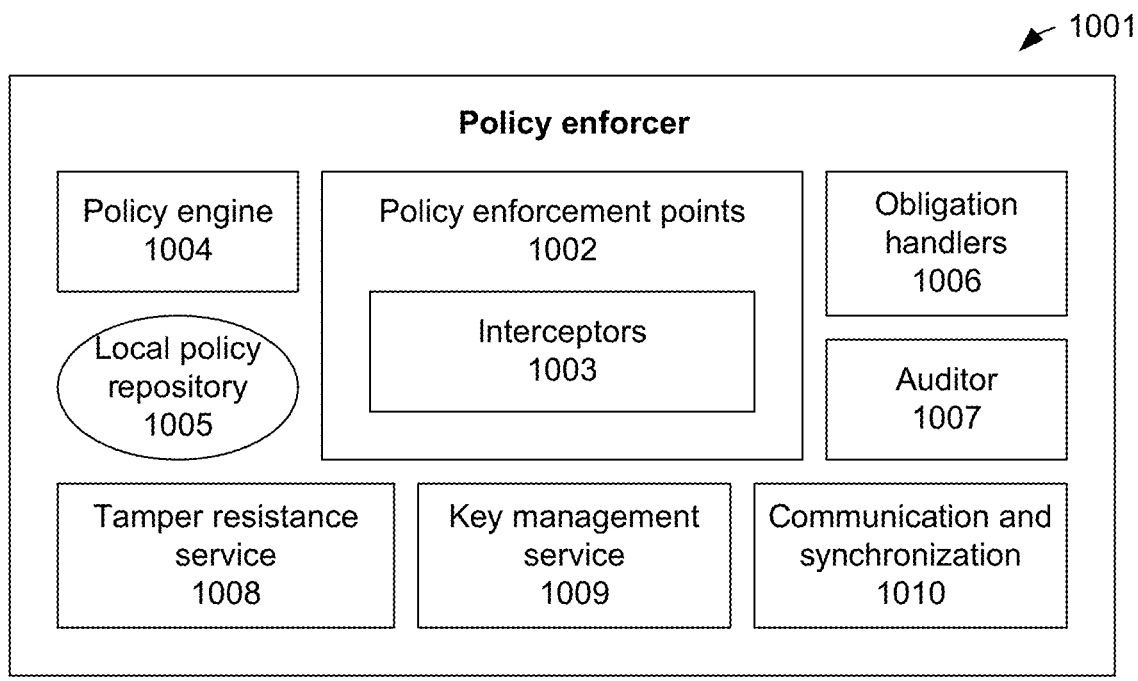
FIG. 10 shows a block diagram of a policy enforcer.

FIG. 10 shows a block diagram of a policy enforcer 1001. Since a policy enforcer is a specific implementation of a data protection client, components common to both policy enforcer and data protection client 401 provide identical or similar functionalities. A policy enforcer may have one or more policy enforcement points 1002 (PEPs) which intercept application program or operating system operations and implement policy effects. A PEP may have one or more interceptors 1003. Typically, an interceptor runs in an application program instance (e.g., a process) or operating system kernel. When an interceptor of a PEP intercepts an application program or operating system operation, the PEP queries a policy engine 1004 with the intercepted operation and information relevant to the intercepted operation for a policy decision.

An interceptor may be installed in an application program or operating system by an instrumentation service. An instrumentation service installs interceptors at one or more execution paths of an application program or operating system instance to allow a policy enforcer to observe, deny or modify an application program or operating system operation. Typically, an instrumentation service instruments an application program or operating system process when it starts.

The policy engine selects a first subset of policies from a plurality of policies in a local policy repository 1005 that is relevant to the intercepted operation and evaluates the first subset of policies to produce a policy decision. The plurality of policies in the local policy repository is policies distributed from a policy server. The policy decision includes a policy effect ALLOW or DENY, and optionally one or more policy obligations. A policy obligation is a task to be carried out by a policy enforcer and it is an optional element of a policy.

If the policy effect is ALLOW, the policy engine returns policy effect ALLOW to the PEP. The PEP implements policy effect ALLOW by allowing the intercepted operation to execute to completion. If the policy decision produces a policy obligation, a corresponding obligation handler is invoked to carry out the policy obligation. A policy enforcer may implement one or more obligation handlers 1006. Obligation handler is an optional component of a policy enforcer. If the policy effect is DENY, the policy engine returns policy effect DENY to the PEP. The PEP implements policy effect DENY by blocking the intercepted operation.

Optionally, if the policy effect is ALLOW and the policy enforcer supports rights enforcement, the policy engine may provide a plurality of rights granted to a user on a resource (e.g., document) to the PEP when it processes an open query on the resource. By providing a PEP with a plurality of rights granted, the policy engine empowers the PEP to process subsequent interceptions based on the plurality of rights granted without querying the policy engine for policy decisions. To produce a plurality of rights granted, the policy engine selects a second subset of policies from the plurality of policies in the local policy repository based on the user and the resource and analyzes the second subset of policies to produce the plurality of rights granted. Alternatively, the PEP makes at least one additional query to the policy engine to request the plurality of rights granted and the policy engine selects and analyzes the second subset of policies to produce the plurality of rights granted.

An auditor 1007 logs interceptions and policy evaluations at a policy enforcer. It also gathers additional information on the computing environment that may be used in an audit, performance analysis, or diagnosis. An auditor typically caches log data locally so that it may continue to operate while a client computer is offline. Log data is transmitted to a log server when a client computer is online.

When a policy enforcer is deployed on a personal computing device, a tamper resistance service 1008 prevents a policy enforcer from being altered or disabled. Tamper resistance service is an optional component. A tamper resistance service protects program code, configurations and data files of a policy enforcer. A tamper resistance service may prevent uninstalling of a policy enforcer.

An optional key management service 1009 manages encryption keys at a policy enforcer. A key management service requests encryption keys from a key management server, caches encryption keys locally and releases encryption keys to an encryption service module. To determine if a process is to be trusted with decrypted content, a key management service checks a policy evaluation cache for a recent policy evaluation regarding information or a document, a user (i.e., a user the process is running under) where policy effect is ALLOW. If a matching policy evaluation is found, the key management service trusts the process with decrypted content of the information of document and releases an encryption key to an encryption service module to decrypt the information or document.

A communication and synchronization module 1010 is responsible for transmitting policy updates from a policy server to the local policy repository and log data from the auditor to a log server.

A rights management client is a specific implementation of a data protection client that provides protection to information or documents by storing the information or documents in managed document containers. A rights management client implements functionalities of a data protection client described in this document. A managed document container is a file or data object that stores information or a document and metadata used to manage or protect the information or document. Storing information or a document in a managed document container allows the information or document to be protected consistently by an information management system in disparate computing environments. In addition, an encryption service module may be employed to encrypt information or a document stored in a managed document container. Encrypting information or a document in a managed document container provides persistent protection of the information or document whether the information or document is at rest, in motion or in distribution.

Figure 11:
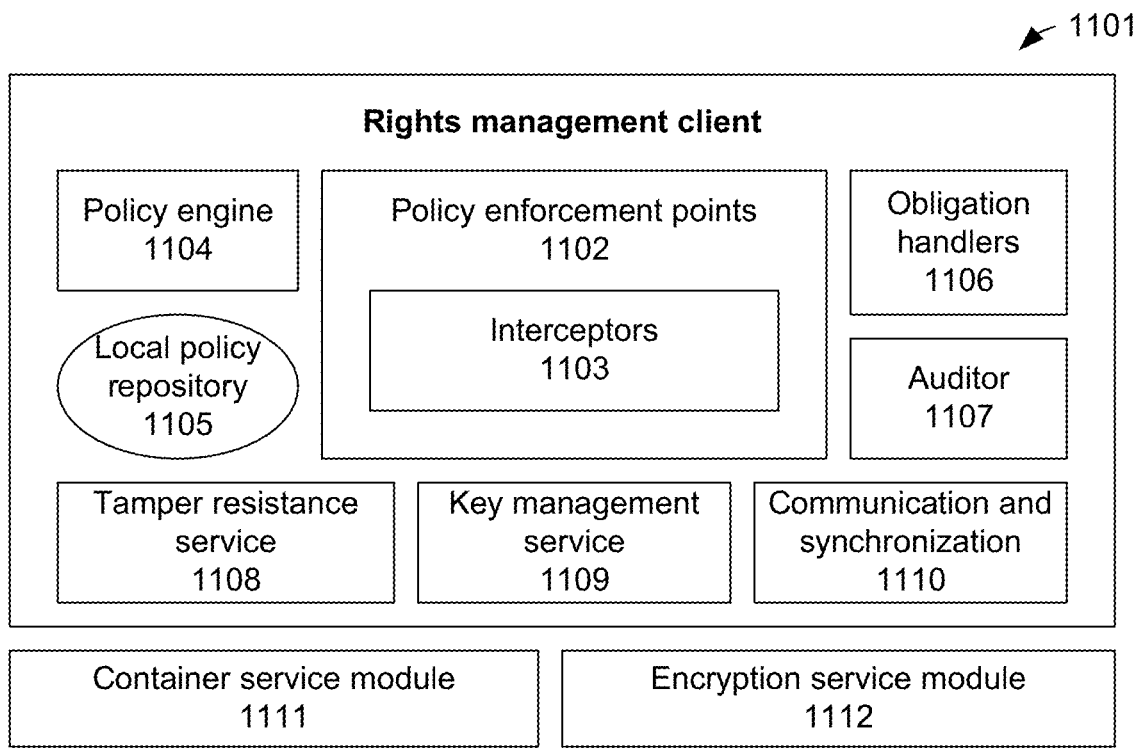
FIG. 11 shows a block diagram of a rights management client.

FIG. 11 shows a block diagram of a rights management client 1101. Since a rights management client is a specific implementation of a data protection client, components common to both rights management client and data protection client 401 provide identical or similar functionalities. A rights management client may have one or more policy enforcement points 1102 (PEPs) which intercept application program or operating system operations and implement policy effects. A PEP may have one or more interceptors 1103. Typically, an interceptor runs in an application program instance (e.g., a process) or operating system kernel. When an interceptor of a PEP intercepts an application program or operating system operation, the PEP queries a policy engine 1104 with the intercepted operation and information relevant to the intercepted operation for a policy decision.

An interceptor may be installed in an application program or operating system by an instrumentation service. An instrumentation service installs interceptors at one or more execution paths of an application program or operating system instance to allow a rights management client to observe, deny or modify an application program or operating system operation. Typically, an instrumentation service instruments an application program or operating system process when it starts.

The policy engine selects a first subset of policies from a plurality of policies in a local policy repository 1105 that is relevant to the intercepted operation and evaluates the first subset of policies to produce a policy decision. The plurality of policies in the local policy repository is policies distributed from a policy server. The policy decision includes a policy effect ALLOW or DENY, and optionally one or more policy obligations. A policy obligation is a task to be carried out by a rights management client and it is an optional element of a policy. If the policy effect is ALLOW, the policy engine returns policy effect ALLOW to the PEP. The PEP implements policy effect ALLOW by allowing the intercepted operation to execute to completion. If the policy decision produces a policy obligation, a corresponding obligation handler is invoked to carry out the policy obligation. A rights management client may implement one or more obligation handlers 1106. Obligation handler is an optional component of a rights management client. If the policy effect is DENY, the policy engine returns policy effect DENY to the PEP. The PEP implements policy effect DENY by blocking the intercepted operation.

Optionally, if the policy effect is ALLOW and the rights management client supports rights enforcement, the policy engine may provide a plurality of rights granted to a user on a resource (e.g., document) to the PEP when it processes an open query on the resource. By providing a PEP with a plurality of rights granted, the policy engine empowers the PEP to process subsequent interceptions based on the plurality of rights granted without querying the policy engine for policy decisions. To produce a plurality of rights granted, the policy engine selects a second subset of policies from the plurality of policies in the local policy repository based on the user and the resource and analyzes the second subset of policies to produce the plurality of rights granted. Alternatively, the PEP makes at least one additional query to the policy engine to request the plurality of rights granted and the policy engine selects and analyzes the second subset of policies to produce the plurality of rights granted.

An auditor 1107 logs interceptions and policy evaluations at a rights management client. It also gathers additional information on the computing environment that may be used in an audit, performance analysis, or diagnosis. An auditor typically caches log data locally so that it may continue to operate while a client computer is offline. Log data is transmitted to a log server when a client computer is online.

When a rights management client is deployed on a personal computing device, a tamper resistance service 1108 prevents a right management client from being altered or disabled. Tamper resistance service is an optional component. A tamper resistance service protects program code, configurations and data files of a rights management client. A tamper resistance service may prevent uninstalling of a rights management client.

An optional key management service 1109 manages encryption keys at a rights management client. A key management service requests encryption keys from a key management server, caches encryption keys locally and releases encryption keys to an encryption service module. To determine if a process is to be trusted with decrypted information or document, a key management service checks a policy evaluation cache for a recent policy evaluation on the information or document by a user (i.e., a user the process is running under) where policy effect is ALLOW. If a matching policy evaluation is found, the key management service trusts the process with the decrypted information or document and releases an encryption key to an encryption service module to decrypt the information or document.

A communication and synchronization module 1110 is responsible for transmitting policy updates from a policy server to the local policy repository and log data from the auditor to a log server.

A container service module 1111 provides access to document attributes and discretionary policies stored in a managed document container. A container service module also allows transparent access to information or a document stored in a managed document container by an application program.

Optionally, a rights management client may employ an encryption service module 1112 to provide persistent protection to information or documents while it is at rest, in motion or in distribution. An encryption service module is responsible for encrypting and decrypting information or a document stored in managed document container. The encryption and decryption of content performed by an encryption service module is transparent to an application program that write and read the information or document stored in a managed document container. The application program is not aware of the content it reads or writes being encrypted. An encryption service module obtains an encryption key from a key management service of a rights management client.

A rights management client enforces access, use or rights control policies on information or documents stored in managed document containers. In an example, if a use control policy denies a user from printing information or a document or rights control policy revokes print rights from a user on information or a document, a rights control client enforces the policy by blocking a print operation of an application or disabling print user interface elements of an application.

In addition, a rights management client also enforces access, use or rights control policies that directs the storing of information or a document in a managed document container, thereby placing the information or document under protection of rights management clients. In an example, a policy specifies information or a document saved to a particular location to be stored in a managed document container automatically. A rights management client working with a container service module stores the information or document in a managed document container when the information or document is saved to the particular location. In another example, a policy directs a user to classify a document manually when the user saves a document the first time. A rights management client shows a document classification user interface element when a user saves a new document. When the user finishes classifying the document, the right management client works with a container service module to save the classifications and the document in a managed document container. In yet another example, a policy specifies a document attached to an e-mail message should be encrypted. When an e-mail message is being sent, a rights management client replaces the attached document with a managed document container and an encryption service module encrypts the attached document before storing it in the managed document container.

To enforce policies on a computing device, a rights management client instruments an application program on the computing device, intercepts operations of the application program, effects policy evaluations on the operations, implements decisions on the operation from policy evaluations, and optionally implements policy obligations.

A rights management client communicates with a policy server periodically. A rights management client obtains policies relevant to it from a policy server. A rights management client also communicates with a log server and sends audit log data to the log server. A rights management client continues to protect information and documents when it is offline (i.e., when communication with policy server and log server may not be established). While operating offline, a rights management client enforces policies cached locally and stores log data locally until connection is reestablished.

In an example, a user opens a document "abc.doc" stored in a managed document container using an open file dialog box in an application program Microsoft® Word. The rights management client intercepts a file open operation. To determine if the file open operation should be allowed, the rights management client sent a request to a policy engine along with information related to the file open operation.

The policy engine evaluates a plurality of policies relevant to the file open operation and the user to determine if the file open operation should be allowed. If the file open operation is allowed, the policy engine performs additional evaluations to determine a plurality of rights to grant to the user on the managed document container. The policy engine returns policy effect ALLOW along with the plurality of rights granted to the rights management client. The rights management client implements the policy effect by allowing the file open operation to run to completion, thereby allowing the document to be opened. In addition, the rights management client caches the plurality of rights provided by the policy engine. The rights management client disables menu items and buttons on Microsoft® Word user interface and intercepts application program operations to block application program operations that are not conforming to the plurality of rights provided by the policy engine. If the file open operation is not allowed, the policy engine returns a DENY effect to the rights management client. The rights management client implements the policy effect by denying the user in opening the document.

When a policy engine selects policies relevant to a file open operation, it matches the file open operation with an action and one or more document attributes specified in a policy. A file open operation may match one or more actions. For example, a file open operation may match OPEN and EDIT actions. A policy engine also matches a user named specified in a policy with name of the current user. The matching performed may be an exact or a wildcard match. To match a user, a policy engine may elect to match user identifiers (e.g., Microsoft Windows® Security Identifier (SID)) instead of user names.

With a plurality of rights cached locally, the rights management client may process subsequent intercepted operations covered by the plurality of rights without querying a policy engine. If a rights management client intercepts an operation that is not covered by the plurality of rights being cached, it will query a policy engine for policy decision.

As the application program executes program code that opens the document, the application program may perform a read operation on the document to retrieve content in the document. An application program may also perform a read operation after the document is opened. Since the document is stored in a managed document container, the read operation will not succeed unless it is pre-processed by a container service module or encryption service module of an information management system.

In an embodiment, a container service module intercepts a read operation on a document in a managed document container, the container service module queries a rights management client to determine if the application program (or process) is allowed to read the document. If the application program is allowed to read the document, the container service module will process the read operation and return the data requested in the read operation to the application program. The container service module queries the rights management client only on the first read operation. If the first read operation is allowed, all subsequent read operations are also allowed.

When a rights management client receives a query from a container service module regarding a read operation by an application program on a document, the rights management client examines its policy evaluation history to determine if the application program (or application program process) has recently requested policy evaluation on opening the document and policy effect was allowed. If the application program was allowed to open the document, the rights management client returns policy effect ALLOW in a response to the container services module. If the application program was not allowed to open the document or there is no recent history on open operation by the application program on the document, the rights management client returns policy effect DENY to the container services module.

An encryption service module works similar to a container service module. In addition to querying a rights management client to determine if an application program (or application program process) is to be trusted, an encryption service module also requests an encryption key from a rights management client. The encryption key is used to encrypt data written to a managed document container or decrypt data read from a managed document container.

In an implementation, a rights management client requires an installation step to operate on a computer. In another implementation, a rights management client does not require an installation step to operate on a computer. Without an installation step, a rights management client is simple to deploy. For example, it may be deployed on unmanaged computing devices used to access protected documents (i.e., computing devices not managed by an information management system). When deployed on an unmanaged computing device, a rights management client's default behavior is to deny access to documents managed by an information management system. A user is allowed to access information or a document in the information management system only if the information or document is explicitly allowed by a policy. The exclude-by-default function may be implemented using one or more policies, via configuration, or hard-coded to a rights management client.

A rights management client may intercept a screen capture operation to prevent content of a document in a managed document container from being captured and become unprotected.

In an embodiment, an information management system implements access or use control policies but no rights control policies, and rights enforcement is implemented at data protection clients of the information management system. To enforce rights at a data protection client, a policy engine provides a plurality of rights granted to a user on a document when the policy engine allows a file open operation. A policy engine may determine the plurality of rights granted to a user on a document by selecting a subset of access or use control policies relevant to the user and the document and analyzing the subset of access or use control policies to produce the plurality of rights granted. The plurality of rights granted may include rights granted to the user and rights revoked from the user. Thus, a plurality of rights granted is produced without rights control policies.

When a user opens a document with an application program, a policy enforcement point (PEP) of a data protection client intercepts a file open operation in the application program. The PEP sends the file open operation along with additional information relevant to the file open operation to a policy engine to request a policy decision. The policy engine selects a first subset of access control policies relevant to the file open operation, the document and current user and evaluates the first subset of access control policies to determine if current user is allowed to open the document.

If current user is allowed to open the document, the policy engine selects a second subset of access or use control policies relevant to the document and current user and analyzes the second subset of access or use control policies to translate the second subset of access or use control policies into a plurality of rights granted to current user on the document. The policy engine returns a policy effect ALLOW along with the plurality of rights granted to the PEP. The PEP implements the policy effect by allowing the file open operation to execute to completion thereby allowing the document to be opened in the application program. The PEP also caches the plurality of rights granted so that it may make decisions on application program operations that are covered by the plurality of rights granted without querying the policy engine. In additional, the PEP may implement preventive measures to avoid disallowed application program operations being invoked by current user.

If the current user is not allowed to open the document, the policy engine returns a policy effect DENY to the PEP. The PEP implements the policy effect by blocking the file open operation thereby the document fails to open in the application program.

An access or use control policy relevant to a user and a document may include one or more actions such as open, copy, edit, save, print, send, upload, or others. A right relevant to a user on a document may include view, edit, copy, convert, print, send, or others. One or more actions may map to a right and one action may map to one or more rights. Many mappings of actions and rights are possible. Those skilled in the art will be able to devise mappings that are appropriate for a particular implementation based on the teaching in this document.

Some examples of preventive measures include disabling application program user interface elements, or altering application program operations. Disabling an application program user interface element includes disabling menu items, controls, key accelerators or event handlers, or others. Altering an application program operation includes: inserting program code to block partial or complete function of an operation; inserting user interface elements that may warn or assist current user to comply with the plurality of rights granted; or others.

Figure 12:
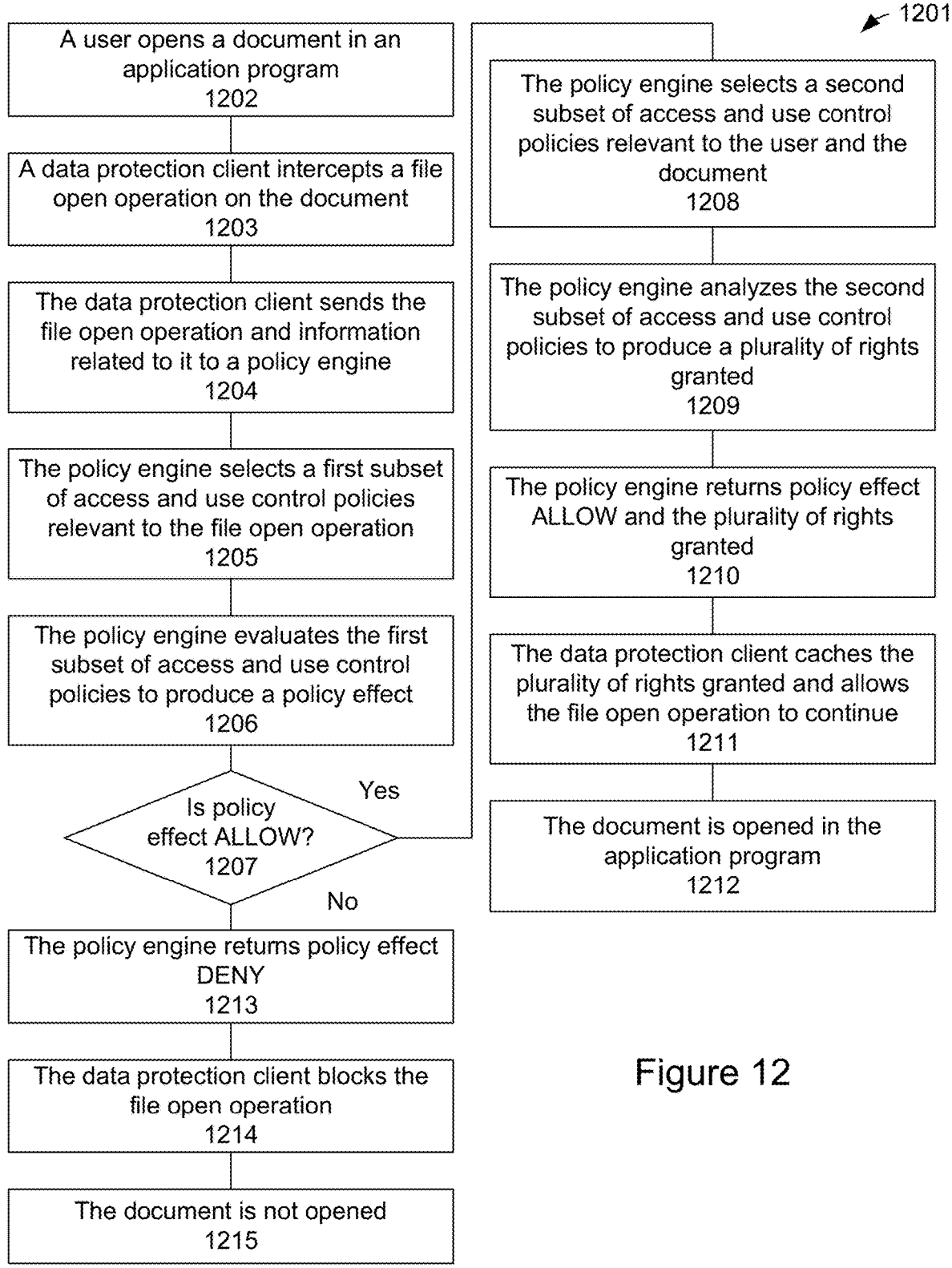
FIG. 12 shows an example flow of enabling rights enforcement with access or use control policies at a data protection client.

In an example, a data protection client enforces access or use control policies when a document is being opened. Once the document is opened, the data protection client enforces a plurality of rights which is derived from a plurality of access or use control policies on the document. When a user opens a document, a policy engine of the data protection client evaluates a first subset of access or use control policies including a first policy Policy-AUC-RE-1 to determine if the user is allowed to open the document. If the user is allowed to open the document, the policy engine examines a second subset of access or use control policies including a second policy Policy-AUC-RE-2 to produce a plurality of rights granted to the user on the document. With the plurality of rights granted, the data protection client may make decisions on application program operations without querying the policy engine. The policies are:

Policy-AUC-RE-1
FOR document. Path="c:\**"
ON OPEN
BY Marketing
DO ALLOW
Policy-AUC-RE-2
FOR document.name="c:\produce_pricing.xlsx"
ON EDIT, COPY, SEND
BY Marketing
DO ALLOW Referring to FIG. 12, an example flow 1201 showing a policy engine enabling rights enforcement with access or use control policies when a user opens a document "c:\produce_pricing.xlsx" in an application program Microsoft Excel®. In step 1202, the user who is a member of Marketing opens the document in the application program. The user action invokes a file open operation in the application program. In step 1203, a data protection client intercepts the file open operation. The data protection client collects information related to the file open operation such as file name, file attribute or process identifier. In step 1204, the data protection client sends the file open operation and information it has collected on the file open operation to a policy engine for a policy decision.

In step 1205, the policy engine selects a first subset of access or use control policies relevant to the file open operation from a plurality of policies in a local policy repository where the plurality of policies is sent by a policy server. The first subset of access or use control policies include a policy Policy-AUC-RE-1. Typically, a policy engine selects access or use control policies that match the document, the user (or a user specified in a request) and file open operation. In step 1206, the policy engine evaluates the first subset of access or use control policies to produce a policy effect. The policy effect may be ALLOW or DENY. If the policy effect is ALLOW 1207, proceed to step 1208 (compute granted rights). If the policy effect is DENY, in step 1213, the policy engine returns a policy effect DENY. In step 1214, the data protection client blocks the file open operation. In step 1215, the document is not opened.

In step 1208 (compute granted rights), the policy engine selects a second subset of access or use control policies relevant to the user and the document from the plurality of policies in the local policy repository. The second subset of access or use control policies includes a policy Policy-AUC-RE-2. In step 1209, the policy engine analyzes the second subset of access or use control policies to produce a plurality of rights granted. In step 1210, the policy engine returns a policy effect ALLOW and the plurality of rights granted to the data protection client. In step 1211, the data protection client caches the plurality of rights granted and allows the file open operation to continue. In step 1212, the document is opened in the application program.

While rights are typically granted to or revoked from a user through centralized policies developed by an administrator. At times, it is desirable to delegate granting and revoking of rights to a particular user or a group of users. In an embodiment, an information management system delegates granting or revoking a plurality of rights to a first plurality of users using a plurality of rights control policies. The rights control policies grant an assign right to the first plurality of users on the plurality of rights to a second plurality of users on a plurality of information or documents. As a result, the first plurality of users is authorized to grant the plurality of rights to or revoke the plurality of rights from the second plurality of users on the plurality of information or documents. To grant a right in the plurality of rights to a second user in the second plurality of users on information or a document in the plurality of information or documents, a first user in the first plurality of users needs to create a discretionary policy that grants the right to the second user on the information or document. The right granted by the discretionary policy is referred to as a discretionary right. In an example, an administrator grants an assign right to a manager through a rights control policy. The rights control policy specifies the manager may grant a read right to the manager's staffs on one or more documents. Alternatively, the rights control policy may specify the manager may grant all rights granted to the manager except assign and send rights.

To facilitate delegation of granting or revoking rights in a rights control policy, an assign right is expressly created. An assign right may be specified along with a combination of these parameters: who is given an assign right; what rights may be assigned; who may the rights be assigned to; or what information or documents are covered by the assignment. Typically, assign right is granted to the owner of a document, a manager of a team on documents owned by the team, or leader of a project on documents associated with the project. In an example, a first user who owns a document may grant view right to a second user so that the second user may help review the document. In another example, a project leader who has assign right on all project documents may grant view, edit and print rights to a subset of project documents to a new member of the project so that he may carry out his assignments.

Discretionary policies are generally ad hoc and tied to a particular document. Discretionary policies may be expressed as: declarative policies which are descriptive and human readable (e.g., NextLabs® ACPL), and may be stored as plain text or precompiled binary; prescribed and parameterized policies where policies are predefined and a user granted an assign right may provide parameters required by a policy to activate the policy; program code which may be pseudo code or machine executable code encoding a collection of policies; or more.

Discretionary policies may be stored as ancillary data of a document. Many methods of storing and retrieving ancillary data are described in detail in U.S. patent applications 61/357,016, filed Jun. 21, 2010 and Ser. No. 13/165,730, filed Jun. 21, 2011, which are incorporated by reference. In an example, discretionary policies are stored as declarative policies as text (i.e., in human readable form), pseudo code (or immediate code), or compiled binary. In another example, discretionary policies are stored as an access control list. In yet another example, discretionary policies are stored as simple rights attributes such as ALLOW: {view, print}; DENY: {edit, send, copy}. When discretionary policies are stored in or with a document, a data protection client retrieves discretionary policies from the document and includes the discretionary policies in policy evaluation. Since discretionary policies are ad hoc, they are typically stored in or with a document to which the discretionary policies are applied.

When discretionary policies are stored in a document or in a managed document container with a document, it may be desirable to encrypt the discretionary policies to prevent the discretionary policies from being tampered. The discretionary policies may be encrypted separated from the document or together with a document. The discretionary policies may be encrypted using an encryption key unique to a document or an encryption key shared by a plurality of documents. The encryption keys used to encrypt discretionary policies are managed by a data protection client.

Alternatively, discretionary policies may be stored centrally, distributed to a plurality of servers, or stored in or with a document. When discretionary policies are stored centrally or distributed, discretionary policies may be stored: on a policy server, on a dedicated server, in a database, on a file server along with information or documents, or others. To enforce discretionary policies, a data protection client requests discretionary policies associated with information or a document from a server and include the discretionary policies in policy evaluation. To improve performance, a data protection client may cache discretionary policies locally.

In an implementation, discretionary policies of a document are stored in a managed document container along with the document and a policy engine makes a request to a container service module or encryption service module to extract discretionary policies in the managed document container before it performs policy evaluation. Managed document container, container service module and encryption service module are described further below in this document.

In an implementation, discretionary policies of a document are evaluated together with centralized policies relevant to a user and the document. In another implementation, discretionary policies of a document are evaluated after a first evaluation of centralized policies relevant to a user and the document and result of the first evaluation is ALLOW. In another word, discretionary policies are not evaluated if result of the first evaluation is DENY. For example, if a user is denied access to a document by a plurality of policies distributed from a policy server, the user is not allowed to access the document even if discretionary policies of the document allows the user to access the document. It may be desirable to evaluate centralized policies and discretionary policies in different orders to achieve different effects or improve performance. For example, evaluates combined centralized and discretionary policies together; evaluates centralized policies before discretionary policies; evaluates discretionary policies before centralized policies; evaluates a first subset of centralized policies before discretionary policies and follows by evaluating a second subset of centralized policies; and more.

In an example, a data protection client enforces centralized and discretionary policies when a user opens a document. Centralized policies are stored in a local policy repository and discretionary policies are stored in a managed document container with the document. When a data protection client intercepts a file open operation on a document, it queries a policy engine for a policy decision. The policy engine evaluates centralized and discretionary policies separately and then combines the policy decisions from the evaluations. Policy evaluation may also produce obligations. Obligations are returned to the data protection client when appropriate.

Figure 13A:
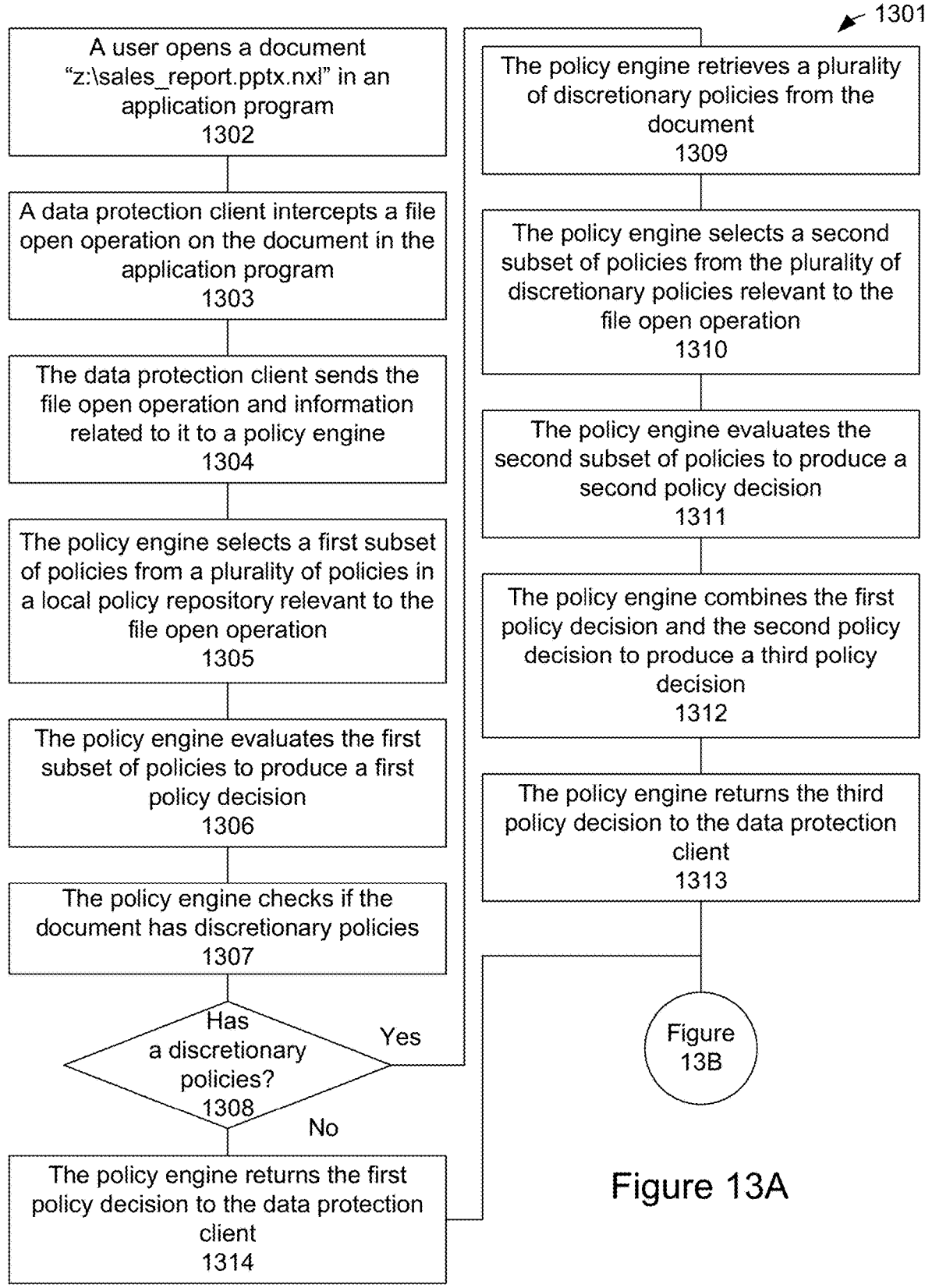
FIGS. 13A-13B show an example flow of a data protection client enforcing centralized and discretionary policies.
Figure 13B:
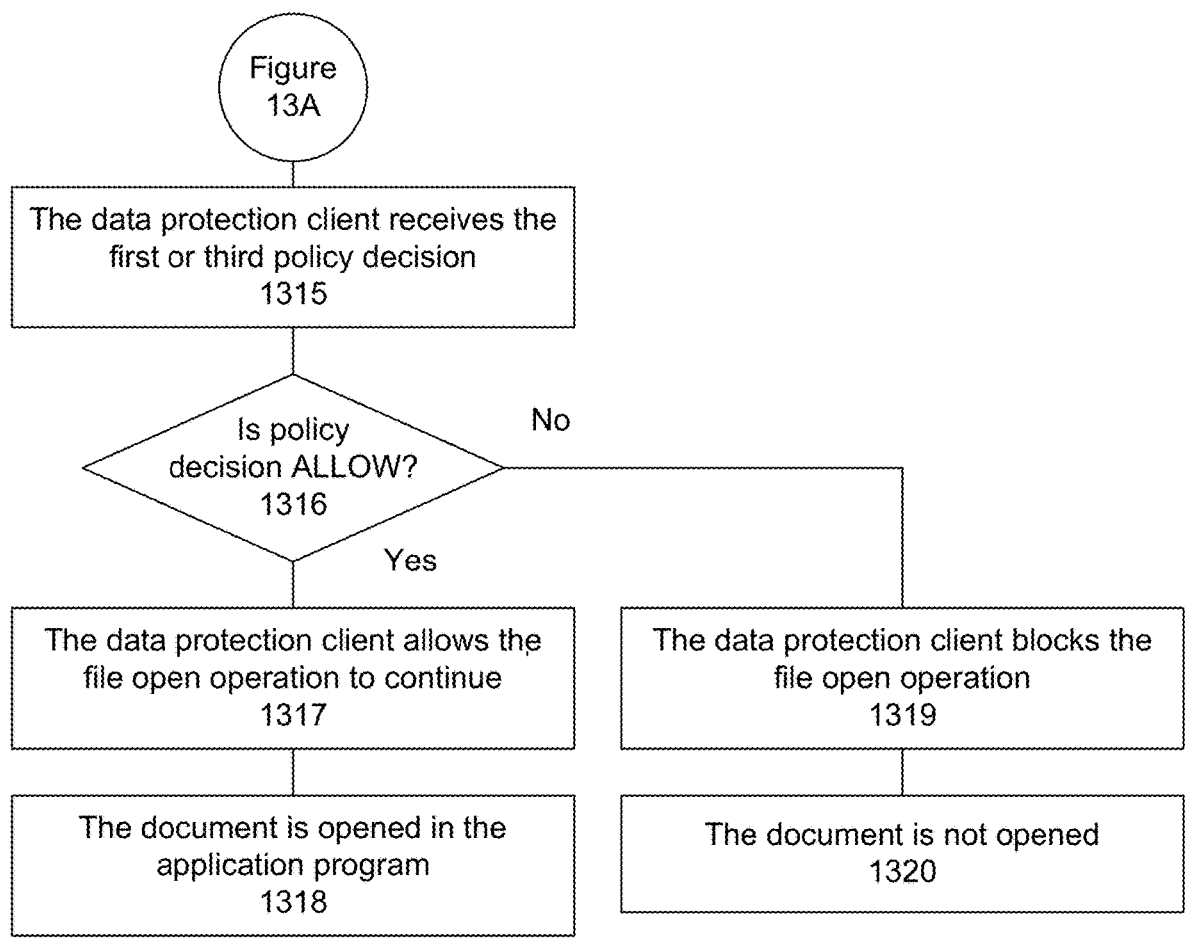

Referring to FIGS. 13A-13B, an example flow 1301 showing a data protection client enforcing centralized and discretionary policies. In step 1302, a user opens a document "z:\sales_report.pptx.nxl" in an application program Microsoft PowerPoint®. The user action invokes a file open operation in the application program. In step 1303, a data protection client intercepts the file open operation. The data protection client collects information related to the file open operation such as file name, file attribute or process identifier. In step 1304, the data protection client sends the file open operation and information it has collected on the file open operation to a policy engine for a policy decision.

In step 1305, the policy engine selects a first subset of policies relevant to the file open operation from a plurality of policies in a local policy repository (or centralized policies). The plurality of policies is sent by a policy server. Typically, a policy engine selects policies that match the document, the user (or a user specified in a request) and file open operation. In step 1306, the policy engine evaluates the first subset of policies to produce a first policy decision. The policy engine may take into account any authority level (described below) associates with a policy in its evaluation to produce a policy decision. If a first policy in the first subset of policies having a first authority level where the first authority level is greater than a second authority level of a second policy in the first subset of policies, the second policy is not evaluated. If a policy in the first subset of policies is not assigned or inherited an authority level, the policy assumes a normal policy level in policy evaluation. Policy evaluation may produce no policy obligation, one, two, three or more policy obligations.

In step 1307, the policy engine checks if the document has discretionary policies. If the document does not have discretionary policies 1308, continue in step 1314. If the document has discretionary policies, in step 1309, the policy engine retrieves a plurality of discretionary policies from the document. If a container service module or encryption service module is installed, the policy engine requests the plurality of discretionary policies from the container service module or encryption service module. In step 1310, the policy engine selects a second subset of policies from the plurality of discretionary policies relevant to the file open operation and the user. In step 1311, the policy engine evaluates the second subset of policies to produce a second policy decision. Policy evaluation is similar to that in step 1306. The policy engine may take into account any authority level associated with a policy in its evaluation to produce a policy decision. A discretionary policy may inherit an authority level from its author if the author is assigned an authority level.

In step 1312, the policy engine combines the first policy decision and the second policy decision using a combining algorithm to produce a third policy decision. Examples of combining algorithms include centralized policies override, discretionary policies override, highest authority level override, and others. A combining algorithm may take into account authority level associated with the first and second policy decisions. In an implementation, if the first policy decision allows the file open operation and the second policy decision does not allow the file open operation, the third policy decision does not allow the file open operation. If the first policy decision does not allow the file open operation and the second policy decision allows the file open operation, the third policy decision allows the file open operation. In another implementation, if the first policy decision allows the file open operation and the second policy decision does not allow the file open operation, the third policy decision allows the file open operation. If the first policy decision does not allow the file open operation and the second policy decision allows the file open operation, the third policy decision does not allow the file open operation.

In step 1313, the policy engine returns the third policy decision to the data protection client. Policy obligations are also returned to the data protection client when appropriate.

If the document does not have discretionary policies (as determined in step 1307), in step 1314, the policy engine returns the first policy decision to the data protection client. Policy obligations are also returned to the data protection client when appropriate.

In step 1315, the data protection client receives the first or third policy decision. If the first or third policy decision is ALLOW 1316, in step 1317, the data protection client allows the file open operation to execute to completion. In step 1318, the document is opened in the application program. If the first or third policy decision is DENY, in step 1319, the data protection client blocks the file open operation. In step 1320, the document is not opened.

The process of evaluating centralized and discretionary policies discussed in this example is for illustration purpose only. Other techniques discussed in this document may be applied. Instead of discarding a competing policy that has a lower authority level, a policy engine may evaluate two competing policies and combine the results based on authority levels. Other evaluation techniques suitable for use with the present invention will be readily apparent to one of ordinary skill in the art.

The data protection client may elect to perform rights enforcement with a plurality of rights granted at its policy enforcement point (PEP) after the document is opened. The policy engine needs to return a plurality of rights granted along with the first or third policy decision to the data protection client. To produce the plurality of rights granted, the policy engine selects a third subset of policies from the plurality of policies in a local policy repository and the plurality of discretionary policies relevant to the user and the document, wherein the third subset of policies is not limited to file open operation. The policy engine analyzes the third subset of policies to produce a plurality of rights granted. The policy engine may take into account authority level while analyzing the third subset of policies.

In an embodiment, authority level is used to prioritize evaluation of policies. A first policy having a first authority level is given priority over a second policy having a second authority level when the first authority level is higher than (or has precedence over) the second authority level. In another word, the first policy overrides the second policy. Both centralized and discretionary policies may have an authority level. Authority level may be assigned to a policy explicitly or inherited though association. A common way to inherit authority level is through association. A policy assumes the authority level of an author of the policy if the author is assigned an authority level. Not all users are assigned authority levels. Similarly, not all policies are assigned authority levels. A policy that is not assigned an authority level is assumed to have a normal authority level. A policy may be assigned a policy level that is higher than a normal authority level or lower than a normal authority level.

An authority level may be an integer, a string, a named value, or others. In an example, authority levels of an information management system are integer values from 1 to 10. Authority level 1 being the lowest authority level and authority level 10 being the highest authority level. Normal authority level is 5. In another example, authority levels of an information management system are named values consisting of Staff, Manager, Normal, Policy Administrator and Executive. Normal is the default authority level. Staff has the lowest authority level and Executive has the highest authority level.

In an example, a centralized policy may be assigned an authority level in an emergency situation allowing it to override other relevant policies before the emergency situation is addressed. In another example, a first user is assigned an authority level Executive that has a higher priority over normal policy level. A discretionary policy authored by the first user will override a centralized policy that is not assigned an authority level in policy evaluation. If the discretionary policy produces a policy effect ALLOW during policy evaluation and the centralized policy produces a policy effect DENY, the combined policy effect is ALLOW. In another example, a first user is assigned a first authority level "Senior Manager" and a second user is assigned a second authority level "Manager" where the first authority level has a higher priority than the second authority level. During policy evaluation, if the first discretionary policy produces policy effect DENY and the second discretionary policy produces policy effect ALLOW, the combined policy effect is DENY.

An authority level may be specified in a policy (e.g., using a policy directive) where the authority level is limited to a policy evaluation involving the policy. An authority level may be assigned to a user using a centralized policy or configuration.

In an example, a first user who is a consultant on temporary assignment at a company. A second user who is a manager at the company supervises the first user on a marketing project. The second user assigns a task to the first user and the task requires access to a protected document "\\server1\marketing\big-campaign.doc". A plurality of centralized policies in an information management system of the company limits access to protected documents in the folder "\\server1\marketing" to members of a marketing department. Since the first user is not a member of the marketing department, the first user does not have access to the protected document.

To enable the first user to work on the assignment, the second user creates a discretionary policy on the protected document granting the first user access to the protected document. The discretionary policy does not produce the desired effect because the information management system gives priority to centralized policies over discretionary policies in policy evaluation. To address the issue, the second user requests an authority level Manager to enable the discretionary policy to override centralized policies. An administrator grants the second user the requested authority level. With the requested authority level in place, the first user is able to open the protected document successfully.

Figure 14:
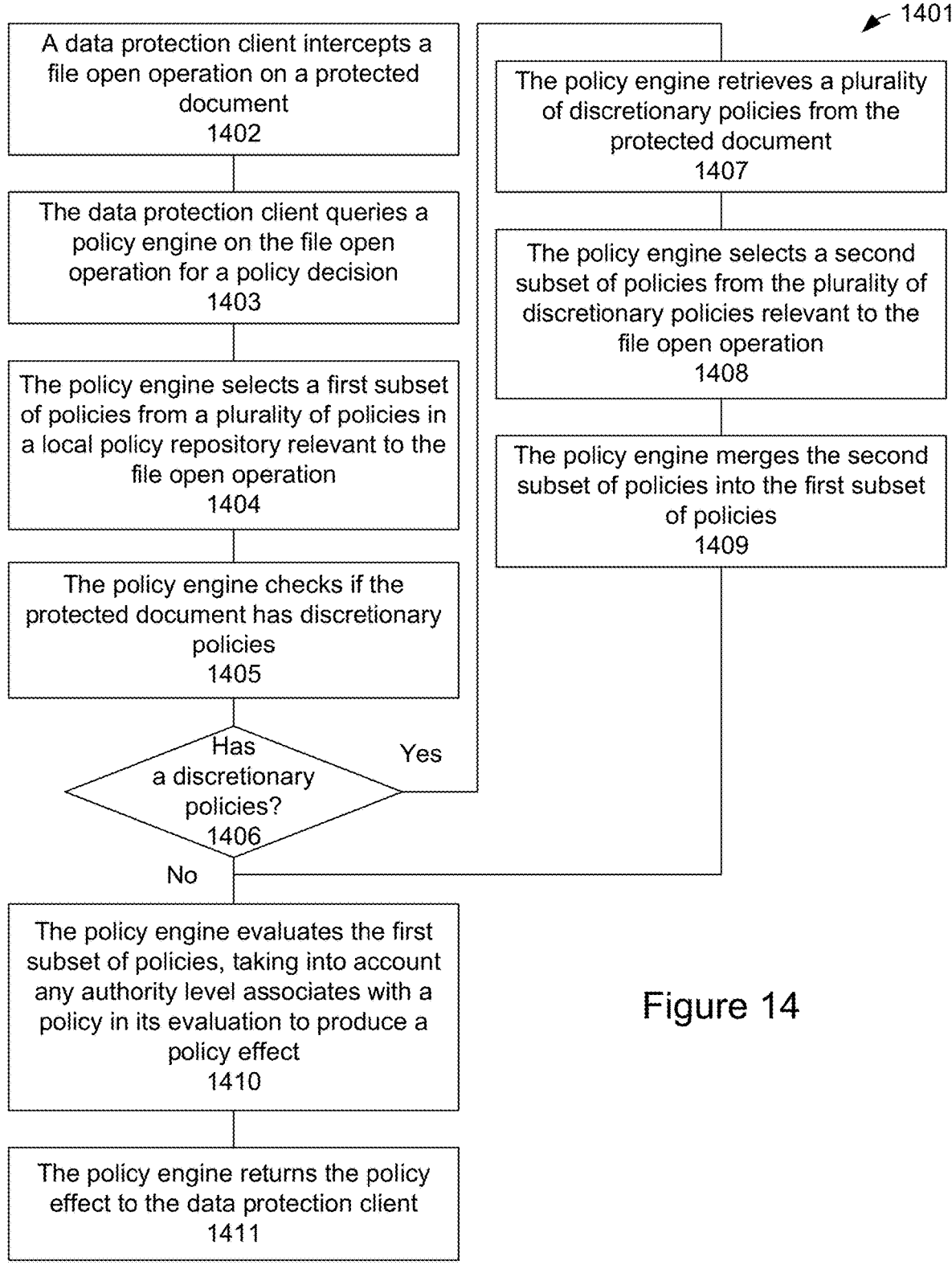
FIG. 14 shows an example flow of policy evaluation with discretionary policies and authority level.

Referring to FIG. 14, an example flow 1401 showing policy evaluation with discretionary policies and authority level. When a first user opens a protected document "\\server1\marketing\big-campaign.doc" in an application program Microsoft® Word. The user action invokes a file open operation in the application program. In step 1402, a data protection client installed in the application program intercepts the file open operation on the protected document. The data protection client collects information relevant to the file open operation such as file path or process identifier. In step 1403, the data protection client queries a policy engine on the file open operation for a policy decision. The data protection client sends the information collected along with the file open operation.

In step 1404, the policy engine selects a first subset of policies from a plurality of policies in a local policy repository (or centralized policies) relevant to the file open operation, the protected document and current user. In step 1405, the policy engine checks if the protected document contains discretionary policies. If the protected document does not contain discretionary policies 1406, continue in step 1410. If the protected document contains discretionary policies, in step 1407, the policy engine retrieves a plurality of discretionary policies from the protected document. If a container service module or encryption service module is installed, the policy engine requests the plurality of discretionary policies from the container service module or encryption service module. In step 1408, the policy engine selects a second subset of policies from the plurality of discretionary policies relevant to the file open operation and current user. In step 1409, the policy engine merges the second subset of policies into the first subset of policies.

In step 1410, the policy engine evaluates the first subset of policies, taking into account any authority level associated with a policy in its evaluation to produce a policy effect. If a first policy in the first subset of policies has a first authority level where the first authority level is greater than a second authority level of a second policy in the first subset of policies, the second policy is not evaluated. If a policy in the first subset of policies is not assigned or inherited an authority level, the policy assumes a normal policy level in policy evaluation. A discretionary policy may inherit an authority level from its author if the author is assigned an authority level. Policy evaluation may produce no policy obligation, one, two, three or more policy obligations.

In step 1411, the policy engine returns the policy effect to the data protection client. Policy obligations are also returned to the data protection client when appropriate. If the policy effect is ALLOW, the data protection client allows the file open operation to execute to completion and the protected document opens in the application program successfully. If the policy effect is DENY, the data protection client blocks the file open operation. The protected document is not opened.

The process of evaluating centralized and discretionary policies discussed in this example is for illustration purpose only. Other techniques discussed in this document may be applied. Instead of discarding a competing policy that has a lower authority level, a policy engine may evaluate two competing policies and combine the results based on authority levels. Other evaluation techniques suitable for use with the present invention will be readily apparent to one of ordinary skill in the art.

In an embodiment, a data protection client composes (or derives) a plurality of rights granted to a user on information or a document based on: an access control list of the information or document, access, use or rights control policies, or combination of these. The plurality of rights granted to the user may also include rights revoked from the user. The plurality of rights composed by the data protection client is stored in a managed document container with the information or document. The plurality of rights is used to enforce access to and use of the information or document in the managed document container and such enforcement is equivalent to or approximates the access and use controls applied to the original information or document that is not stored in the managed document container.

In an embodiment, a data protection client retrieves an access control list (ACL) of information or a document and stores the ACL in a managed document container along with the information or document. A data protection client may store an ACL of the information or document as one or more document attributes in the managed document container. The information or document may reside in a repository including file system, document repository, cloud storage, or others. When the information or document is stored in the managed document container, a data protection client enforces the ACL stored in the managed document container, thereby providing consistent protection to the information or document. To protect the information or document in the managed document container, at least one policy that references the one or more document attributes in a managed document container is needed to enforce access to the information or document in the managed document container.

In an embodiment, a data protection client retrieves an access control list (ACL) of information or a document, translates the ACL into discretionary policies and stores the discretionary policies in a managed document container with the information or document. The information or document may reside in a repository including file system, document repository, cloud storage, or others. When information or a document is stored in the managed document container, a data protection client enforces the discretionary policies stored in the managed document container, thereby providing consistent protection to the information or document.

A file system provides basic access control to a file residing on it. However, when the file is copied or moved outside of the file system, the same basic access control is not guaranteed. By placing a file in a managed document container when the file is copied or moved outside of a file system, consistent protection may be provided to the file in the managed document container. Some examples of files being copied or moved outside a file system include: attaching a file to an e-mail message; archiving a file into a zip file; copying a file on Microsoft® NTFS file system to a folder on Apple OS/X® Extended file system; uploading a file to a website; or others.

Figure 15:
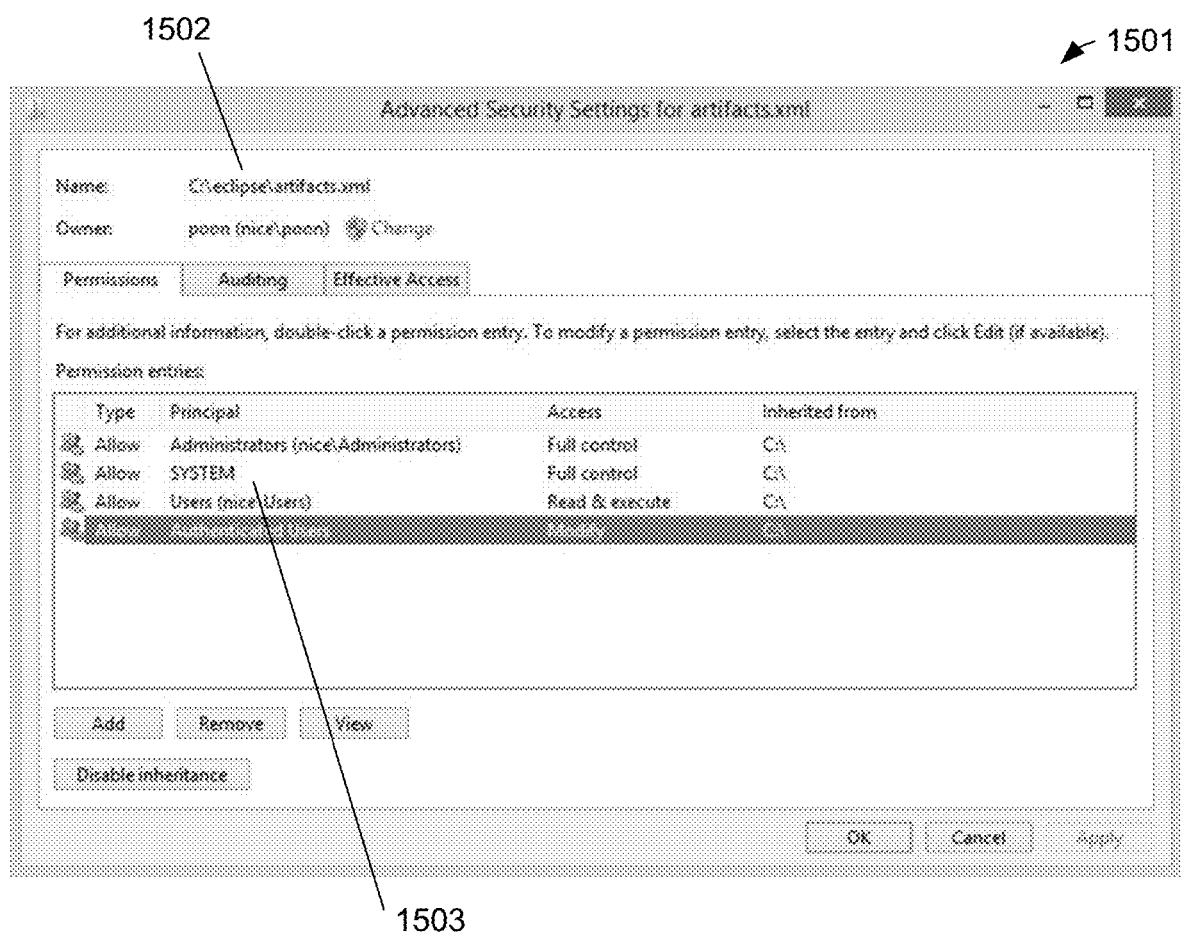
FIG. 15 shows an access control list in Microsoft Windows® displayed in a file properties dialog.

Referring to FIG. 15, a file properties dialog 1501 of Microsoft Windows® shows access permissions of a file 1502 stored on Microsoft® NTFS file system. Access permissions of a file on Microsoft® NTFS are stored in an access control list consists of one or more access control entries 1503. In FIG. 15, the file "c:\eclipse\artifacts.xml" has four access control entries: users of group Administrators (nice\Administrators) are granted permissions of full control; user SYSTEM is granted permissions of full control; users of group Users (nice\Users) are granted read and execute permissions; and users of Authenticated Users is granted modify permission.

Different methods are required to retrieve an access control list (ACL) from different document storages. For a document stored in a file system, a file system application program interface provided by an operating system is generally sufficient to retrieve an ACL on the document. For a document stored in a document repository, a document repository specific application program interface is needed to retrieve an ACL of a document. For a document stored in cloud storage, a cloud storage specific application program interface is needed to retrieve an ACL of a document.

Converting an ACL of a document to discretionary policies stored in a managed document container may be performed automatically via a policy or manually. In an implementation of automatic conversion, ACL to discretionary policies conversion is performed in a policy obligation. For example, a user sends an e-mail message with a document attached, a policy with an ACL-to-discretionary policies conversion policy obligation is evaluated. The ACL-to-discretionary policies conversion policy obligation converts an ACL to discretionary policies without any user intervention. In an implementation of manual conversion, a file protection dialog box provides an ACL to discretionary policies conversion option. The file protection dialog box is displayed when a user clicks on a file protection button in an application program. A user may decide if discretionary policies should be generated from an ACL of a document. For example, when a user saves or exports a document from document repository such as product lifecycle management application or Microsoft SharePoint®, the user is prompted with a file protection dialog where the user may choose to convert an ACL of the document. When a user attaches a document to an e-mail message, the user is prompted with a file protection dialog having an option to convert the ACL of the document to discretionary policies.

A document may be converted (or saved) into a managed document container while it is opened in an application program. A user may also convert a document from a file browser (e.g., Microsoft Windows® File Explorer) into a managed document container without opening the document. Conversion of a document into a managed document container may also be triggered by a policy. For example, a user saves a document into a public folder that is accessible by many users. A policy specifies a document saved to the public folder that is not a managed document container should be converted into a managed document container. A data protection client intercepts the file save operation and converts the document into a managed document container according to the policy.

In an example, a data protection client converts an access control list (ACL) of a document into discretionary policies and saves the discretionary policies in a managed document container with the document. A data protection client installs a file protection menu item or button in an application to allow a user to save a document opened in the application program in a managed document container.

Referring to FIG. 16, an example flow 1601 showing a data protection client converting an access control list of a document "q:\personal_data.xlsx" opened in an application program Microsoft Excel® into discretionary policies according to centralized policies. In step 1602, User A clicks on a file protection button on a ribbon of the application program. In step 1603, the user action invokes a file protection operation in the data protection client. The data protection client determines rights (or digital rights) that different users may have on the document. In an implementation, the rights are derived in part based on ACL of the document. With an ACL of the document, the data protection client may transfer rights assigned to the document to the managed document container and allow the rights to be enforced even when the managed document container is copied or moved to a different computing environment. In step 1604, the data protection client retrieves an ACL of the document using an application program interface of an operating system. If the document is stored in a repository, the data protection client retrieves an ACL of the document using an application program interface of the repository.

In step 1605, a policy engine selects a subset of policies relevant to the file protection operation, the document and ACL-to-rights conversion from a plurality of policies in a local policy repository of the data protection client. The plurality of policies is provided by a policy server. In step 1606, the policy engine evaluates the subset of policies with the ACL to determine a plurality of rights to grant to User B on the document. The plurality of rights granted determines what operations User B is allowed to perform on the document. Examples of rights that may be granted to User B include view, edit, copy, extract, convert, print, send, decrypt, annotate, classify, assign or screen capture. In step 1607, optionally, User A modifies the plurality of rights granted to User B on the document. User A may grant additional rights to User B, or revoke rights that are granted to User B by the ACL. To grant rights to additional users, steps 1606 and 1607 may be repeated for each user or each group of users.

In step 1608, the data protection client generates a plurality of discretionary policies to grant the plurality of rights to User B on the document. In an implementation, the plurality of discretionary policies is declarative policies. In another implementation, the plurality of discretionary policies is represented as simple lists of rights granted to specific users. In yet another implementation, the plurality of discretionary policies is translated into access or use control policies. In step 1609, the data protection client encrypts the plurality of discretionary policies to produce encrypted discretionary policies. Typically, discretionary policies stored in a managed document container are encrypted to protect them from being tampered.

In step 1610, the data protection client creates a managed document container and stores the encrypted discretionary policies and content of the document into the managed document container. Subsequent access to and use of the document stored in the managed document container is controlled by at least the encrypted discretionary policies. In an implementation, a data protection client enforces only the encrypted discretionary policies in a managed document container. In another implementation, a data protection client enforces a combination of the plurality of policies in the local policies repository and the encrypted discretionary policies in a managed document container.

In an example, a data protection client converts an access control list (ACL) of a document into discretionary policies and saves the discretionary policies in a managed document container with the document. A data protection client installs a file protection menu item or button in an application to allow a user to save a document opened in the application program in a managed document container.

In an example, a data protection client converts an access control list (ACL) of a document into discretionary policies and saves the discretionary policies in a managed document container with encrypted content of the document. A data protection client installs a file protection menu item or button in an application to allow a user to save a document opened in the application program in a managed document container.

Figure 17:
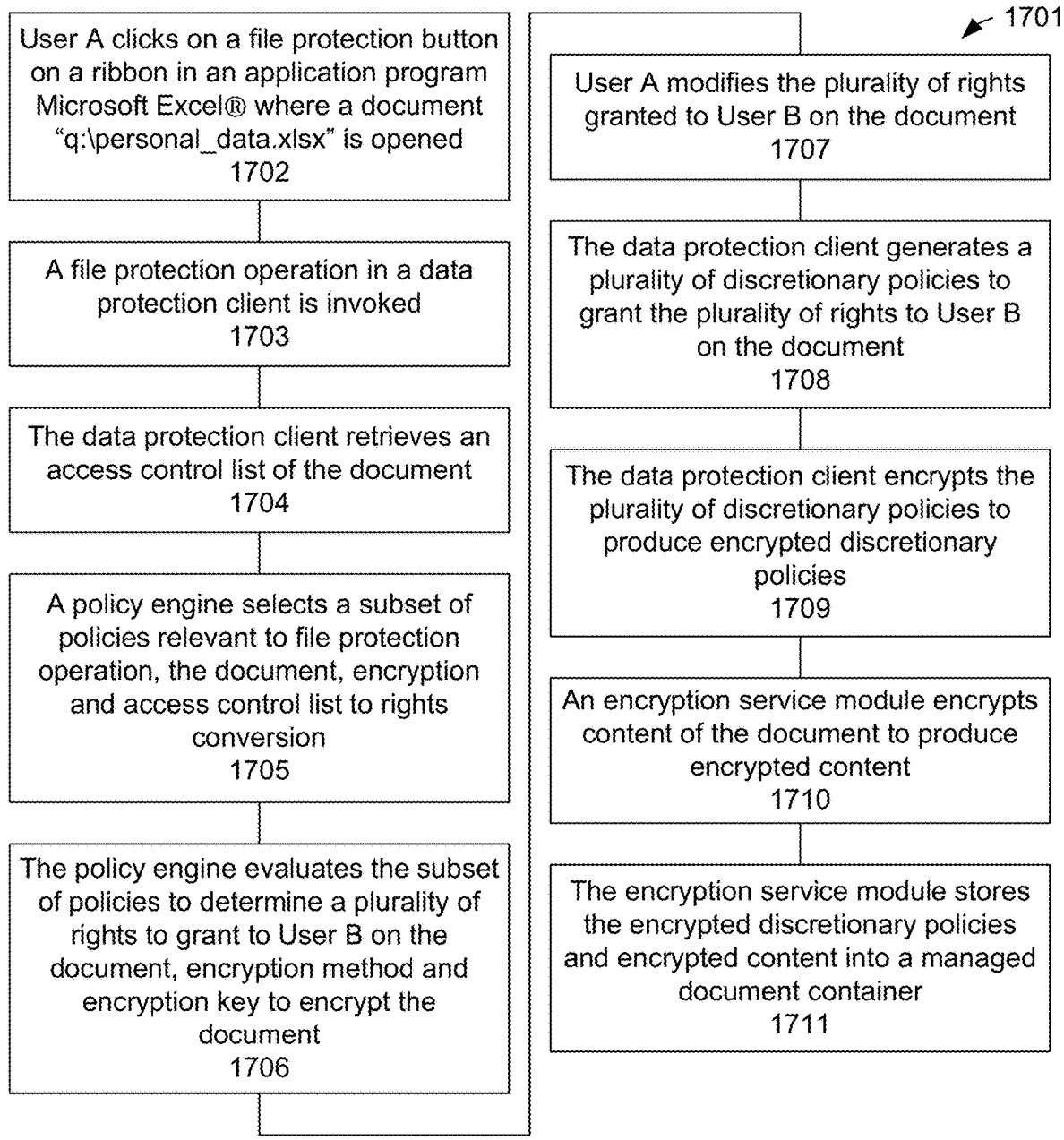
FIG. 17 shows an example flow of converting an access control list of a document into discretionary policies and encrypting the document according to centralized policies.

Referring to FIG. 17, an example flow 1701 showing a data protection client converting an access control list of a document "q:\personal_data.xlsx" opened in an application program Microsoft Excel® into discretionary policies and encrypting the document according to centralized policies. In step 1702, User A clicks on a file protection button on a ribbon of the application program. In step 1703, the user action invokes a file protection operation in the data protection client. The data protection client determines rights (or digital rights) that different users may have on the document. In an implementation, the rights are derived in part based on ACL of the document. With an ACL of the document, the data protection client may transfer rights assigned to the document to the managed document container and allow the rights to be enforced even when the managed document container is copied or moved to a different computing environment. In step 1704, the data protection client retrieves an ACL of the document using an application program interface of an operating system. If the document is stored in a repository, the data protection client retrieves an ACL of the document using an application program interface of the repository.

In step 1705, a policy engine selects a subset of policies relevant to a file protection operation, the document, encryption and ACL-to-rights conversion from a plurality of policies in a local policy repository of the data protection client. The plurality of policies is provided by a policy server. In an implementation, encryption method and encryption key are determined by policies. In another implementation, encryption method and encryption key are not determined by policies and encryption method and encryption key are provided by a key management client (described further below). In step 1706, the policy engine evaluates the subset of policies with the ACL to determine a plurality of rights to grant to User B on the document, and encryption method and encryption key to encrypt the document. The plurality of rights granted determines what operations User B is allowed to perform on the document. Examples of rights that may be granted to User B include view, edit, copy, extract, convert, print, send, decrypt, annotate, classify, assign or screen capture. In step 1707, optionally, User A modifies the plurality of rights granted to User B on the document. User A may grant additional rights to User B, or revoke rights that are granted to User B by the ACL. To grant rights to additional users, steps 1706 and 1707 may be repeated for each user or each group of users.

In step 1708, the data protection client generates a plurality of discretionary policies to grant the plurality of rights to User B on the document. In an implementation, the plurality of discretionary policies is declarative policies. In another implementation, the plurality of discretionary policies is represented as simple lists of rights granted to specific users. In yet another implementation, the plurality of discretionary policies is translated into access or use control policies. In step 1709, the data protection client encrypts the plurality of discretionary policies to produce encrypted discretionary policies. Typically, discretionary policies stored in a managed document container are encrypted to protect them from being tampered.

In step 1710, an encryption service module encrypts content of the document to produce encrypted content. The encryption method and encryption key used to encrypt the document may be provided by the policy engine, a key management client or another source as described in step 1706.

In step 1711, the encryption service module creates a managed document container and stores the encrypted discretionary policies and the encrypted content into the managed document container. Subsequent access to and use of the document stored in the managed document container is controlled by at least the encrypted discretionary policies. In an implementation, a data protection client enforces only the encrypted discretionary policies in a managed document container. In another implementation, a data protection client enforces a combination of the plurality of policies in the local policies repository and the encrypted discretionary policies in a managed document container.

In another example, access control list (ACL) to discretionary policies conversion is the function of a policy obligation. An access control list to discretionary policies conversion (ACL2DP) policy obligation retrieves an ACL of a document, converts the ACL into discretionary policies, and saves the discretionary policies in a managed document container. The policy obligation may retrieve an ACL using an application program interface of an operating system or an application program interface of a repository. An ACL2DP policy obligation may be combined with an encryption policy obligation in a policy to encrypt a document and add discretionary policies to a document.

Figure 18A:
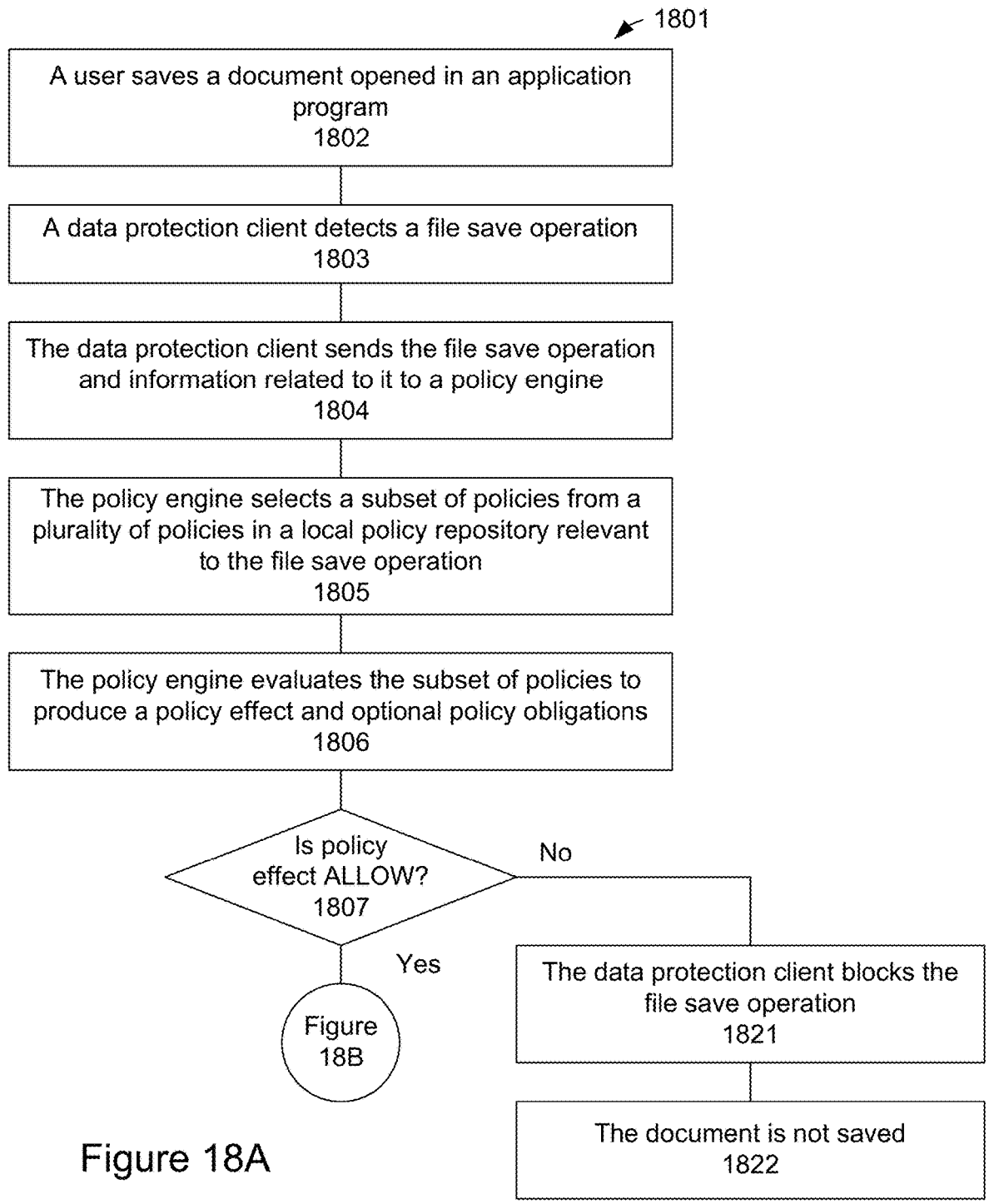
FIGS. 18A-18C show an example flow of converting an access control list of a document into discretionary policies and encrypting a document according to centralized policies and policy obligations.
Figure 18B:
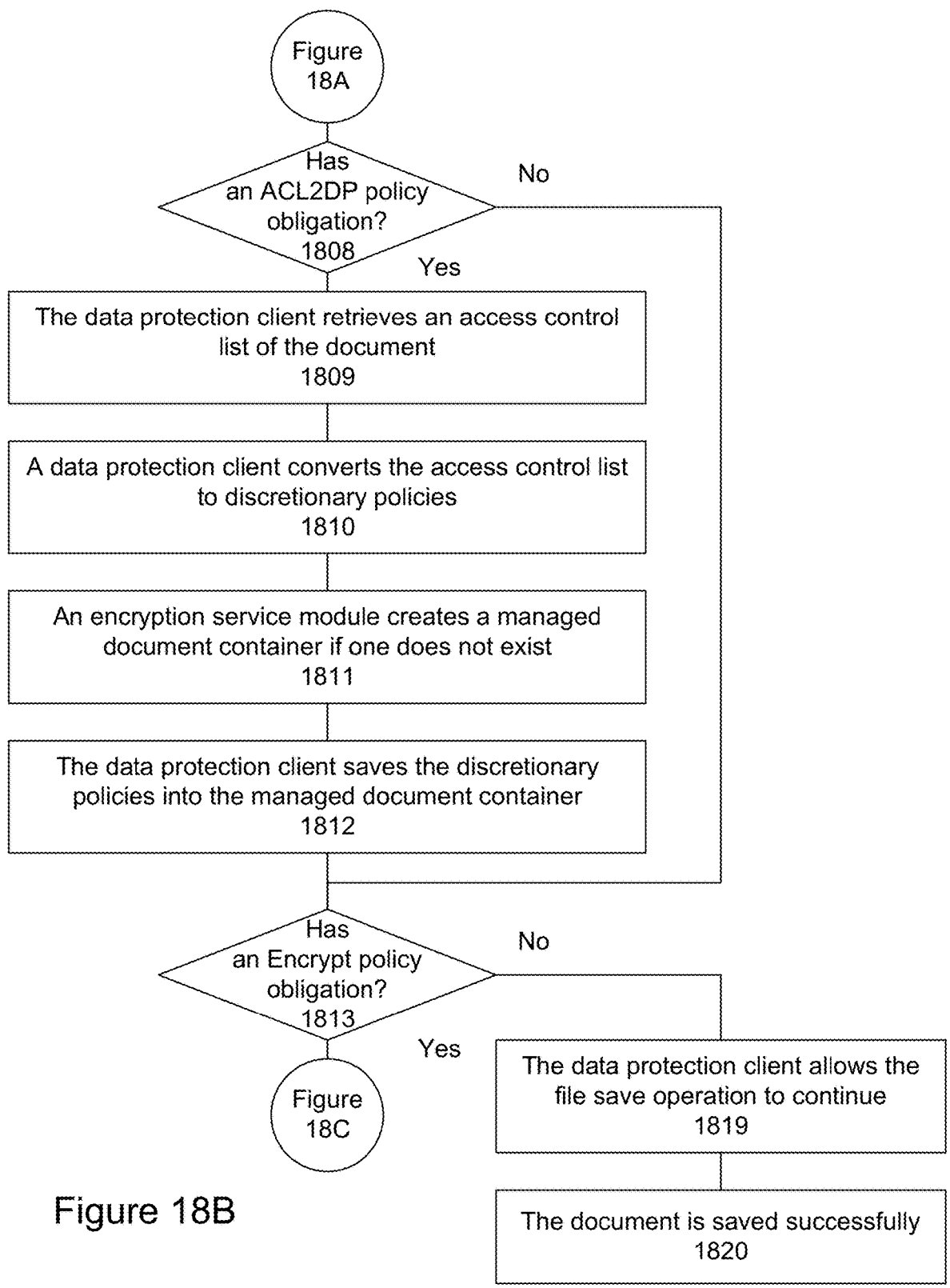
Figure 18C:
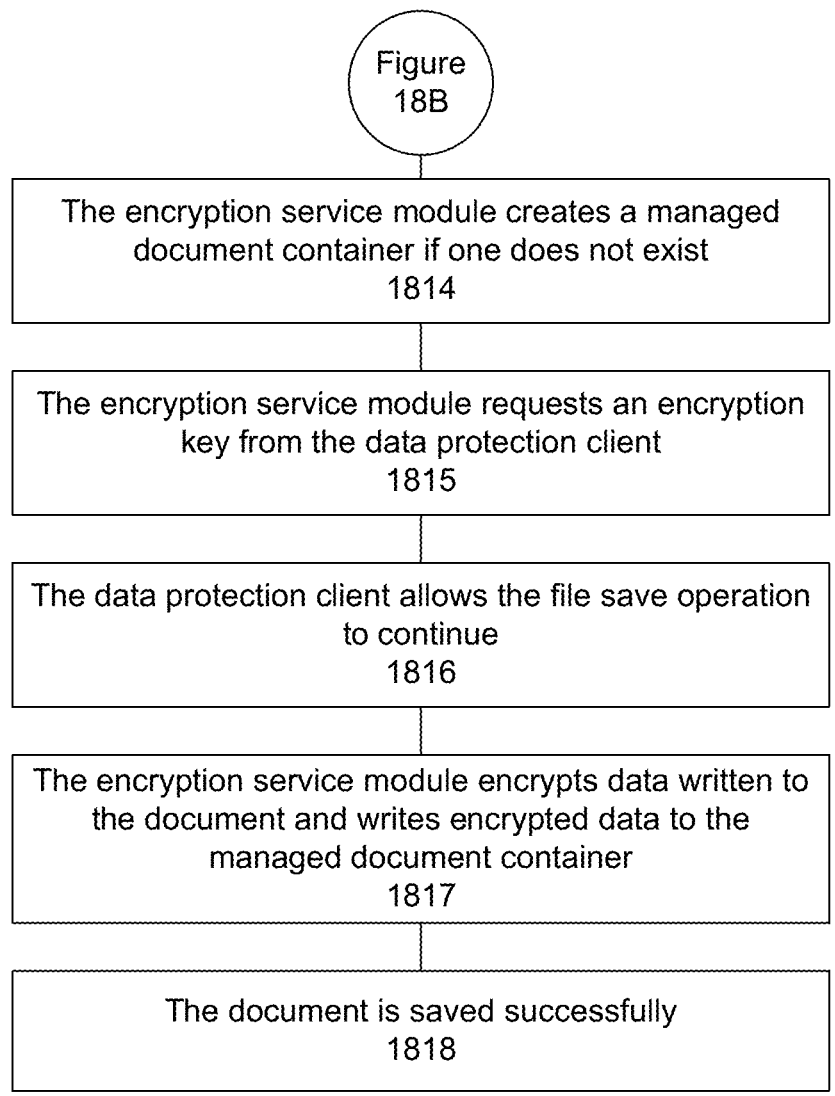

Policy-AUC-ACLDP-EN
FOR document.name="*.xlsx" AND documentlocation="q:\**"
ON SAVE
BY Sales-Staff
DO ALLOW AND ACL2DP AND ENCRYPT Referring to FIGS. 18A-18C, an example flow showing 1801 a data protection client converting an access control list of a document "q:\personal_data.xlsx" opened in an application program Microsoft Excel® into discretionary policies and encrypting the document according to centralized policies. In step 1802, a user saves the document in the application program. The user action invokes a file save operation in the application program. In step 1803, a data protection client detects the file save operation. The data protection client collects information related to the file save operation including file name, file attribute or process identifier. In step 1804, the data protection client sends the file save operation and information it has collected to a policy engine.

In step 1805, the policy engine selects a subset of policies a plurality of policies in a local policy repository relevant to the file save operation, the document and the user. The subset of policies includes the policy Policy-AUC-ACLDP-EN. In step 1806, the policy engine evaluates the subset of policies to produce a policy effect and optional policy obligations. The policy engine returns the policy effect and optional policy obligations to the data protection client. If the policy effect is ALLOW 1807, proceed to step 1808 (process ACL2DP policy obligation). If the policy effect is DENY, proceed to step 1821 (deny file save operation).

In step 1808 (process ACL2DP policy obligation), determine if an ACL2DP policy obligation is included in the optional policy obligations. If an ACL2DP policy obligation is found, in step 1809, the data protection client implements the ACL2DP policy obligation by retrieving an ACL of the document. Since the document is a file, the data protection client calls an application program interface of an operating system to retrieve an ACL of the document. In step 1810, the data protection client converts the ACL to discretionary policies. Converting an ACL to discretionary policies include mapping file operations such as read, write or change attribute to corresponding actions. In addition, the user or group identities specified in an ACL need to be mapped to user or group identities known to an information management system. In step 1811, an encryption service module creates a managed document container if one does not exist. In step 1812, the data protection client saves the discretionary policies into the managed document container. If an ACL2DP policy obligation is not found, proceed to step 1813 (process Encrypt policy obligation).

In step 1813 (process Encrypt policy obligation), determine if an Encrypt policy obligation is included in the optional policy obligations. If an Encrypt policy obligation is found, in step 1814, the encryption service module creates a managed document container for the document if one does not exist. In step 1815, the encryption service module requests an encryption key from the data protection client. The encryption key will be used to encrypt document content in subsequent file write operations. In step 1816, the data protection client allows the file save operation to continue. In step 1817, the encryption service module encrypts data written to the document and writes encrypted data to the managed document container. In step 1818, The document is saved successfully. If an Encrypt policy obligation is not found, in step 1819, the data protection client allows the file save operation to continue. In step 1820, the document is saved successfully.

In step 1821 (deny file save operation), the data protection client blocks the file save operation. In step 1822, the document is not saved.

A data protection client protects information or documents in place (or data-at-rest) from unauthorized access when it is active. Protecting information or a document in place refers to protecting information or a document without requiring the information or document be moved to a protected storage or environment. For example, a document may be protected in place while it is stored on a desktop computer, a file server, a Microsoft SharePoint® server, or a SAP® application server.

Protecting information or documents in place has its limitations. Situations exist that the information or documents may be accessed while a data protection client is inactive or a copy of information or a document is transmitted to a device that is not protected by a data protection client. In an example, when a document is physically removed from a computing device (e.g., removing a hard disk from a laptop computer), the document that was protected by a data protection client becomes unprotected. In another example, when a document is being sent from a first computing device to a second computing device (or data-in-motion), the document is not protected while data is being transmitted unless a transport provides end-to-end encryption. In yet another example, when a document is sent to a recipient via an e-mail message, the copy of the document sent in an e-mail message may not be adequately protected even after it arrives at its destination (i.e., data-in-distribution). In yet another example, if a document is uploaded to a server (e.g., file server, Microsoft SharePoint®, ERP system, or PLM system), the document may not be adequately protected at the destination.

In order to provide persistent protection to information or documents no matter if the information or documents are at rest, in motion or in distribution, the information or documents should be encrypted. By encrypting information or a document with a data protection client and an encryption service module (described further below), the information or document becomes inaccessible to unauthorized users. An encryption service module compliments a data protection client by extending document protection from data-at-rest to include data-in-motion and data-in-distribution.

Data-at-rest refers to information or documents stored temporary or permanently on a storage device. Some examples of storage devices include volatile memory, hard disk, CD-ROM, DVD-ROM, Flash drive, Flash card, tape, or others. Data-in-motion refers to information or documents being transmitted via a transport but before it reaches its destination. Some examples of data-in-motion include: an e-mail message en route to a recipient's mailbox; a file being transferred using file transfer protocol; a file or a webpage being downloaded from a Web server (e.g., using HTTP protocol); a file being uploaded to a Web server (e.g., using HTTP protocol); a message or a file being sent using an instant messaging program; or others. Data-in-distribution refers to copies of information or documents that are not under control of the original owners of the information or documents. A copy of information or a document may reside inside or outside the realm managed by an information management system. Some examples of data-in-distribution include: a file is attached to an e-mail message and sent to a mailing list outside of an organization; a file is uploaded to a public Web site; a file copied to a removable device to be passed to another person; a file copied to a CD ROM or a DVD ROM that may be removed from a computer; content of a document is copied to a chat room or an instant messenger; or others.

A container service module is an add-on to a data protection client. A container service module has two key functions. First, it provides an application program interface to a data protection client to access data in a managed document container (described further below). Second, it makes access to information or a document in a managed document container transparent to an application program that the application may not aware of the information or documents being stored in a managed document container.

A container service module does not perform access or use control on information or a document. Access and use controls are functions of a data protection client. To avoid access and use controls being bypassed, a container service module queries a data protection client the first time information or a document is accessed from an application program. When a container service module intercepts a file open operation from an application program (or a process), it queries a data protection client for past policy evaluation results (i.e., policy effects). If a past policy evaluation is found and policy effect is ALLOW, the container service module allows the file open operation to execute to completion. Otherwise, the container service module blocks the file open operation thereby denying the user access to the document. In an implementation, the container service module blocks the file open operation only if a past policy evaluation is found and policy effect is DENY.

A container service module also acts as a data access layer of a data protection client. A data protection client retrieves, updates or deletes discretionary policies in a managed document container through a container service module. For example, a data protection client may request a container service module to check if a managed document container has discretionary policies and retrieve all discretionary policies if they are available.

To make common file access to a document in a managed document container transparent to an application program, a container service module intercepts file access operations and makes modifications to the file access operations. The file access operations include open, read, write, rename and change attribute. In an example, a container service module intercepts a file read operation from an application program, the container service module modifies the start position of the file read operation to include an offset to the start of the document in the managed document container. The container service module reads the requested content of the document and returns the requested content to the application program. In another example, a container service module intercepts a file write operation from an application program, the container service module modifies the start position of the file write operation to include an offset to the start of the document in the managed document container. The container service module writes data provided in the file write operation to the managed document container before returning to the application program.

An implementation of a container service module may include a file system driver or a file system filter driver running in the kernel of an operating system.

A container service module is an add-on to a data protection client. A container service module may work with managed document container written in a variety of file.

An encryption service module is a container service module that stores information or a document encrypted. An encryption service module implements the functions of a container service module and it makes encryption and decryption transparent to an application program. Encryption service module is an add-on to a data protection client. It does not perform access or use control on information or documents. It also does not manage encryption keys.

To make common file access to a document in a managed document container transparent to an application program, an encryption service module intercepts file access operations and makes modifications to the file access operations. The file access operations include open, read, write, rename and change attribute. An encryption service module also requests an encryption key from a data protection client for encryption and decryption. In an example, an encryption service module intercepts a file read operation from an application program, the encryption service module modifies the start position of the file read operation to include an offset to the start of the document in the managed document container. The encryption service module reads the requested content of the document from a managed document container, decrypts the requested content of the document before returning it to a read operation and returns the decrypted requested content to the application program. In another example, an encryption service module intercepts a file write operation from an application program, the encryption service module encrypts the data in a write operation and modifies the start position of the file write operation to include an offset to the start of the document in the managed document container. The encryption service module writes the encrypted data to the managed document container before returning to the application program.

The capabilities that makes access to information or a document in a managed document container and encryption or decryption of content transparent to common file input and output programming interfaces are collectively referred to as transparent encryption and decryption in this document.

An implementation of an encryption service module may include a file system driver or a file system filter driver running in the kernel of an operating system.

A data protection client releases an encryption key to an encryption service module only if the application program that accesses a managed document container is deemed trusted. To establish trust on an application program, a data protection client requires that an application program instance (or a process) be instrumented by the data protection client and the data protection client has recently intercepted a file open operation on a managed document container in the application program instance and the data protection client has allowed the file open operation. An application program instance that is entrusted to access unencrypted content in a managed document container on behalf of a user is referred to as a trusted application program instance. While an application program instance may be trusted by a data protection client to access a first document, the application program instance may not be trusted to access a second document.

Before an encryption service module encrypts or decrypts information or a document, it requests an encryption key for the information or document from a data protection client. To request an encryption key to decrypt content in a managed document container, an encryption service module provides in a request at least an encryption key identifier and a process identifier of the application program instance that attempts to access the information or document. If the application program instance is to be trusted, the data protection client returns an encryption key associated with the key identifier. In an implementation, an encryption service module uses an open-cipher based encryption algorithm to encrypt content of information or a document including advanced encryption standard, data encryption standard, skipjack, blowfish, or other ciphers.

In an embodiment, an encryption service module intercepts a file open operation on a document in a managed document container of an application program instance (or process). The encryption service module retrieves an encryption key identifier from the managed document container and requests an encryption key with the encryption key identifier, a process identifier of the application process instance and other related information.

The data protection client checks its policy evaluation cache to find a policy evaluation associated with the application program instance, the managed document container and the user that occurred recently. If a matching policy evaluation is found and policy effect is ALLOW, the data protection client looks up its encryption key cache to locate an encryption key associated with the encryption key identifier. If an encryption key is not found in the encryption key cache, the data protection client queries a key management server for an encryption key using the encryption key identifier. The encryption key returned from the key management server is placed in the encryption key cache and returned to the encryption service module. Otherwise, the data protection client returns encryption key not found status or an error code to the encryption service module.

If the encryption service module receives an encryption key, it allows the file open operation to continue and caches the encryption key so that it may be used in subsequent file read or write operations. If the encryption service module does not receive an encryption key, it allows the file open operation to continue. In subsequent file read or write operations, the encryption service module returns encrypted content (i.e., cipher text) in the managed document container. In an implementation where the encryption service module does not receive an encryption key, the encryption service module blocks the file open operation thereby preventing the application program instance from opening the document.

When the application program reads the document, the encryption service module intercepts a file read operation on the document. The encryption service module finds an encryption key from its encryption key cache. If an encryption key is found, the encryption service module reads the encrypted content of the document in the managed document container requested by the file read operation and decrypts the encrypted content of the document using the encryption key to produce unencrypted content. The unencrypted content is returned with the file read operation. If an encryption key is not found, the encryption service module reads the encrypted content of the document in the managed document container requested by the file read operation and returns the encrypted content with the file read operation.

The sample flow described above assumes that a file read operation is always preceded by a file open operation. This assumption is valid on most file input and output application program interfaces (e.g., PO SIX® open, close, read and write; or Microsoft Windows® FileOpen, FileClose, Read-File and WriteFile) on modern operating systems (e.g., Linux®, Microsoft Windows®). If a file input and output application program interface does not require a file open operation, the functions performed in a file open operation interception may be moved to the first file read or write operation.

In an embodiment, classification of a document is driven by policies. A policy may be one of access, use or rights control policy. A data protection client intercepts a file operation, evaluates and enforces policies, implements a document classification policy obligation to produce document classifications, and stores document classifications with a document. A file operation may be save, copy, open, create, move, send, attach, upload, download, paste, encrypt, decrypt, or others. A document classification may be a string, integer, object, or others. A document classification stored with a document may be referenced by a policy and used in making policy decision. Typically, document classification is implemented as policy obligation, although it is also possible to implement document classification using document classification policies. Document classification may be automatically (i.e., driven by a policy) or manual (i.e., inputted by a user). Automatic and manual document classification may be combined such that a result from automatic document classification is presented to and modified by a user before it is stored with a document.

A document classification policy obligation may determine classifications of a document based on its author, location of a document being saved to, computer that a document is created on, metadata of a document, content of a document, annotations find in a document, or more. In an example, a document classification policy obligation sets document classification to Confidential if a document is saved to "\\server1\confidential\". In another example, a document classification policy obligation sets document classification to Marketing if a document is created by an employee who is a member of a marketing team. In yet another example, a document classification policy obligation sets document classification to Export-Controlled if it finds a particular keyword or key phrase such as "Export Controlled" or "Project X" in a document.

Document classifications may be stored as metadata of a document, extended file system attributes, metadata in a managed document container, or others. Many methods of storing and retrieving document attributes (or ancillary data) are described in detail in U.S. patent applications 61/357, 016, filed Jun. 21, 2010 and Ser. No. 13/165,730, filed Jun. 21, 2011, which are incorporated by reference.

In an example, classification of a document is performed in a policy obligation and the policy obligation is invoked when a user saves a document. A file save operation is detected and a policy engine evaluates a policy with an AutoClassify or UserClassify policy obligation. If policy evaluation returns an AutoClassify policy obligation, a data protection client implements the AutoClassify policy obligation causing the document to be classified without any user intervention. Alternatively, if policy evaluation returns an UserClassify policy obligation, a data protection client implements the UserClassify policy obligation by prompting a user to enter classifications on the document. In another example, document classification is invoked when a user exports a document from a document repository such as a product lifecycle management application or Microsoft SharePoint®. In yet another example, classification rules are specified in policies wherein document classification is an output of policy evaluation.

Explicit user driven document classification (e.g., selecting a Classify menu item) may be implemented using policy driven document classification. For example, a classify action, a policy having a classify action and a document classification policy obligation, an interceptor that handles a classify menu item event may be added to an information management system. A user interface element such as a Classify button that generates a classify menu item event is also needed in an application program. When a user clicks on the Classify button, an interceptor intercepts a classify menu item event. Policy evaluation associated with the interception returns a document classification policy obligation which results in document classification being implemented.

Figure 19A:
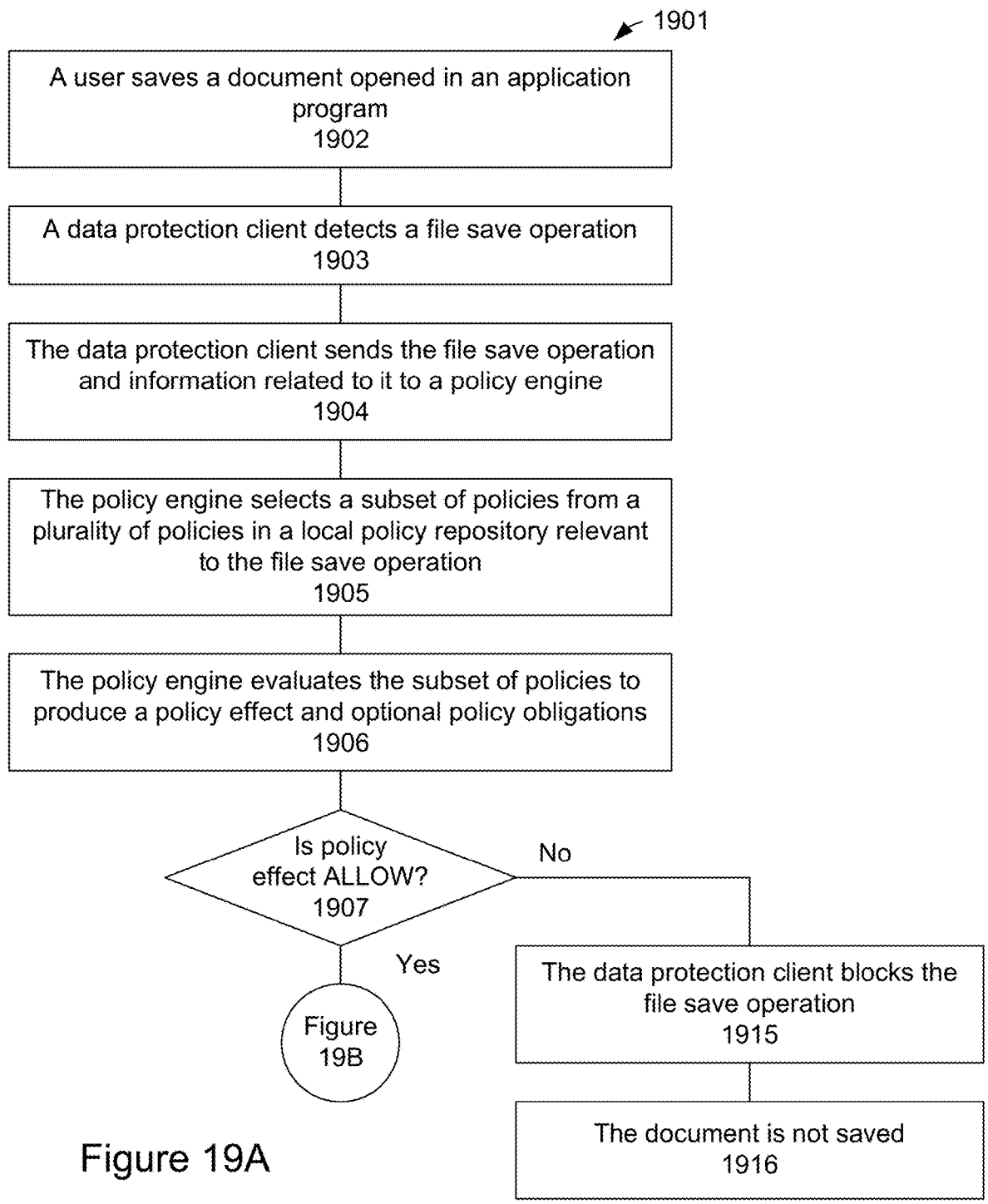
FIGS. 19A-19B show an example flow of classifying a document automatically according to policies.
Figure 19B:
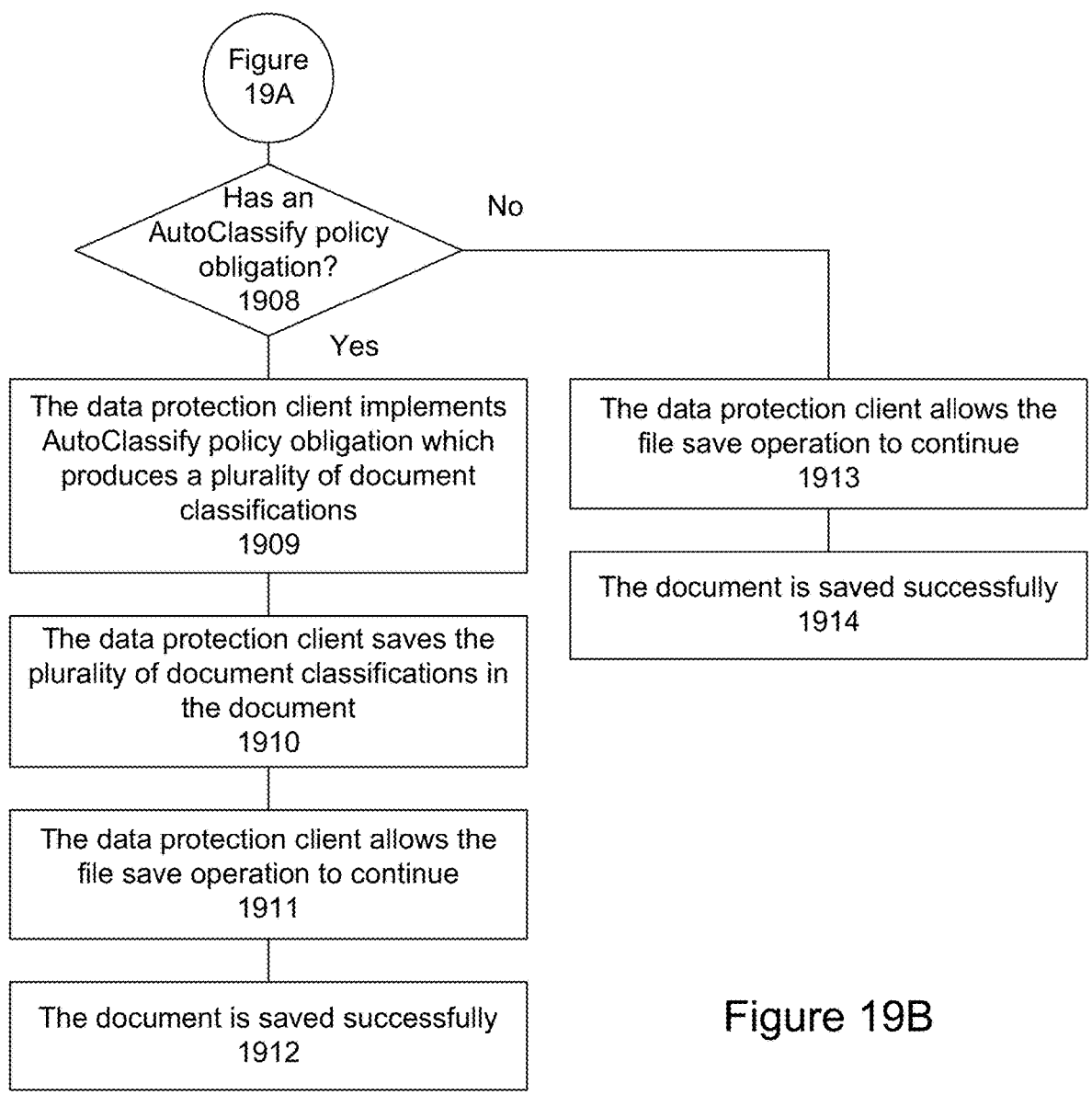

In an example, classifications of a document are performed automatically and document classifications are stored in the document. A policy Policy-AUC-AC specifying an AutoClassify policy obligation causes document classification to be implemented when a user saves the document. AutoClassify policy obligation is implemented in a data protection client and document classifications produced by it are save in the document. Subsequent access to or use of the document is controlled by policies and document classifications in the document. The policy is:

Policy-AUC-AC
FOR document.name="*.docx"
ON SAVE
By IT-Staff
DO ALLOW AND AutoClassify Referring to FIGS. 19A-19B, an example flow 1901 showing a user saving a document "c:\network\backbone_diagrams.docx" opened in an application program Microsoft® Word on a computer with a data protection client installed. In step 1902, the user saves the document opened in the application program. The user action invokes a file save operation in the application program. In step 1903, the data protection client detects the file save operation. It collects information related to the file save operation such as file name, file attribute or process identifier. In step 1904, the data protection client sends the file save operation and information it has collected to a policy engine for a policy decision.

In step 1905, the policy engine selects a subset of policies from a plurality of policies in a local policy repository relevant to the file save operation, the document and the user. The subset of policies includes the policy Policy-AUC-AC. In step 1906, the policy engine evaluates the subset of policies to produce a policy effect and optional policy obligations. The optional policy obligations include an AutoClassify policy obligation from the policy. The policy engine returns the policy effect and optional policy obligations to the data protection client.

If the policy effect is ALLOW 1907 and the optional policy obligations include an AutoClassify policy obligation 1908, in step 1909, the data protection client implements AutoClassify policy obligation. The AutoClassify policy obligation analyzes the document and produces a plurality of document classifications. In step 1910, the data protection client saves the plurality of document classifications in the document. In step 1911, the data protection client allows the file save operation to continue. In step 1912, the document is saved successfully.

If the policy effect is ALLOW and the policy obligations does not include an AutoClassify policy obligation, in step 1913, the data protection client allows the file save operation to continue. In step 1914, the document is saved successfully.

If the policy effect is DENY, in step 1915, the data protection client blocks the file save operation. In step 1916, the document is not saved.

Figure 20A:
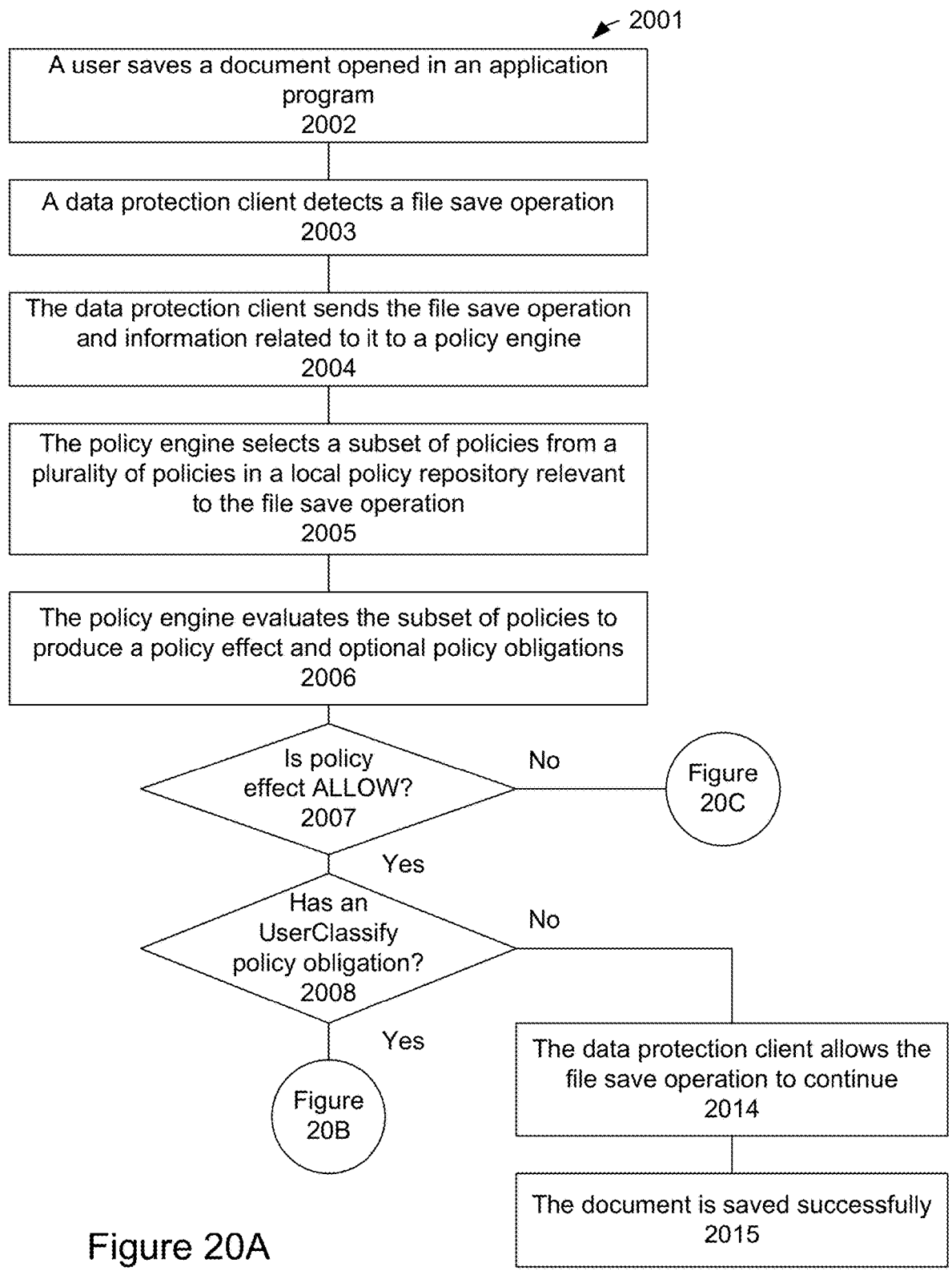
FIGS. 20A-20C show an example flow of classifying a document by a user according to policies.
Figure 20B:
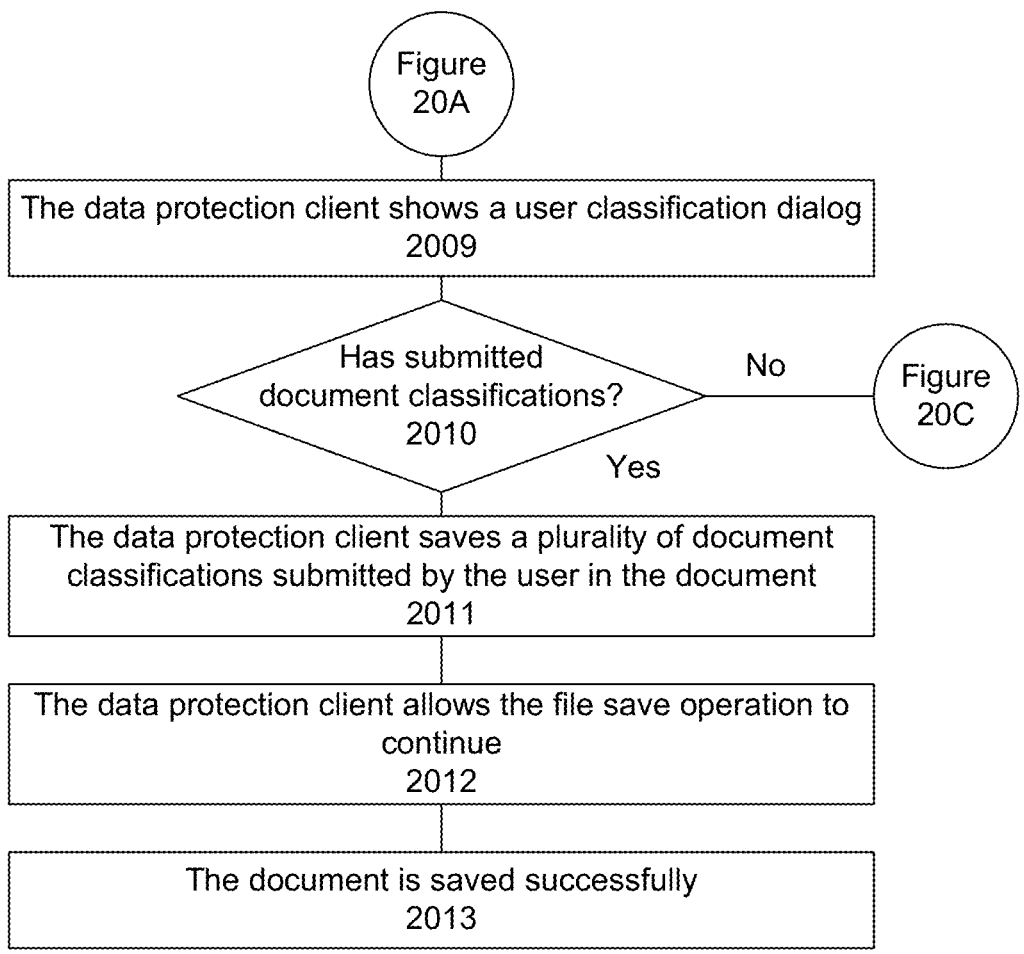
Figure 20C:
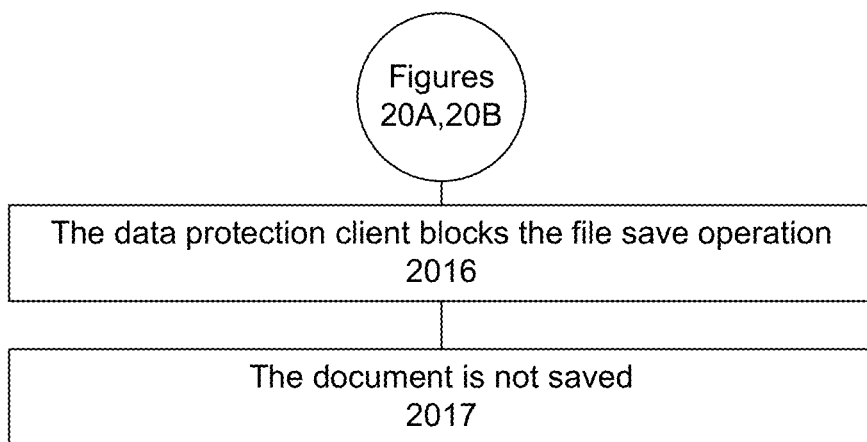

In an example, classifications of a document are entered by a user and document classifications are stored in the document. A policy Policy-AUC-UC specifying a UserClassify policy obligation causes document classification to be implemented when a user saves the document. UserClassify policy obligation is implemented in a data protection client, it queries a user for document classifications and document classifications are save in the document. Subsequent access to or use of the document is controlled by policies and document classifications in the document. The policy is:

Policy-AUC-UC
FOR document.name="*.txt"
ON SAVE
By IT-Staff
DO ALLOW AND UserClassify Referring to FIGS. 20A-20C, an example flow 2001 showing a user saving a document "c:\finance\sales_data.txt" opened in an application program Microsoft® Notepad on a computer with a data protection client installed. In step 2002, the user saves the document opened in the application program. The user action invokes a file save operation in the application program. In step 2003, the data protection client detects the file save operation. It collects information related to the file save operation such as file name, file attribute or process identifier. In step 2004, the data protection client sends the file save operation and information it has collected to a policy engine for a policy decision.

In step 2005, the policy engine selects a subset of policies from a plurality of policies in a local policy repository relevant to the file save operation, the document and current user. The subset of policies includes the policy Policy-AUC-UC. In step 2006, the policy engine evaluates the subset of policies to produce a policy effect and optional policy obligations. The optional policy obligations include an UserClassify policy obligation from the policy. The policy engine returns the policy effect and optional policy obligations to the data protection client.

If the policy effect is ALLOW 2007 and the optional policy obligations include an UserClassify policy obligation 2008, in step 2009, the data protection client implements the UserClassify policy obligation by displaying a user classification dialog to allow the user to input document classifications of the document 2010. Before displaying a user classification dialog, a data protection client may analyze the document and produces a plurality of initial document classifications. The plurality of initial document classifications may be used to: set initial values in the user classification dialog; provide suggestion to the user; or create one or more options that the user may select from. When a user finishes inputting document classifications, the user may submit the input document classifications to the data protection client or cancel without submitting any document classification. The data protection client continues to process the UserClassify policy obligation. If the user has submitted a plurality of document classifications, in step 2011, the data protection client saves a plurality of document classifications submitted by the user in the document. In step 2012, the data protection client allows the file save operation to continue. In step 2013, the document is saved successfully. If the user has not submitted a plurality of document classification (e.g., cancelled the user classification dialog), continue in step 2016.

If the policy effect is ALLOW and the policy obligations does not include an UserClassify policy obligation, in step 2014, the data protection client allows the file save operation to continue. In step 2015, the document is saved successfully.

If the policy effect is DENY, in step 2016, the data protection client blocks the file save operation. In step 2017, the document is not saved.

In an embodiment, encrypting a document is driven by policies. A policy may be one of access, use or rights control policy. A data protection client intercepts a file operation, evaluates and enforces policies, implements an encryption policy obligation, and stores encrypted content in a managed document container. A file operation may be save, open, create, copy, move, send, attach, upload, download, paste, encrypt, decrypt, or others. Typically, encryption is implemented as policy obligation, although it is also possible to implement encryption using encryption policies. Encryption may be combined with document classification where a result from document classification may affect decision to encrypt a document.

Encrypting a document may be performed automatically via a policy. A policy with an encryption policy obligation directs a data protection client to encrypt a document. In an example, when a user sends an e-mail message with a document attached or a user attaches a document to an e-mail message, an encryption policy obligation from policy evaluation may direct a data protection client to encrypt the document before sending or attaching the document. In another example, a user exports a document from a document repository such as a product lifecycle management application or Microsoft SharePoint®, an encryption policy obligation from policy evaluation may direct a data protection client to encrypt the document. In another example, a user uploads a document to a document repository such as a SAP® application server or Microsoft SharePoint®, an encryption policy obligation from policy evaluation may direct a data protection client to encrypt the document.

Explicit user driven document encryption (e.g., selecting an Encrypt menu item) may be implemented using policy driven encryption. For example, an encrypt action, a policy having an encrypt action and an encryption policy obligation, an interceptor that handles an encrypt menu item event may be added to an information management system. A user interface element such as an Encrypt button that generates an encrypt menu item event is also needed in an application program. When a user clicks on the Encrypt button, an interceptor intercepts an encrypt menu item event. Policy evaluation associated with the interception returns an encryption policy obligation which results in the document being encrypted.

Figure 21A:
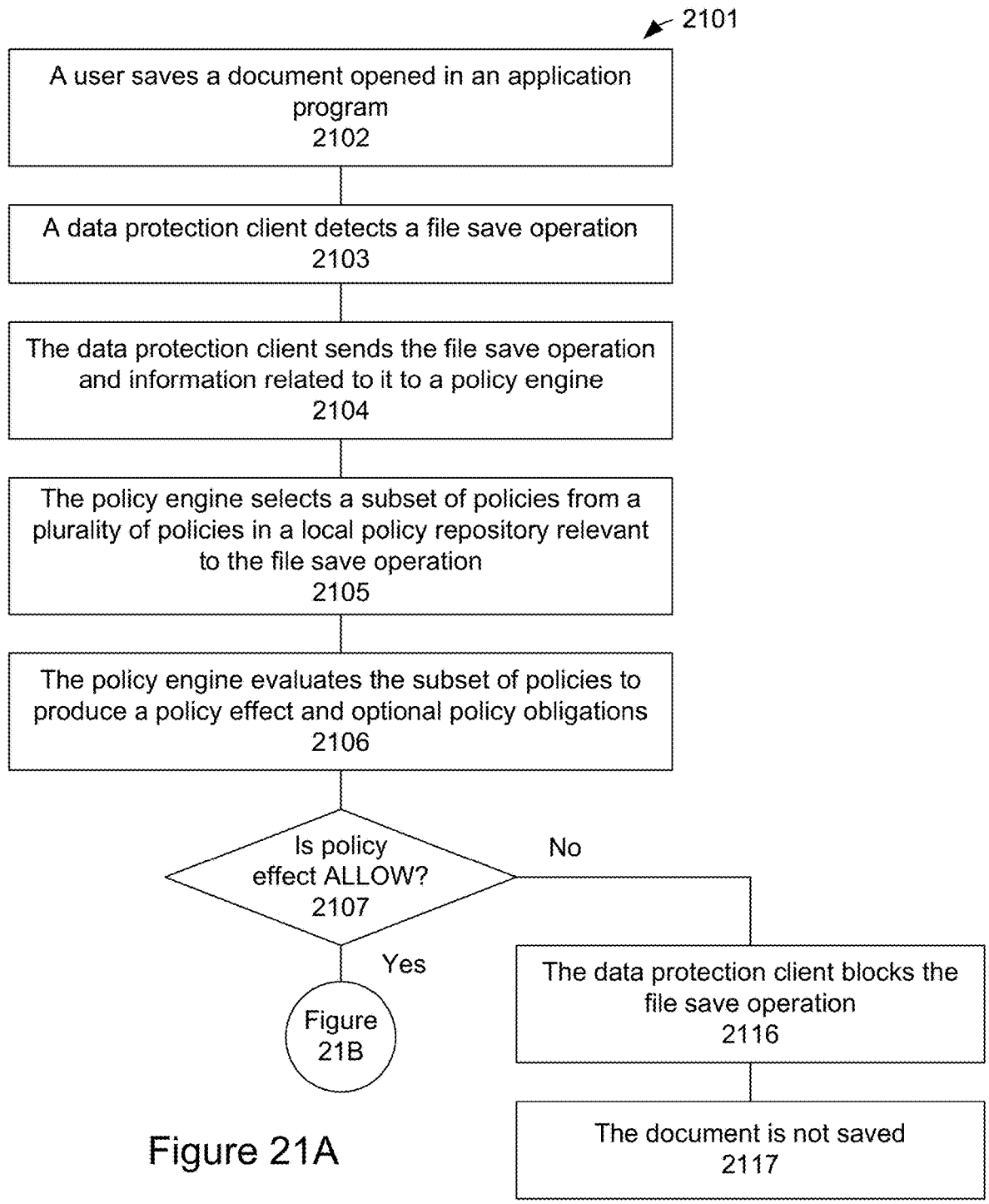
FIGS. 21A-21B show an example flow of encrypting a document according to policies.
Figure 21B:
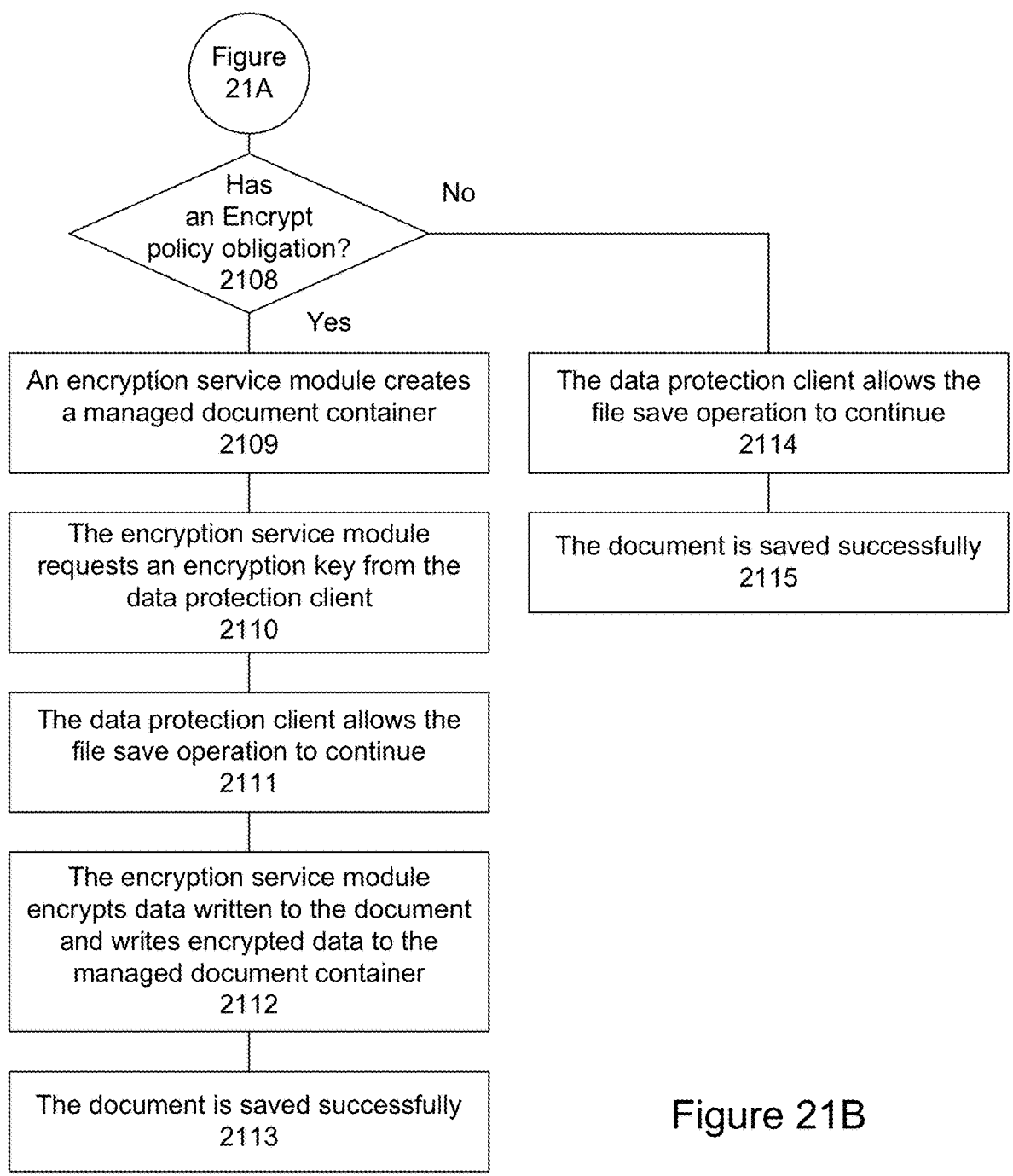
Figure 22A:
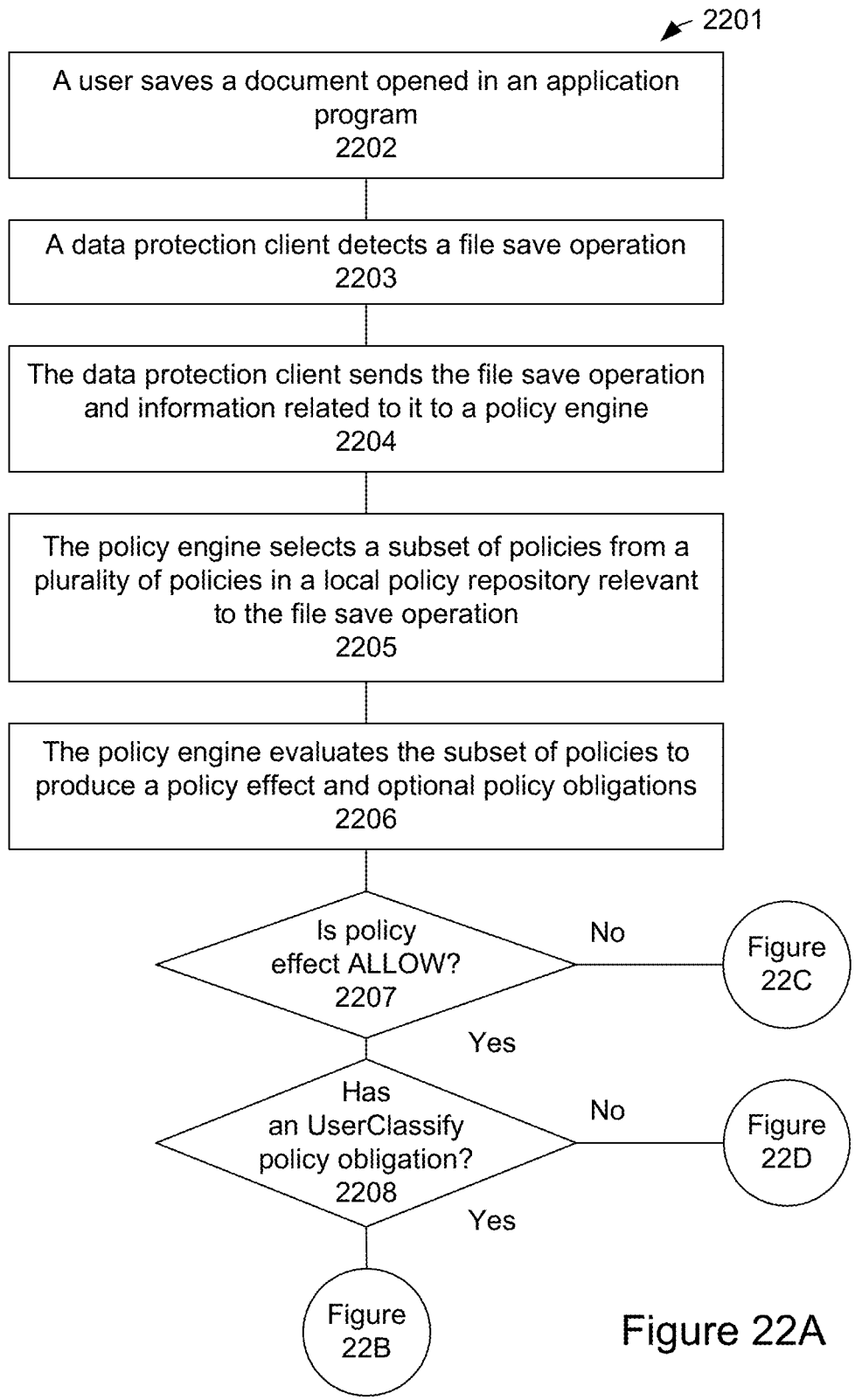

In an example, a data protection client encrypts a document automatically via policies when a user saves the document and the encrypted document is stored in a managed document container. Encryption of the document is performed by an encryption service module working in concert with a data protection client which enforces access or use to the document and provides an encryption key to the encryption service module. A policy Policy-AUC-EN having an Encrypt policy obligation directs the data protection client and the encryption service module to encrypt the document. The policy is:
Policy-AUC-EN
FOR document.name="customer_list.xlsx"
ON SAVE
By Staff
DO ALLOW AND Encrypt Referring to FIGS. 21A-21B, an example flow 2101 showing a user saving a document "c:\customer_list.xlsx" opened in an application program Microsoft Excel® on a computer with a data protection client installed. In step 2102, the user saves the document in the application program. The user action invokes a file save operation in the application program. In step 2103, a data protection client detects the file save operation. The data protection client collects information relevant to the file save operation including file name, file attribute or process identifier. In step 2104, the data protection client sends the file save operation and information it has collected to a policy engine.

In step 2105, the policy engine selects a subset of policies from a plurality of policies in a local policy repository relevant to the file save operation. The policy engine matches policies with the file save operation, file name, file attribute, the user (or a user specified in a request) and other criteria. The subset of policies includes the policy Policy-AUC-EN. In step 2106, the policy engine evaluates the subset of policies to produce a policy effect and optional policy obligations. The policy engine returns the policy effect and the optional policy obligations to the data protection client.

If the policy effect is ALLOW 2107 and the optional policy obligations include an Encrypt policy obligation 2108, in step 2109, an encryption service module creates a managed document container for the document if one does not exist. In step 2110, The encryption service module requests an encryption key from the data protection client. The encryption key will be used to encrypt document content in subsequent file write operations. In step 2111, the data protection client allows the file save operation to continue. In step 2112, The encryption service module encrypts data written to the document and writes encrypted data to the managed document container. In step 2113, The document is saved successfully.

If the policy effect is ALLOW and the optional policy obligations do not include an Encrypt policy obligation, in step 2114, the data protection client allows the file save operation to continue. In step 2115, the document is saved successfully.

If the policy effect is DENY, in step 2116, the data protection client blocks the file save operation. In step 2117, the document is not saved.

An encryption policy obligation and a document classification policy obligation may be combined so that encryption is conditioned on the result of document classification. The condition may be specified in an expression. For example, an expression may specify if a particular document classification is present, or it may be logical combinations of document attributes (e.g., EncryptIf(document.class="top secret" OR (environment.location="design lab" AND device.type="laptop"))).

In an example, a data protection client queries a user to enter classifications of a document when the user saves the document. The document classifications entered by the user are used by the data protection client to decide if the document should be encrypted. The data protection client saves the document classifications in a managed document container. If the document should be encrypted, encrypted content of the document is stored in the managed document container. If the document should not be encrypted, content of the document is stored in the managed document container. A policy Policy-AUC-AC-EN having a document classification policy obligation and an encryption policy obligation directs the data protection client to implement document classification and encryption. The policy is:
Policy-AUC-AC-EN
FOR document.name="*.docx" AND document.location="C:\*"
ON SAVE
BY Staff
DO ALLOW AND UserClassify
AND EncryptIf(document.confidential=TRUE OR document.financial-report=TRUE)

Referring to FIGS. 22A-22D, an example flow 2201 showing a user saving a document "c:\q1_finacials.docx" in an application program Microsoft® Word on a computer with a data protection client and an encryption service module installed. In step 2202, the user saves the document in the application program. The user action invokes a file save operation in the application program. In step 2203, a data protection client detects the file save operation. The data protection client collects information related to the file save operation including file name, file attribute or process identifier. In step 2204, the data protection client sends the file save operation and information it has collected to a policy engine.

In step 2205, the policy engine selects a subset of policies a plurality of policies in a local policy repository relevant to the file save operation, the document and the user. The subset of policies includes the policy Policy-AUC-AC-EN. In step 2206, the policy engine evaluates the subset of policies to produce a policy effect and optional policy obligations. The policy engine returns the policy effect and optional policy obligations to the data protection client. If the policy effect is ALLOW 2207, proceed to step 2208 (process UserClassify policy obligation). If the policy effect is DENY, proceed to step 2222 (deny file save operation).

In step 2208 (process UserClassify policy obligation), determine if an UserClassify policy obligation is included in the optional policy obligations. If an UserClassify policy obligation is found, in step 2209, the data protection client implements the UserClassify policy obligation by displaying a user classification dialog. The user classification dialog allows the user to input document classifications of the document 2210. When a user finishes inputting document classifications, the user may submit the input document classifications to the data protection client or cancel without submitting any document classification. The data protection client continues to process the UserClassify policy obligation. If the user has submitted a plurality of document classification, in step 2211, the data protection client saves a plurality of document classifications submitted by the user in the document. The data protection client proceeds to process EncryptIf policy obligation in step 2212. If the user has not submitted a plurality of document classification (e.g., cancelled the user classification dialog), proceed to step 2222 (deny file save operation).

In step 2212 (process EncryptIf policy obligation), determine if an EncryptIf policy obligation is included in the optional policy obligations. If an EncryptIf policy obligation is found, in step 2213, the data protection client evaluates a condition in EncryptIf policy obligation. The condition contains document attributes returned from UserClassify policy obligation. If the condition is evaluated to true 2214, in step 2215, an encryption service module creates a managed document container for the document if one does not exist. In step 2216, the encryption service module requests an encryption key from the data protection client. The encryption key will be used to encrypt document content in subsequent file write operations. In step 2217, the data protection client allows the file save operation to continue. In step 2218, the encryption service module encrypts data written to the document and writes encrypted data to the managed document container. In step 2219, the document is saved successfully. If the condition is evaluated to false, proceed to step 2220 (native file save operation). If an EncryptIf policy obligation is not found, proceed to step 2220 (native file save operation).

In step 2220 (native file save operation), the data protection client allows the file save operation to continue. In step 2221, the document is saved successfully.

In step 2222 (deny file save operation), the data protection client blocks the file save operation. In step 2223, the document is not saved.

In an implementation, a data protection client queries a policy engine a second time after it implements a document classification policy obligation which results in changes in document classification. The combining of document classification and encryption in the previous example may be implemented using two policies. For example, a first policy Policy-AUC-AC-EN-2-1 in a first policy evaluation invokes a document classification policy obligation which may produce a document classification. Since there is a change in document classifications on a document, the data protection client queries the policy engine a second time. The policy engine evaluates the first policy and a second policy Policy-AUC-AC-EN-2-2 and it produces a document classification policy obligation and an encryption policy obligation. The document classification policy obligation is ignored since it was implemented after the first policy evaluation. The data protection client implements the encryption policy obligation to encrypt the document. The first and second policies are:

Policy-AUC-AC-EN-2-1
FOR document.name="*.docx" AND document.location="C:\**"
ON SAVE
BY Staff
DO ALLOW AND UserClassify
Policy-AUC-AC-EN-2-2
FOR document.name="*.docx" AND document.location="C:\**" AND
(document.confidential=TRUE OR document.financialreport=TRUE)
ON SAVE
BY Staff
DO ALLOW AND Encrypt In an embodiment, encrypting a document is driven by configuration. A plurality of configurations determines whether document classification should be performed. For example, a configuration may specify that a document saved to "c:\confidential" should be classified by a user. A data protection client provides the functionalities of automatic and manual document classifications as discussed above.

In an embodiment, a text, graphics, or image pattern is layered on top of information or a document being displayed or printed. This layer of text, graphics, or image layered on top of information or a document is called overlay and it is generally semi-transparent. Overlay is similar to a watermark but it is always layered on top of information or a document and it is dynamic, driven by policies. Content of an overlay (e.g., "Confidential" or "Top Secret") is specified in an overlay policy obligation and implemented by a data protection client. An overlay policy obligation may be specified with a view right in a rights control policy or an open action in an access control policy.

In an example, a user opens a document "C:\secret\secret_formula.docx" in an application program Microsoft® Word. The document contains some company secrets and should be protected with an overlay stating that the document is a company secret along with current user name and current time when it is viewed. A policy Policy-RC-OV that grants a view right to the user also specifies an overlay policy obligation and a text message to use in an overlay. The policy is:

Policy-RC-OV
GRANT VIEW RIGHT
TO Executive
ON "C:\secret\**"
DO Overlay("Company Secret, $username, $datetime")

Figure 23A:
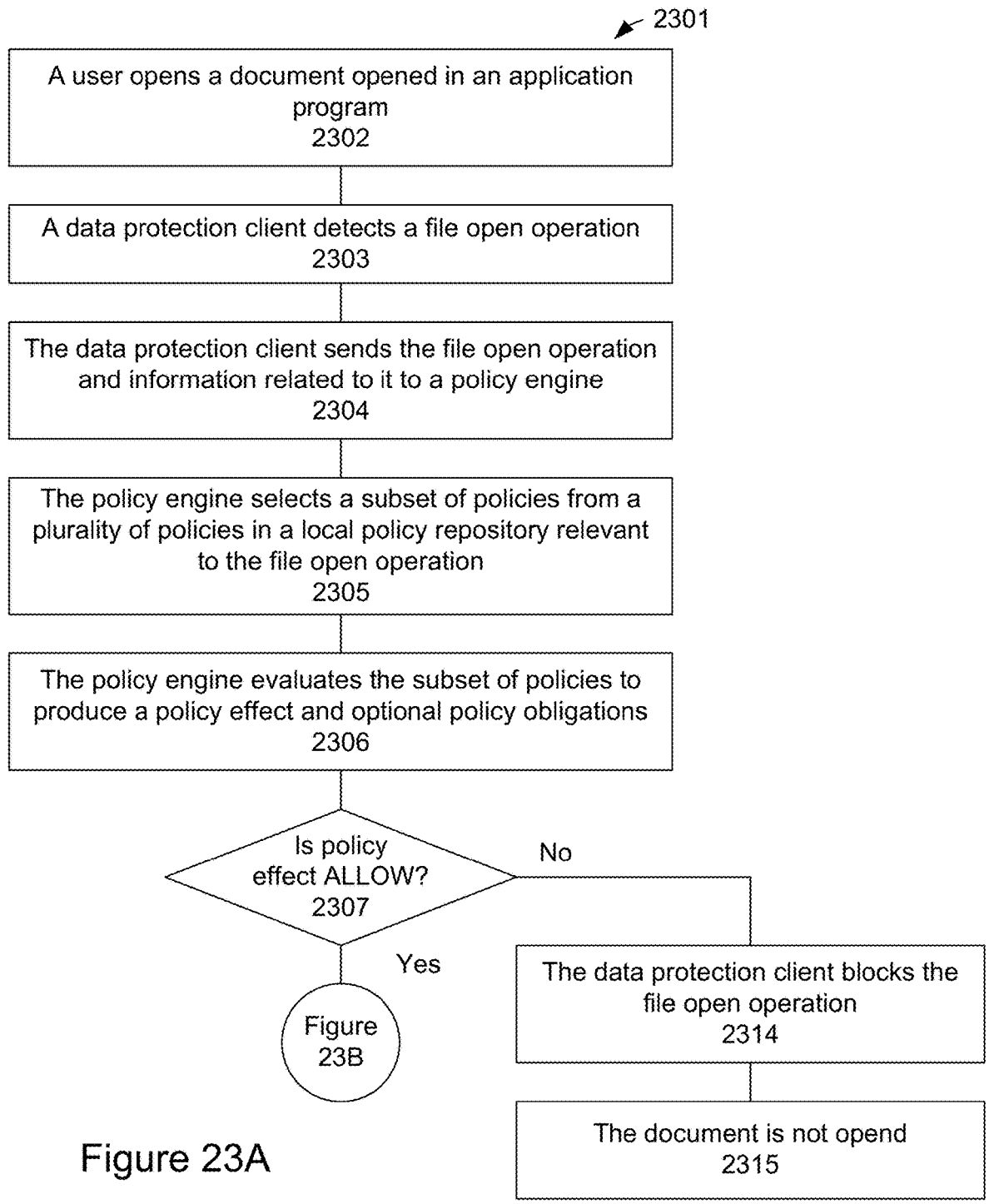

Referring to FIGS. 23A-23B, an example flow 2301 showing a user opening a document "C:\secret\secret_formula.docx" in an application program Microsoft® Word and an overlay policy obligation placing an overlay text "Company Secret, John Doe, Dec. 3, 2015" on display content of the document. In step 2302, the user opens the document in the application program. The user action invokes a file open operation in the application program. In step 2303, a data protection client intercepts the file open operation. The data protection client collects information related to the file open operation such as file name, file attribute and process identifier. In step 2304, the data protection client sends the file open operation and the information collected to a policy engine.

In step 2305, the policy engine selects a subset of policies from a plurality of policies in a local policy repository relevant to the file open operation, the document and the user. The subset of policies being selected includes the policy Policy-RC-OV. In step 2306, the policy engine evaluates the subset of policies to produce a policy effect and optional policy obligations. The policy engine returns the policy effect and the optional policy obligations to the data protection client.

If the policy effect is ALLOW 2307 and optional policy obligations contain an Overlay policy obligation 2308, in step 2309, the data protection client implements Overlay policy obligation by setting up overlay graphics rendering. Overlay rendering occurs in a graphics refresh cycle independent of access and use control. The Overlay policy obligation prepares the data necessary for overlay rendering logic to render the overlay specified in Overlay policy obligation. In step 2310, the data protection client allows the file open operation to continue. In step 2311, the document is opened in the application program and a semi-transparent text pattern containing the overlay text is layered on top of the open document towards the user.

If the policy effect is ALLOW and optional policy obligations do not contain an Overlay policy obligation, in step 2312, the data protection client allows the file open operation to continue. In step 2313, the document is opened in the application program and no overlay is displayed on top of the document.

If the policy effect is DENY, in step 2314, the data protection client blocks the file open operation. In step 2315, the document is not opened.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing an application program and a data protection client running on a computing device wherein the data protection client comprises a plurality of policies;
providing a user attempt to open a document stored in a document container using the application program, wherein the document container comprises content of the document and a plurality of discretionary policies;
detecting a first request to open the document in the application program by the data protection client;
selecting a first subset of policies relevant to the user, the document and the first request from the plurality of policies;
evaluating the first subset of policies to determine if the first request is allowed;
in response to determining based on evaluating the first subset of policies that the first request is allowed, extracting a second subset of policies from the document container, wherein the second subset of policies comprise one or more policies of the plurality of discretionary policies stored in the document container;
in response to determining based on the evaluating the first subset of policies that the first request is allowed, analyzing the second subset of policies to produce a plurality of rights;
in response to determining based on the evaluating the first subset of policies that the first request is allowed, allowing the first request to open the document;
in response to determining based on the evaluating the first subset of policies that the first request is allowed, enforcing a second request to use content of the document with the plurality of rights without evaluating the second subset of policies when enforcing the second request; and
in response to determining based on the evaluating the first subset of policies that the first request is not allowed, blocking the first request to open the document by the user.

2. The method of claim 1 wherein the plurality of policies consists of access or use control policies.

3. The method of claim 1 wherein the data protection client instruments the application program to detect the first request.

4. The method of claim 1 wherein the first subset of policies includes a policy allowing the user to open the document.

5. The method of claim 1 wherein when the second subset of policies having a policy allowing the user to edit content of the document, the plurality of rights includes an edit right.

6. The method of claim 1 wherein when the second subset of policies having a policy allowing the user to copy content of the document, the plurality of rights includes a copy right.

7. The method of claim 1 wherein when the second subset of policies having a policy allowing the user to print content of the document, the plurality of rights includes a print right.

8. The method of claim 1 wherein when the second subset of policies includes a policy allowing the user to send the document in an e-mail message, the plurality of rights includes a send right.

9. The method of claim 1 wherein the second request to use content of the document comprises editing content of the document.

10. The method of claim 1 wherein the second request to use content of the document comprises copying content of the document.

11. The method of claim 1 wherein the second request to use content of the document comprises printing the document.

12. The method of claim 1 wherein the second request to use content of the document comprises sending the document in an e-mail message.

13. The method of claim 1 wherein the enforcing a second request to use content of the document includes blocking the second request.

14. The method of claim 1 wherein the enforcing a second request to use content of the document with the plurality of rights comprises:
comparing the second request with the plurality of rights to determine if the second request is allowed;
if the second requested is allowed, allowing the second request to use content of the document; and
if the second requested is not allowed, blocking the second request to use content of the document.

15. The method of claim 1 wherein the first request is a file open operation.

16. The method of claim 1 wherein the first request is before a second request including a file send operation.

17. The method of claim 1 wherein the second subset of policies are stored in an encrypted format in the document container.

18. The method of claim 17 wherein the content of the document is stored in an encrypted format in the document container.

19. The method of claim 1 wherein blocking the first request to open the document by the user comprises disallowing evaluation of the second subset of policies.

20. The method of claim 1 wherein evaluating the first subset of policies to determine if the first request is allowed comprises determining, based on a process identifier of the application program, whether to allow the first request.

21. The method of claim 1 wherein the first subset of policies comprises policies managed in a policy repository, separate from the document container.

22. A method comprising:
providing a data protection client on a computing device having a plurality of policies;
providing a document opened in an application program on the computing device by a first user;
retrieving a plurality of rights granted to the first user on the document from a policy engine when the policy engine allows opening of the document in the application program comprising:
determining, based on a document container storing the document, whether there exist additional policies to control access to the document,
in response to determining that the document container includes additional policies to control access to the document, selecting a first policy stored in the document container, and
converting the first policy into the plurality of rights;
storing the plurality of rights granted in the data protection client;

attempting to send the document opened in the application program by the first user to a second user;
detecting a file send operation in the application program by the data protection client;
determining if the file send operation is allowed according to the plurality of rights granted;
if the file send operation is allowed, allowing the file send operation to continue, wherein the document is sent to the second user; and
if the file send operation is not allowed, blocking the file send operation by the data protection client, wherein the document is not sent to the second user.

* * * * *